(12) United States Patent
Huang et al.

(10) Patent No.: US 7,822,147 B2
(45) Date of Patent: Oct. 26, 2010

(54) SELF-CALIBRATING MULTI-PORT CIRCUIT AND METHOD

(75) Inventors: Xinping Huang, Ottawa (CA); Mario Caron, Gatineau (CA)

(73) Assignee: Her Majesty the Queen in Right of Canada as Represented by the Minister of Industry, Through the Communications Research Centre Canada, Ottawa (CA)

( * ) Notice: Subject to any disclaimer, the term of this patent is extended or adjusted under 35 U.S.C. 154(b) by 928 days.

(21) Appl. No.: 11/702,523

(22) Filed: Feb. 6, 2007

(65) Prior Publication Data

US 2008/0143562 A1    Jun. 19, 2008

Related U.S. Application Data

(60) Provisional application No. 60/765,744, filed on Feb. 7, 2006, provisional application No. 60/811,408, filed on Jun. 7, 2006.

(51) Int. Cl.
*H04K 1/02* (2006.01)

(52) U.S. Cl. .................. 375/296; 375/141; 375/146; 375/295; 375/297; 341/118; 341/144; 341/143

(58) Field of Classification Search .......... 375/296, 375/297, 332, 414, 146, 295; 341/118, 144, 341/143
See application file for complete search history.

(56) References Cited

U.S. PATENT DOCUMENTS

| | | | |
|---|---|---|---|
| 5,293,406 A | 3/1994 | Suzuki | |
| 5,387,883 A | 2/1995 | Ueda | |
| 5,784,030 A | 7/1998 | Lane et al. | |
| 5,966,312 A | 10/1999 | Chen | |
| 6,661,284 B1 | 12/2003 | Luz et al. | |
| 6,760,567 B1 | 7/2004 | Jeong et al. | |
| 6,771,709 B2 | 8/2004 | Huang et al. | |
| 6,885,241 B2 | 4/2005 | Huang et al. | |

(Continued)

FOREIGN PATENT DOCUMENTS

EP    1125644    8/2001

(Continued)

OTHER PUBLICATIONS

Cavers, "A Fast Method for Adaptation of Quadrature Modulators and Demodulators in Amplifier Linearization Circuits" Proc. Of IEEE Vehicular Technology Conf. Atlanta, Apr. 28-May 1, 1996; vol. II, pp. 1307-1311.

(Continued)

*Primary Examiner*—Eva Y Puente
(74) *Attorney, Agent, or Firm*—Teitelbaum & MacLean; Neil Teitelbaum; Doug MacLean

(57) ABSTRACT

The invention provides a type-based method to compensate for distortions in circuits operating on a plurality of input modulated signals to form one or more output modulated signals. Steps of the method include low-rate sampling of the output signal to obtain a statistical characteristics thereof, and adjusting parameters of the circuit to introduce a controlled degree of cross-coupling between the signals until the statistical characteristics of the output signal approximates a reference characteristics defined by the used modulation formats. Another aspect of the invention provides a self-calibrating multi-port circuit implementing the method.

18 Claims, 29 Drawing Sheets

U.S. PATENT DOCUMENTS

| | | | |
|---|---|---|---|
| 7,382,297 B1 * | 6/2008 | Kopikare et al. | 341/118 |
| 7,471,736 B2 * | 12/2008 | Ding et al. | 375/296 |
| 2002/0181611 A1 * | 12/2002 | Kim | 375/296 |
| 2003/0184374 A1 * | 10/2003 | Huang et al. | 330/149 |
| 2004/0082300 A1 * | 4/2004 | Scheck | 455/126 |
| 2005/0118963 A1 | 6/2005 | Chiu | |

FOREIGN PATENT DOCUMENTS

WO     WO 02/052792     7/2002

OTHER PUBLICATIONS

Datta et al, "Direct Modulation at L-bank Using a Quadrature Modulator with Feedback", Proc. Of the 4$^{th}$ Int'l Mobile Satellite Conf. —IMSC'95, Jun. 6-8, 1995, Ottawa, Canada.

Cavers et al, "Adaptive Compensation for Imbalance and Offset Losses in Direct Conversion Transceivers", IEEE Trans. On Vehicular Technology, vol. 42, No. 4, Nov. 1993, pp. 581-588.

Faulkner et al, Automatic Adjustment of Quadrature Modulators, Electronics Ltrs, vol. 27, No. 3, Jan. 31, 1991, pp. 214-216.

Starski, "Calibration Block for Digital Beam Forming Antenna", Antennas and Propagation Society Inter'l Symposium, vol. 4, Jun. 18-23, 1995, pp. 1978-1981.

Scott et al, "The Effect of Reconstruction Filters on Direct Upconversion in a Multichannel Environment", IEEE Trans. On Vehicular Technology, vol. 44, No. 1 Feb. 1995, pp. 95-102.

Qiming et al, "Improvement of Digital Mapping Predistorters for Linearising Transmitters", 1997 IEEE-MTT-S Proceedings, Jun. 8-13, 1997, vol. III, pp. 1691-1694.

Marchesani, "Digital Precompensation of Imperfections in Quadrature Modulators", IEEE Trans. On Comm. vol. 48, No. 4, Apr. 2000, pp. 552-556.

Cover et al, "Elements of Information Theory", John Wiley & Sons, Inc., NY 1991, pp. 279-335.

\* cited by examiner

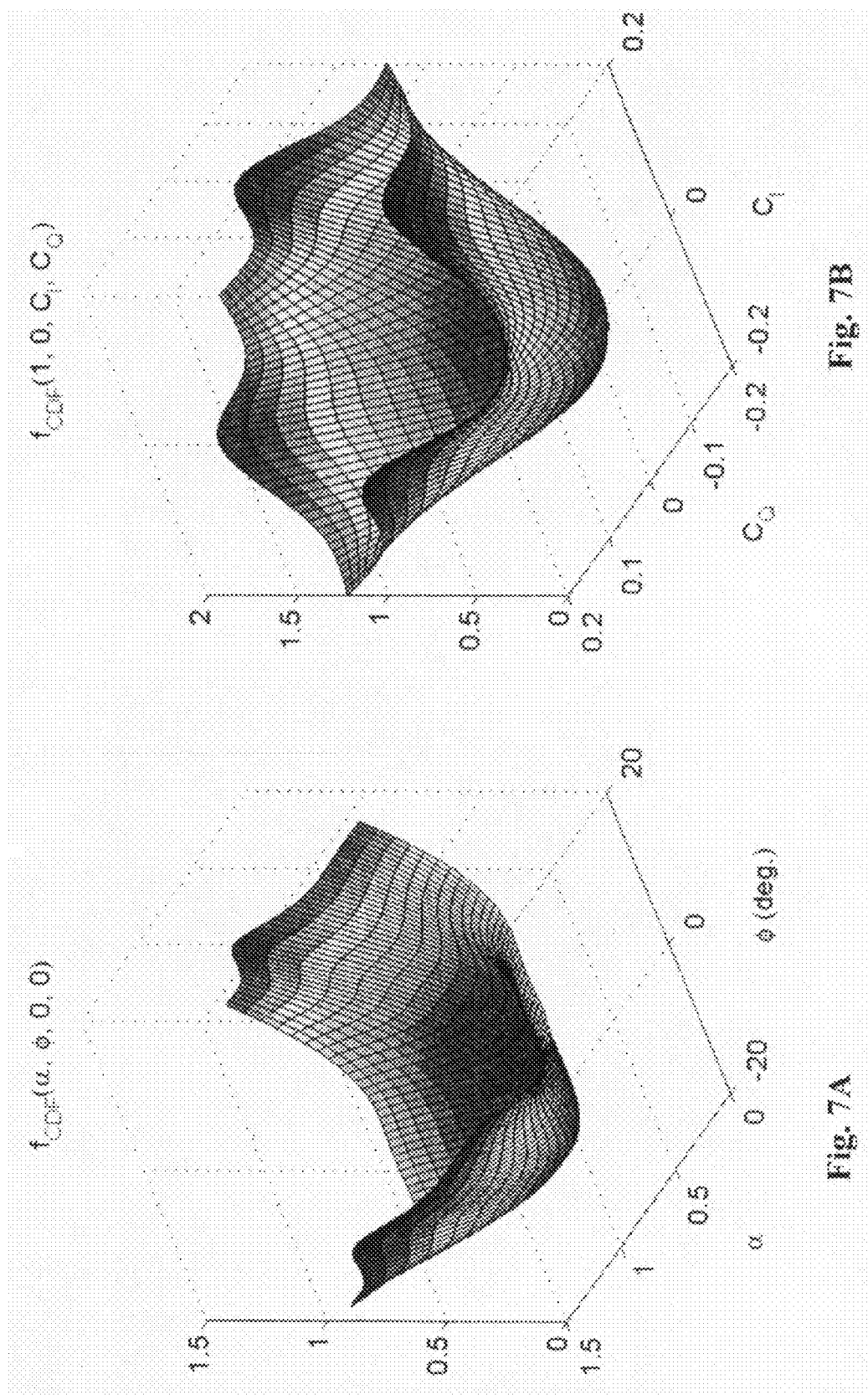

SELF-CALIBRATING MULTI-PORT CIRCUIT AND METHOD

CROSS-REFERENCE TO RELATED APPLICATIONS

The present invention claims priority from U.S. Provisional Patent Application No. 60/765,744 filed Feb. 7, 2006, entitled "Type-based direct transmitter self-calibration technique", and U.S. Provisional Patent Application No. 60/811,408 filed Jun. 7, 2006, 2006, entitled "Type-based subsystem calibration technique", which are incorporated herein by reference for all purposes.

TECHNICAL FIELD

The present invention relates generally to RF circuits and sub-systems and methods of calibration thereof, and in particular to self-calibrating multi-port circuits or subsystems for operating on modulated signals and to methods for calibration thereof.

BACKGROUND OF THE INVENTION

Many communication systems employ circuits or sub-systems that receive multiple modulated input signals through a plurality of input ports, perform pre-determined operations, and output one or more signals via one or more output ports. In many cases, internal operations performed by the circuit or sub-system in question involve scaling and/or phase shifting the input signals and forming particular combinations of the input signals or channels to obtain a desired output. The circuit's performance in such cases is often sensitive to any unintended inter-port cross-talk and deviations in signal transfer functions within the circuit from their ideal, or target characteristics. Therefore, to achieve high performance, it is typically required to either fine-tune the circuit's internal parameters e.g. during the manufacturing or, if it is not possible or practical to do, to pre-distort input signals in a particular way adjusted to a particular circuit so as to compensate as much as possible for the circuit's non-ideality.

One example of such circuit is a multi-port amplifier (MPA), which is also referred to in the art as a hybrid matrix amplifier, and is used, for example, in multi-beam communication systems to efficiently share amplifier power among multiple communication channels or beams when the number of such channels or beams can vary, e.g. depending on capacity demands. A four-port example of such an amplifier is schematically shown in FIG. 1. It consists, essentially, of three sections: input coupler matrix (IHM) network 10 formed by a number, in this case four, preferably identical 3-dB/90° hybrid combiners 25, also referred to as 3 dB couplers; a set 15 of amplifiers (PA), one of each of the four input channels 5; and an output coupler matrix (OHM) network 20, which is also formed by a number of 3-dB/90° hybrid combiners 25, and is substantially identical to the IHM 10. The IHM splits each of the input signals 5 between the four PA, so that each output of the IHM 10 is a sum of all input signals (5) $p_1$ to $p_4$ with pre-determined phase shifts so that each amplifier 15 is operating on all signals. The amplifiers 15 operate preferably in their linear region and ideally have equal gain and phase shift associated therewith. The amplified signals are then fed to the OHM that phase shifts the signals in such a manner that each of the output ports 30 provides a single input port signal $p_i$, $i=1, \ldots, 4$, after having been amplified by all amplifiers 15, so that, for example, the output signal $r_1=p_1$, the output signal $r_2=p_2$, etc. By controlling the relative amplitude of the input signals $p_i$, the power allocated to each signal can go from 0 to 100% of the total power available from the set 15 of the amplifiers. This allows moving power amongst channels or beams therefore enabling the move of bandwidth/capacity easily as per the traffic demand.

However, any deviation in gain/attenuation and phase shift transfer function in the couplers 25 and/or amplifiers 15 from the ideal ones would result in a distortion of the output signals, reduction of the output power of the useful signal, and signal leakage from one port to another when a signal from one of the input ports 5 appears in more than one output ports 30. When the signals share a bandwidth, the signal leakage results in channel cross-talk and thus interference, in addition to the output signal power reduction, thereby detrimentally affecting the performance of the communication link. When the input signals have no overlapping bandwidth, the cross-talk signals limit the frequency re-use capability offered by the multiple beam spatial discrimination.

It is therefore typically required to maintain the transfer function of each element of the MPA as close as possible to the ideal one in order to have a good performance from the MPA. This could potentially be accomplished by imposing tight specifications on the MPA components and the fabrication processes, which however leads to a costly system if at all achievable.

Another approach is to pre-distort the input signals such that the deviation from the ideal transfer function of the MPA is compensated. This involves an estimation of the transfer function of the MPA, which is commonly achieved through a calibration process. A typical prior-art calibration process includes an injection of a calibration signal and therefore cannot be done during a normal operation of the MPA, and thus involves an interruption of the communication link when the calibration has to be done on an installed circuit, which is highly undesirable.

Another example of a multi-port circuit wherein pre-distortion of input signals helps to achieve a better performance is a quadrature direct transmitter, which is schematically illustrated in FIG. 2. Such a transmitter may include a digital signal generator 40 to produce an in-phase (I) and a quadrature (Q) signal, two transmit chains 60 and 65 which convert the digital I and Q signals into analog signals, filter and amplify these analog signals, and a vector modulator 80 fed by the analog I and Q signals. Within the vector modulator 80, the analogue I and Q signals independently modulate in-phase and quadrature components of a carrier signal generated by a local oscillator (LO) 50. In order for the direct transmitter to perform well, the transmit chains 60, 65 must be matched in gain and phase, and their DC offsets must be as expected by the vector modulator 80. In addition, the vector modulator 80 must provide an exact 90 degrees phase shift of the LO signals received by mixers 75 and 75', and the mixers' response must be matched in gain and phase.

These conditions are difficult to achieve, especially for vector modulators operated at microwave and higher frequencies. In practice, the vector modulator inputs are tuned, or pre-distorted, to compensate for the gain/phase imbalances, and DC offsets in the circuit. The signal tuning may consist in adjusting the relative amplitude and phase of the analogue I and Q signals and in adjusting the DC offset on both signals. Such a technique described, for example, in a U.S. Pat. No. 4,930,141, issued May 29, 1990, wherein a look-up table is used to store pre-distortion coefficients for analogue I and Q signals. Alternatively, the tuning can be done by pre-compensating the I and Q signals in the digital signal generator to achieve similar results.

However, signal pre-distortion techniques used heretofore for calibration of multi-port circuits and subsystems have some disadvantages. First, many of them require the use of specially-designed calibration signals as the circuit's input, and cannot therefore be used when the circuit is embedded in a working communication system without disrupting normal operation thereof. For example, U.S. Pat. No. 5,387,883, issued Feb. 7, 1995, describes a technique for compensating phase imbalances in a quadrature modulator using calibration signals to determine pre-distortion phase shifts. U.S. Pat. No. 5,293,406 issued Mar. 8, 1994, discloses a technique for determining pre-distortion coefficients for DC offset, gain imbalance and phase imbalance sequentially using a variety of calibration signals.

Other techniques to determine various signal pre-distortion parameters for vector modulators are described in James K. Cavers, *A fast method for adaptation of quadrature modulators and demodulators in amplifier linearization circuits*, Proc. Of IEEE Vehicular Technology Conference, Atlanta, Apr. 28-May 1, 1996, Vol. II, pp. 1307-1311; R. Datta, S. N. Crozier, *Direct modulation at L-band using a quadrature modulator with feedback*, Proc. Of the 4th Int'l Mobile Satellite Conference—IMSC'95, Jun. 6-8, 1995, Ottawa, Canada; James K. Cavers, Maria W. Liao, *Adaptive compensation for imbalance and offset losses in direct conversion transceivers*, IEEE Trans. On Vehicular Technology, Vol 42, No. 4, November 1993, pp. 581-588, M. Faulkner, T. Mattsson, W. Yates, *Automatic adjustment of quadrature modulators*, Electronics Letters, Vol. 27, No. 3, Jan. 31, 1991, pp. 214-216. Although the techniques described in these papers appear to serve their intended purposes, all of them require the use of special training or calibration signals and thus cannot be performed during normal operation of the respective transmitters.

Similarly, many prior-art techniques for determining signal pre-distortion parameters in application to multi-port amplifiers also rely on injecting test signals and therefore cannot be performed with the amplifier in operation. Examples include techniques described in U.S. Pat. No. 6,661,284 issued to Yuda Luz et al, U.S. Pat. No. 5,784,030 issued to S. O. Lane et al, and an article J. P. Starski, *Calibration block for digital beam forming antenna*, Antennas and Propagation Society International Symposium, Volume 4, 18-23 June 1995, Pages: 1978-1981.

Prior art techniques requiring output signal manipulation, e.g. sampling at the modulation rate or above, signal synchronization and/or frequency down-conversion: Scott A. Leyonhjelm, Michael Faulkner, *The effect of reconstruction filters on direct upconversion in a multichannel environment*, IEEE Trans. On Vehicular. Technology, Vol 44, No. 1, February 1995, pp. 95-102; Qiming Ren, Ingo Wolff, *Improvement of digital mapping predistorters for linearising transmitters*, 1997 IEEE-MTT-S proceeding, Jun. 8-13, 1997, vol. 111, pp. 1691-1694 (signal de-modulation); Rossano Marchesani, *Digital precompensation of imperfections in quadrature modulators*, IEEE Trans. On Comm., Vol. 48, No. 4, April 2000, pp. 552-556.

U.S. Pat. No. 6,771,709, which is issued to the inventors of the current invention and is incorporated herein by reference, describes a direct transmitter self-calibrating technique that estimates the gain/phase imbalances and DC offsets in the vector modulator and pre-compensate for their effects. It employs a nonlinear mapping between the modulator parameters and its output power to simplify the problem, and a least-squares method to estimate the modulator parameters. The technique can be used without interrupting the normal transmitter operation, and yields an excellent compensation of the gain/phase imbalance and DC offsets. However, the technique needs to relate the modulator output signal to its input signal, and an accurate synchronization between them is required to achieve a good performance, increasing the hardware cost required for its implementation. Furthermore, relatively complex digital signal processing hardware and software is required to implement the synchronization and the parameter estimation, especially at very high transmission rate.

European patent application EP 1126544A2 by S. Pietrusiak, entitled System for calibrating and characterizing an antenna system and method for characterizing an array of antenna elements, describes a process of calibrating a coupler matrix amplifier system that involves injecting a test signal and filtering out interfering signals at the output, followed by its demodulation for deriving a phase and gain transfer function of the amplifier. Drawbacks of the method include the need to inject test signals and therefore to interrupt the normal operation of the system, and the need to perform frequency conversion and demodulation of the output signal, followed by high-rate sampling thereof at least at the Nyquist rate.

Recently, the inventors of the present invention developed a method of linearizing a single-port nonlinear circuit for processing a communication signal that relies on a unique relationship between a modulation format and statistical properties of a modulated communication signal to determine signal pre-distortion information. The method, which is described in commonly owned U.S. Pat. No. 6,885,241, involves determining a cumulative statistical characteristic, or type, of the output signal of the amplifier while the amplifier carries information traffic by sampling its envelope at a relatively low rate, comparing it to an ideal statistical characteristic for the signal, and determining a non-parametric pre-distortion function for the input signal to compensate the non-linear distortions introduced by the amplifier. Advantageously, the method does not involve interruption of the communications or any complex high-speed circuitry for bit-rate signal processing. However, the method described in U.S. Pat. No. 6,885,241 is not applicable to a multi-port circuit receiving a plurality of input signals, since it does not account for cross-talk between the input signals that lead to the output signal or signals distortions.

Accordingly, the object of the present invention is to provide a method of calibrating a multi-port circuit or sub-system that can be used without interrupting a normal operation of a communication system wherein the circuit or subsystem is used, and which does not require output signal de-modulation or processing at the Nyquist rate.

Another object of the present invention is to provide a method for determining pre-distortion parameters for a multi-port circuit that can be used during a normal operation of the circuit using low-rate sampling of the output signal.

Another object of this invention is to provide a self-calibrating circuit having multiple input ports for receiving multiple modulated signals which is adaptive to time-induced and environment-induced changes of the circuit parameters, and does not require modulation-rate processing or time-domain reconstruction of the circuit's output signal or signals.

In the context of this specification, the term "circuit" is used to mean a network of elements or devices for transmitting or receiving and manipulating signals, such as microwave electrical signals, which can include one or more circuit boards and/or one or more integrated circuits such as those embodied using one or more semiconductor chips. The terms "circuit" and "sub-system" are used herein interchangeably.

SUMMARY OF THE INVENTION

In accordance with the invention, a method for compensating for distortion in a circuit comprising a plurality of input ports for receiving a plurality of input signals and an output port for outputting an output signal, the method comprising the steps of: a) providing reference distribution information for the output signal; b) sampling the output signal to determine an output distribution information; and, c) modifying a first of the plurality of input signals for reducing a difference between the output distribution information and the reference distribution information; wherein step (c) includes adding a controlled amount of cross-correlation between the first and a second of the plurality of input signals or signals related thereto so as to at least partially compensate for undesired signal cross-talk in the circuit.

According to a preferred embodiment of the method, step (c) comprises the steps of: determining an objective function from the reference distribution information and the output distribution information; determining distortion compensation information for the plurality of input signals based on the objective function; and, based on the distortion compensation information, adjusting one or more elements of the circuit; and steps (b)-(c) are iteratively repeated until the objective function reaches a threshold value.

Another aspect of the invention provides a self-calibrating circuit, comprising: N input ports, wherein N≧2, for receiving N input signals; at least one output port for outputting at least one output signal, wherein the N input signals and the at least one output signal each comprise digitally modulated signal or signals; one or more circuit element coupled between the N input ports and the at least one output port for forming the at least one output signal from the N input signals; a variable coupling means coupled to the N input ports for controllably adjusting cross-coupling between at least some of the N input signals or signals originated therefrom; a memory for storing a reference distribution function; and, a feedback circuit coupled between the at least one output port and the variable coupling means for controlling thereof in dependence on the output signal. The feedback circuit comprises a sampling circuit for sampling the at least one output signal to provide a plurality of signal samples, and a processor coupled to the sampling circuit and the memory and programmed for computing an output signal distribution function based on the plurality of signal samples, and for controlling the variable coupling means so as to substantially reduce a difference between the output signal distribution function and the reference signal distribution function.

Embodiments of this aspect of the invention provide self-calibrating quadrature transmitter, self-calibrating mutli-port amplifier, and self-calibrating beam forming network, each comprising a feedback circuit including a low-rate sampling circuit for assessing distortions of statistical characteristics of the output signals or signals of the respective devices, and iteratively adjusting at least signal cross-coupling in respective devices to eliminate or substantially decrease said distortions.

BRIEF DESCRIPTION OF THE DRAWINGS

The invention will be described in greater detail with reference to the accompanying drawings which represent preferred embodiments thereof, wherein:

FIGS. 7A and 7B are 3D graphs illustrating the objective function in dependence on the gain and phase imbalances and DC offsets, respectively;

DETAILED DESCRIPTION

Figure 1:
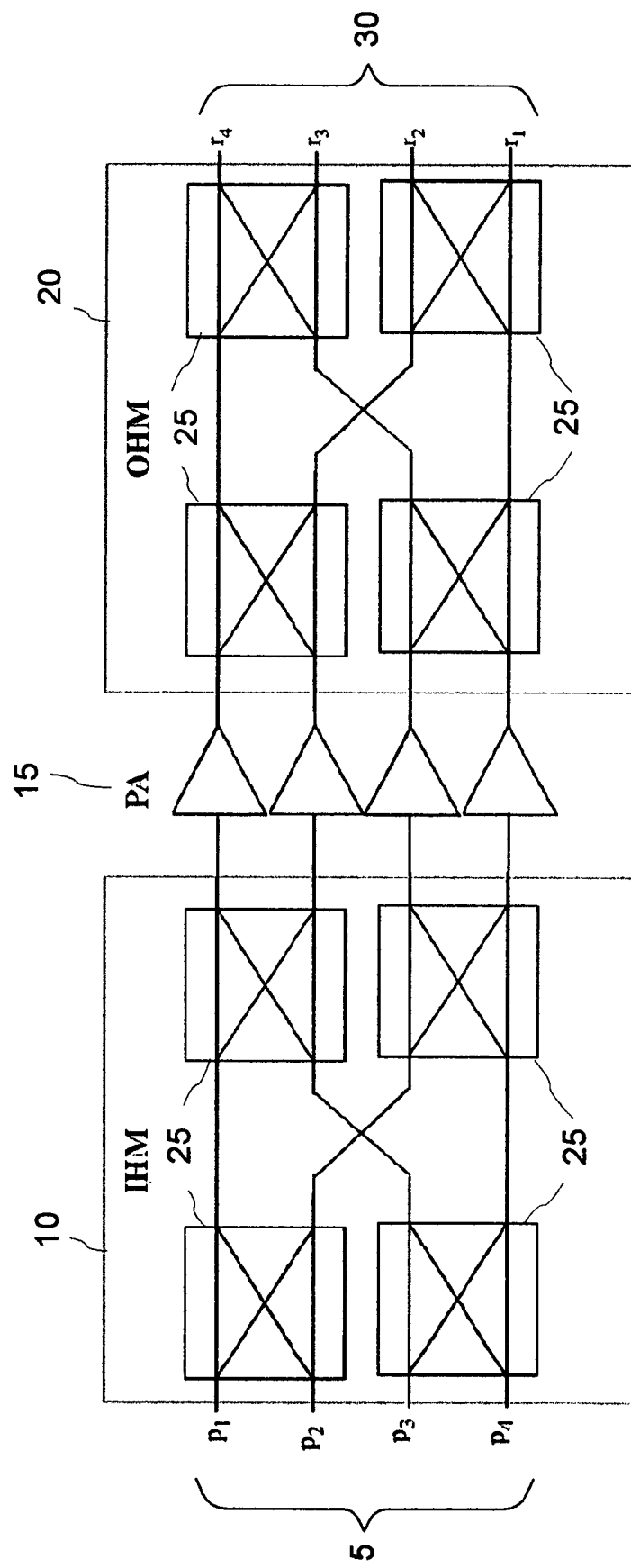
FIG. 1 is a diagram of a prior-art multi-port amplifier having four input and four output ports.
Figure 2:
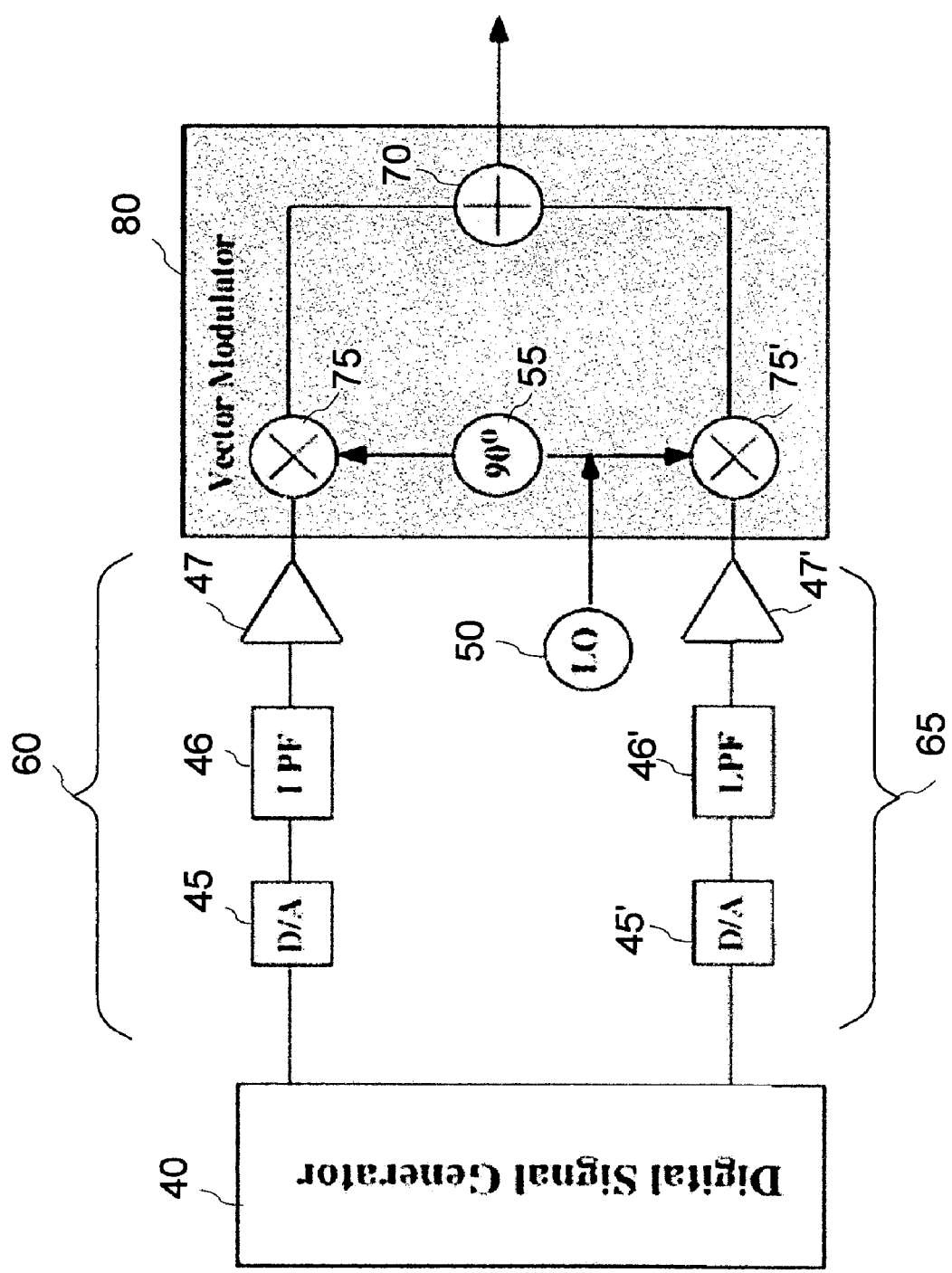
FIG. 2 is a diagram of a prior-art quadrature transmitter.

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Furthermore, the term "circuit" in the context of the present specification means either a single component or a multiplicity of components, either active and/or passive, that are arranged to cooperate with one another to provide a desired function, and may be at least partially implemented in firmware and/or software.

The term "signal" means at least one RF signal, current signal, voltage signal or data signal.

The term "modulated signal" as used herein includes modulated AC carrier signals having non-zero carrier frequency and having its frequency, phase and/or amplitude modulated according to a pre-determined modulation format with a sequence of information symbols, and modulating signals having a DC carrier, such as binary or multi-level data signals, used to modulate one of the parameters of an AC carrier signal. The terms "modulation format" and "modulation scheme" are used in the specification interchangeably.

In this specification we will use the terms "type" and 'type information' when referring to statistical distributions related to modulation signals. "Type" is a term used in information theory for a histogram estimate of a discrete probability density function as is found in the text of T. Cover and J. Thomas, Elements of information theory, John Wiley & Sons, Inc., New York, 1991, pp. 279-335, incorporated herein by reference. Type information describes the statistical property of a time series, where cumulative distribution function (CDF) and probability density function (PDF) are examples thereof. The terms "type information" and "distribution" both relate to statistical properties of a signal and are used in the specification interchangeably.

Preferred embodiments of the invention will be described hereinbelow mainly in application to quadrature transmitters, multi-port amplifiers, and beam forming networks (BFN), although it can be used for other types of circuits or subsystems having two or more input ports for receiving two or more modulated signals, and at least one output port for outputting a modulated output signal obtained by the circuit from the input signals.

First Embodiment

Quadrature Transmitter

Figure 3:
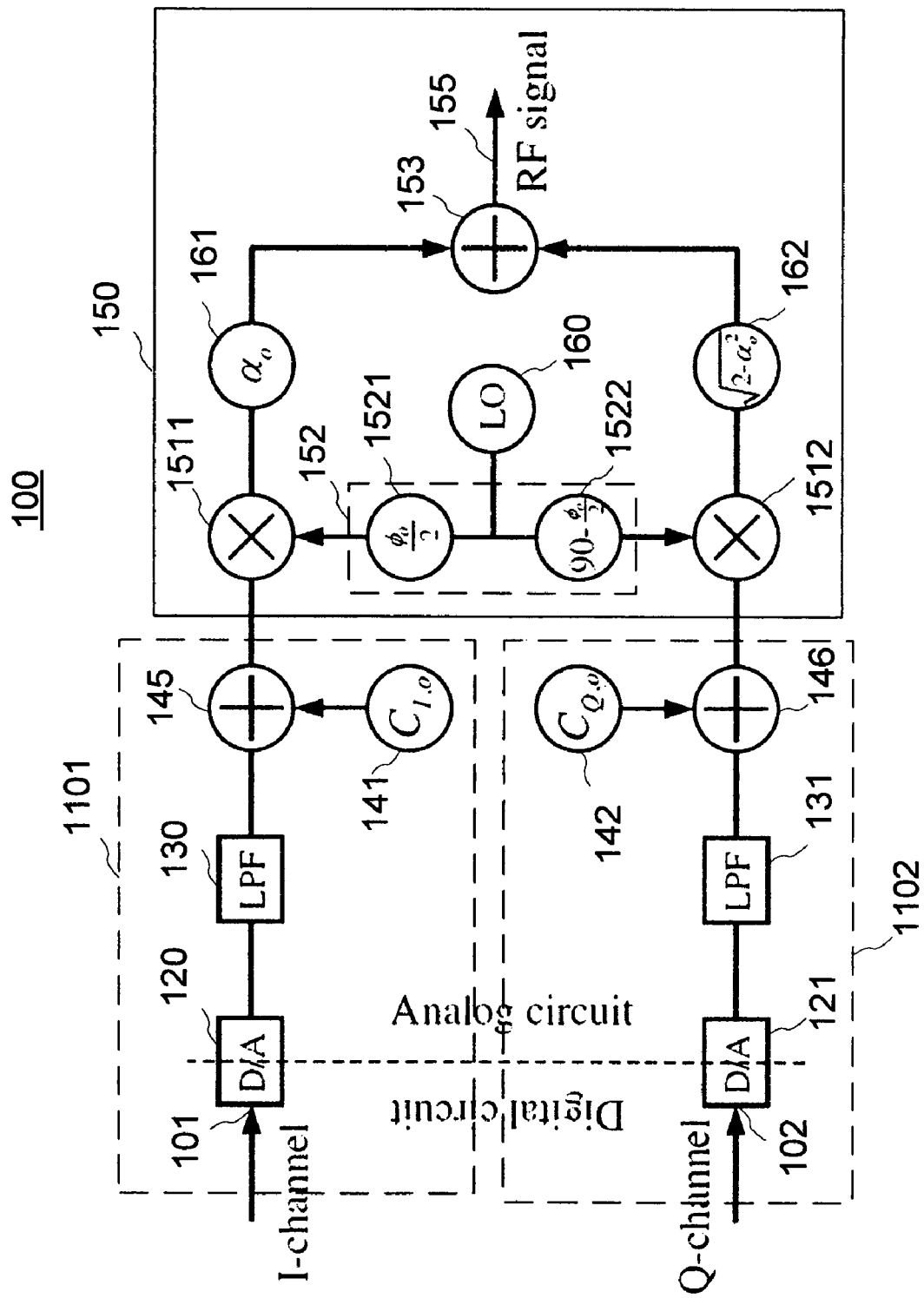
FIG. 3 is a diagram of the prior-art quadrature transmitter illustrating internal sources of distortion.

Referring to FIG. 3, a functional block diagram of a prior art quadrature transmitter (QT) 100 is shown including most common sources of distortion within the circuit, schematically represented by elements 141, 142, 1511, 1512, 1521, 1522, 161 and 162. The QT 100 has two input ports 101 and 102 connected to two transmit chains, the I-signal chain 1101 and the Q-signal chain 1102, respectively, each including a Digital-to-Analog (D/A) converter 120 and 121 and a low pass filter (LPF) 130 or 131. The anti-aliasing LPF 130, 131 in each chain can be followed by amplifiers which are not shown in this figure. The I and Q signal chains receive digital I and Q signals, which are mutually orthogonal to each other, from a digital signal generator that has modulated and pulse shaped the signals, convert them into analogue I and Q signals using the D/A converters 120, 121, filter them using the LPFs 130, 131, and feed said signals to a vector modulator 150, which in the shown embodiment includes a local oscillator (LO) 160, two mixers 1511 and 1512, a phase shifter 152 and a signal combiner 153. A signal generated by the local oscillator 160 is split into two orthogonal signals in the splitter/phase-shifter 152 which has a nominally non-phase shifting output connected to the mixer 1511, and a 90° phase-shifting output connected to the mixer 1512. The mixer 1511 multiplies the in-phase signal I by the LO-signal, whereas a second mixer 1512 multiplies the quadrature signal Q by a 90°-shifted LO signal. The mixed signals are then summed in the adder 153 to form an RF output signal at the output port 155. Of course, the design of the vector modulator as described above constitutes only one specific design of the vector modulator, and other designs for the vector modulator can be easily envisioned by a person of skill in the art. For example, the I-signal LO is phase shifted by −45° and the Q-signal LO is phase shifted by 45°.

In order for the QT 100 to perform properly, the transmit chains 1101 and 1102 are preferably matched in gain and phase, and their DC offsets are preferably such as expected by the vector modulator 150. In addition, the splitter/phase shifter 152 has to provide a 90° shift and the mixers 1511 and 1512 responses have to be matched in gain and phase. If all these conditions are met, the RF signal $s_0(t)$ generated by the QT 100 can be represented as follows:

$$s_0(t) = I(t)\cos(\overline{\omega}t) - Q(t)\sin(\overline{\omega}t) \quad (1)$$

where I(t) and Q(t) are the analog I and Q modulating signals, each having a unit power and independent of each other, and $\overline{\omega}$ is the carrier frequency, i.e. the frequency of the LO signal. The analogue in-phase I(t) and quadrature Q(t) signals are pre-selected so that the signal $s_0(t)$ has a pre-determined modulation format, e.g. QPSK and pulse shaping.

The exact matching of the I and Q transmit chains from the input ports 101 and 102 up to the adder 153 is very difficult to achieve, especially when the direct digital transmitter 100 is operated at microwave frequencies. In practice, the I and Q signals at the inputs of the adder/combiner 152 differ in power, and have a phase shift that differs from the nominal 90°. This is schematically represented in FIG. 3 by signal multipliers 161 and 162, wherein the multiplier 161 multiplies the I signal by an effective gain $\alpha_0$, and the multiplier 162 multiplies the Q signal by an effective gain $\sqrt{(2-\alpha_0^2)}$. Parameter $\alpha_0$ represents the total gain imbalance in the QT 100; without loss of generality, in the chosen representation the total power gain in the I and Q channels at the adder 153 is normalized to unity.

The phase imbalance is represented by phase shifters 1521 and 1522 which form the splitter/phase shifter block 152, and which add phase shifts $\phi_o$ and 90°-$\phi_o$ to the LO signals directed to the I and Q chains, respectively. Here, $\phi_o$ represents the total phase imbalance between the I and Q signals which, for ease of mathematical modeling and without loss of generality, is assumed to be split equally between the I and Q channels.

In addition, there may be an undesirable DC offset between the I and Q signals at the input of the mixers 1511 and 1512, which, if exists, causes the LO signal to 'leak' through the vector modulator and appear at the output port 155 of the QT 100 and in the output RF signal. In many cases, vector modulators are designed to be fed the I- and Q-signals with a given DC offset, for example 0.5 V, which is then compensated by the modulator circuitry prior to the modulation of the LO signal. After fabrication of the vector modulator, the optimal DC offset may take on values that are different from the designed values. For example, the optimal DC offset for the I-channel is 0.48V, whereas the optimal offset for the Q-channel is 0.52 V. Therefore, the expression "correcting for DC offset" has to be understood as "compensation for deviation from an optimal DC offset". In FIG. 3, these DC offset deviations are modeled by elements 141 and 142, which add DC offsets $C_{I,o}$ and $C_{Q,o}$, to be understood as the DC offset deviations, to the I and Q chains.

Accordingly, when the gain, phase imbalances and DC offsets shown in FIG. 3 are taken into account, an actual output RF signal at the output port 155 of the QT 100 can be represented as follows:

$$s(t) = \quad (2)$$
$$\alpha_o(I(t) + C_{I,o})\cos\left(\overline{\omega}t + \frac{\phi_o}{2}\right) - \sqrt{2 - \alpha_o^2}\,(Q(t) + C_{Q,o})\sin\left(\overline{\omega}t - \frac{\phi_o}{2}\right)$$

The signal s(t) is distorted compared to the "ideal" output signal $s_0(t)$ due to the gain, phase imbalances and DC-offsets in the QT 100. One consequence of this distortion is that the actual output RF signal s(t) includes a tone at the LO frequency which is independent on the I and Q signals, does not therefore carry useful information and which at least reduces the power efficiency of the QT 100. Another undesired aspect of this distortion is the appearance of a cross-talk between quadrature components of the output signal s(t). Indeed, expression (2) can be expressed in the following form:

$$s(t) = U(t)\cos(\omega t) - V(t)\sin(\omega t) \quad (3)$$

where the time-dependent coefficients U(t) and V(t) are defined in matrix form as $$\begin{pmatrix} U(t) \\ V(t) \end{pmatrix} = \begin{pmatrix} \cos(\phi_o/2) & \sin(\phi_o/2) \\ \sin(\phi_o/2) & \cos(\phi_o/2) \end{pmatrix} \begin{pmatrix} \alpha_o & 0 \\ 0 & \sqrt{2-\alpha_o^2} \end{pmatrix} \begin{pmatrix} I(t) + C_{I,o} \\ Q(t) + C_{Q,o} \end{pmatrix} \quad (4)$$

or, equivalently, $$\begin{cases} U(t) = \alpha_o \cos\left(\frac{\phi_o}{2}\right)(I(t) + C_{I,o}) + \sqrt{2-\alpha_o^2}\,\sin\left(\frac{\phi_o}{2}\right)(Q(t) + C_{Q,o}) \\ V(t) = \alpha_o \cos\left(\frac{\phi_o}{2}\right)(I(t) + C_{I,o}) + \sqrt{2-\alpha_o^2}\,\sin\left(\frac{\phi_o}{2}\right)(Q(t) + C_{Q,o}) \end{cases} \quad (4a)$$

It follows from expression (4a) that each of the amplitudes U(t) and V(t) of the quadrature components of the output RF signal s(t) depends on both the I and Q analogue modulating signals I(t) and Q(t), and are therefore not independent.

As known in the art, by suitably tuning the input signals I and Q prior to supplying them to the QT 100, the effect of the distortions in the QT 100 can be substantially or at least partially compensated. However, the distortion parameters $\phi_o$, $\alpha_o$, $C_{I,o}$ and $C_{Q,o}$, of the circuit 100 are generally not known to the user and can vary from circuit to circuit, and for a same circuit with time and with changing environmental conditions, such as temperature. The present invention provides means to determine and adaptively adjust tuning parameters for the input signals so as to substantially compensate for the gain, phase imbalances and DC offsets of the QT 100.

Figure 4:
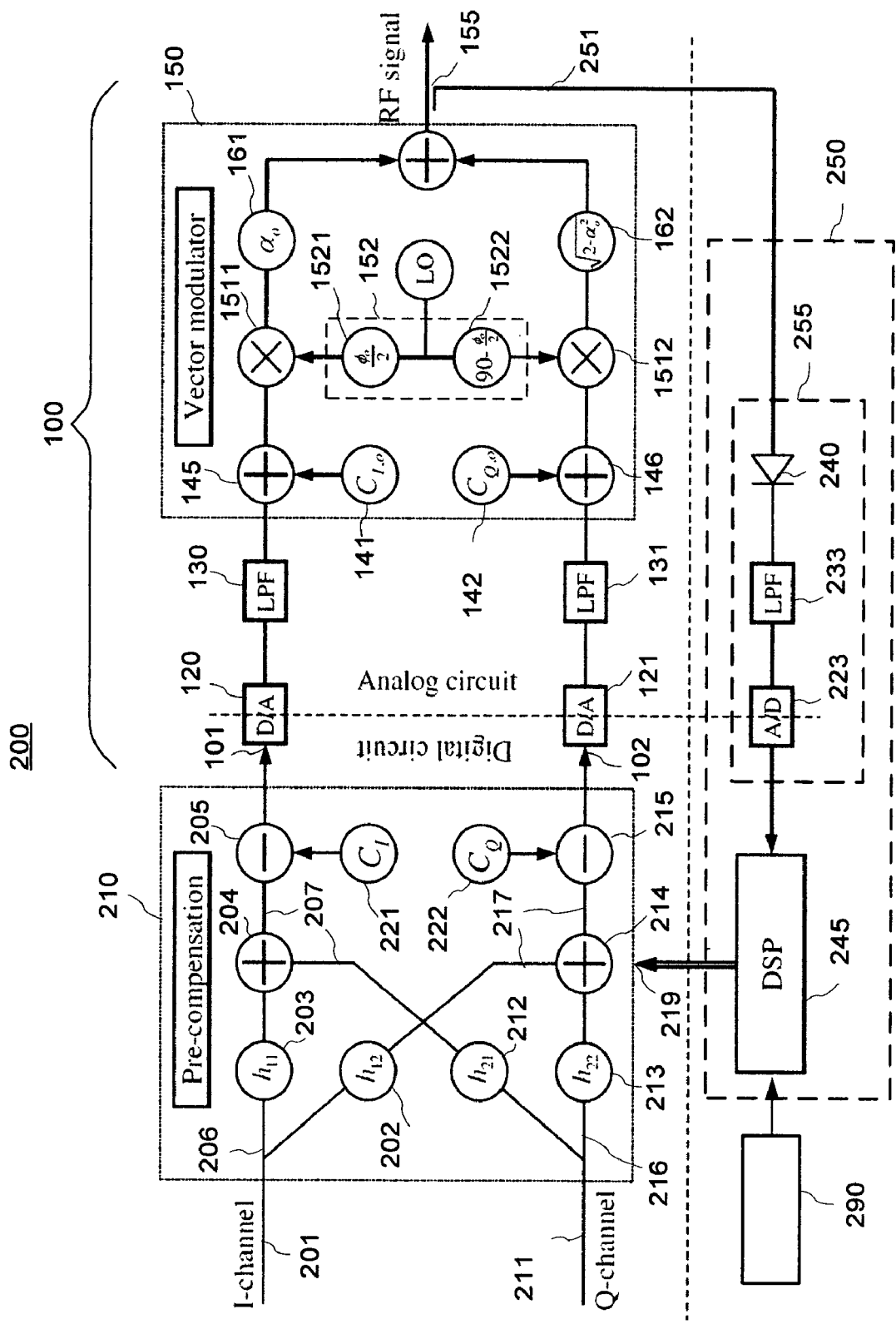
FIG. 4 is a diagram of the self-calibrating quadrature transmitter according to the present invention.

Turning now to FIG. 4, shown is a functional block diagram of a self-calibrating QT 200 according to one embodiment of the present invention; this circuit will now be described along with an embodiment of the method of the present invention as applied for compensating imbalances and DC offsets in a QT.

The self-calibrating QT circuit 200 differs from the QT 100 shown in FIG. 3 substantially by the addition of a distortion compensation network 210, also referred to herein as the pre-compensation network 210 connected at the input of the QT circuit 100, which is hereinafter also referred to as the first circuit, and a feedback circuit 250 connected between the RF output port 155 of the vector modulator 150 and a control port 219 of the pre-compensation network 210. The output port 155 serves simultaneously as an output port of the self-calibrating QT circuit 200. The pre-compensation network has two input ports 201 and 211, each of which is coupled to each of the input ports 101, 102 of the QT 100 by means of connecting links 206, 207, 216 and 217, each of said links including a signal multiplier 202, 203, 212 or 213 that multiplies a respective input signal by an adjustable scaling, or transmission coefficient $h_{i,j}$, where i,j=1,2, so that said links are characterized by tunable transmission. In particular, link 206 couples the input port 201 with the input port 101 of the circuit 100 with a transmission coefficient $h_{2,2}$, link 216 couples the input port 211 with the input port 102 of the circuit 100 with a transmission coefficient $h_{2,2}$, link 217 couples the input port 201 with the input port 102 of the circuit 100 with a transmission coefficient $h_{1,2}$, and link 207 couples the input port 211 with the input port 101 of the circuit 100 with a transmission coefficient $h_{2,1}$. The links 217 and 207, which can be referred to as cross-coupling links, result in adding a controlled amount of cross-coupling and cross-correlation into signals input into the first and second ports of the QT 100, which enables to compensate for the undesired cross-talk in the QT circuit 100 between the quadrature components of the output RF signal associated with the phase imbalance φ. The coefficients $h_{i,j}$ where i≠j are referred to hereinafter as the cross-coupling coefficients. In addition, the links 206 and 216 include signal combiners 205 and 215 for subtracting DC offsets ($C_I$) and ($C_Q$) at the input ports 101 and 102 of the first circuit 100, respectively.

In operation, each of the input digital signals I(t) and Q(t), which are also referred to hereinafter as the first and second input signals, is split in two, scaled by a respectively scaling coefficients $h_{i,j}$ and provided to each of the input ports 101 and 102 with added DC offsets ($-C_I$) and ($-C_Q$), so that the port 101 receives a first pre-distorted input signal Ic(t) formed from a sum of the first and second scaled input signals $h_{1,1} \cdot I(t)$ and $h_{2,1} \cdot Q(t)$:

$$Ic(t) = (h_{1,1} \cdot I(t) + h_{2,1} \cdot Q(t)) - C_I, \quad (5a)$$

and the port 102 receives a second pre-distorted signal Qc(t) formed from a sum of the first and second scaled input signals $h_{1,2} \cdot I(t)$ and $h_{2,2} \cdot Q(t)$, $$Qc(t) = (h_{1,2} \cdot I(t) + h_{2,2} \cdot Q(t)) - C_Q. \quad (5b)$$

Note that, according to the invention, the set of four scaling coefficients $h_{i,j}$ is to compensate for gain and phase imbalances $\alpha_0$ and $\phi_0$ in the analogue circuitry of the QT 100, therefore they should be selected so that the pre-compensation circuit 210 outputs signals that are characterized by gain and phase imbalances α and φ which, if selected correctly, would exactly compensate for the gain and phase imbalances of the QT 100. This can be achieved by selecting the scaling coefficients $h_{i,j}$ to satisfy the following set of equations (6), wherein the scaling/transmission coefficients $h_{i,j}$ are dependent on two independent parameters α and φ.

$$h_{11} = \frac{\cos\left(\frac{\phi_o}{2}\right)}{\alpha \cos(\phi)}$$

$$h_{12} = \frac{\sin\left(\frac{\phi_o}{2}\right)}{\sqrt{2-\alpha^2}\cos(\phi)}$$

$$h_{21} = \frac{\sin\left(\frac{\phi_o}{2}\right)}{\alpha \cos(\phi)}$$

$$h_{22} = \frac{\cos\left(\frac{\phi_o}{2}\right)}{\sqrt{2-\alpha^2}\cos(\phi)}$$

(6)

With this selection, the first and second pre-distorted signals satisfy the following matrix equation (7):

$$\begin{pmatrix} I_c(t) \\ Q_c(t) \end{pmatrix} = \begin{pmatrix} \frac{\cos\left(\frac{\phi_o}{2}\right)}{\alpha \cos(\phi)} & -\frac{\sin\left(\frac{\phi_o}{2}\right)}{\alpha \cos(\phi)} \\ -\frac{\sin\left(\frac{\phi_o}{2}\right)}{\sqrt{2-\alpha^2}\cos(\phi)} & \frac{\cos\left(\frac{\phi_o}{2}\right)}{\sqrt{2-\alpha^2}\cos(\phi)} \end{pmatrix} \begin{pmatrix} I(t) \\ Q(t) \end{pmatrix} - \begin{pmatrix} C_I \\ C_Q \end{pmatrix} \quad (7)$$

By selecting the gain, phase and DC offset parameters α, φ, $C_I$ and $C_Q$ of the pre-compensation circuit 210 to be equal to the distortion parameters $\alpha_0$, $\phi_0$, $C_{I,0}$ and $C_{Q,0}$, respectively, of the circuit 100, the gain, phase imbalances and DC offsets causing distortions of the output RF signal can be substantially compensated, so that each of the amplitudes U(t), V(t) of the in-phase and quadrature components of the output RF signal defined by equation (3) become substantially equal to a respective one of the in-phase and quadrature signals I and Q:

$$U(t)=I(t), V(t)=Q(t), \quad (8)$$

resulting in the actual RF output signal s(t) being substantially equal to the ideal output signal $s_0(t)$ as defined by equation (1), without distortions.

In the following we will be referring to the set of parameters α, φ, $C_Q$, $C_I$ as the pre-distortion parameters, and to the set of parameters $h_{i,j}$, i,j=1,2, $C_Q$, $C_I$ as the compensation circuit parameters, with the DC-offsets $C_Q$ and $C_I$ belonging to both sets. Clearly, once pre-distortion parameters are selected, the compensation circuit parameters are obtainable therefrom using equations (6).

According to the invention, the feedback circuit 250 operates by adjusting the compensation circuit parameters $h_{i,j}$, $C_Q$ and $C_I$ so as to compensate for the circuit imbalances and DC offsets. To this end, the feedback circuit 250 assesses statistical characteristics of the output signal s(t), compare them to a corresponding target characteristic of an "ideal", non-distorted output signal $s_0(t)$, and derives from this comparison distortion compensation information required to suitably modify, or pre-distort, the input signals so that the imbalances and DC offsets in the circuit 100 are substantially compensated.

In the illustrated embodiment, the feedback circuit 250 includes a sampling circuit 255 and a processor 245. The sampling circuit 255 is formed by an envelope detector 240 embodied as a power detector shown as a diode 240, which is coupled to the output port 155 to receive a fraction of the output RF signal s(t), followed by a low-pass anti-aliasing filter (LPF) 233, which is in turn followed by an analog-to-digital (A/D) converter 223. Output of the A/D converter 223 in the form of a stream of signal samples p(l) is fed to the processor 245 embodied herein as a digital signal processor (DSP) 245. Optionally, an amplifier (not shown) is integrated into the feedback circuit 250. A memory 290 coupled to the DSP 245 is provided for storing reference distribution information as will be explained hereinafter. One skilled in the art would appreciate that other processing means can be used in place of the DSP 245, such as but not limited to: a general purpose processor, a specialized microprocessor, an FPGA, or a combination of the above. In some embodiments, the memory 290 can be a part of the DSP 245. In another embodiment, the pre-compensation circuit 210 and the DSP 245 can be embodied using a single integrated circuit. The DSP 245 functions as a parameter estimator, and generates the pre-compensation DC offset coefficients $C_I$, $C_Q$, and the scaling coefficients $h_{i,j}$, where i,j=1,2.

In operation, the feedback circuit 250 cooperates with the pre-compensation network 210 to adaptively determine the gain/phase imbalances and DC offsets, and to adjust the compensation circuit parameters $C_I$, $C_Q$, and $h_{ij}$ according to the current conditions of the analog vector modulator circuit 150. Accordingly, the circuit 200 is able to react to variations in the circuit's parameters due to variations in ambient temperature and the like occurring during circuit operation, and operates as a self-calibrating device.

Operation of the feedback circuit 250 is based upon an observation that a modulated signal carrying a sufficiently long information sequence have many properties of a random signal when viewed over a time scale much longer than the length of an individual information symbol, and that statistical properties of an envelope function of a modulation signal substantially depends on the respective modulation format used to produce the modulated signal, and are sensitive to signal distortions. Given the selected modulation scheme and pulse shaping function, which for the QT 200 is defined by the received I and Q signals, the "ideal" modulated signal $s_0(t)$ has a unique envelope statistical distribution. The approach of the present invention is to adjust the compensation parameters of the QT 200 circuit, based on statistical properties of the output signal envelope.

The term "envelope function", or simply "envelope" in the context of this specification relates to a modulated carrier signal, and is used herein to mean a signal, or a function thereof, that can be obtained by time-averaging of said modulation signal power over a sliding time window that substantially exceeds the period $2\pi/\omega$ of the LO carrier, but is on the order of or less than a period $T_m$ associated with the modulation. In the embodiment described herein, an envelope of a modulation signal s(t) is obtained using the power, i.e. square, detector 240 having a response time $\tau$ satisfying a relationship $2\pi/\omega \ll \tau \ll \sim T_m$, where $T_m$ is the modulation period of the I and Q signals, and therefore, of the RF output signal s(t). Note that in other embodiments, the envelope function of the output signal s(t) can be obtained using an alternative envelope detector 240, e.g. a linear or a logarithmic envelope detector, so that the shape of the envelope function S(t) can differ in alternative embodiments.

In an ideal case with no distortions, the envelope function $S_0(t)$ of the output signal $s_0(t)$, as detected by the power detector 240, would satisfy the following relationship (9):

$$S_0(t) \sim I^2 + Q^2 = P_{ideal}(t), \tag{9}$$

where $P_{ideal}(t)$ is the average instantaneous power of the ideal, non-distorted output signal $s_0(t)$, resulting in a sequence of signal samples $P_{ideal}(l) = P_{ideal}(t_l)$, provided to the DSP 245, wherein $t_l$, l=1, ..., denotes different time instances at which the A/D converter 223 samples the power signal P(t) as received from the LPF 233.

When the uncompensated distortions in the QT 100 circuit are taken into account, the power detector 240 provides to the LPF 223 a signal proportional to the envelope function S(t) of the actual output signal s(t), $$S(t) \approx V^2 + U^2 = P_{actual}(t), \tag{10}$$

where $P_{actual}(t)$ is the power of the actual output signal s(t) as detected by the detector 240. This envelope signal, after filtering by the LPF 233, is sampled by the A/D 223, which provides to the DSP 245 a sequence of actual signal samples $p_{actual}(n) = P_{actual}(t_n)$.

DSP 245 processes the received signal samples to determine the distortion compensation information. First, DSP 245 determines statistical distribution information, also referred to herein as the output distribution information or the output type information, for the modulated output signal s(t) by i) collecting in an associated buffer a suitably large number of the signal samples $p_{actual}(l)$ so to obtain a plurality of signal samples $\{p_{actual}(l), l=1, \ldots, L\} = \{p_{actual}\}_L$, where L is a suitably large number, and ii) sorting said plurality of signal samples in logical bins, e.g. according to their magnitude to obtain a histogram representing the PDF of the output signal s(t) reflecting statistical properties thereof.

Figure 5B:
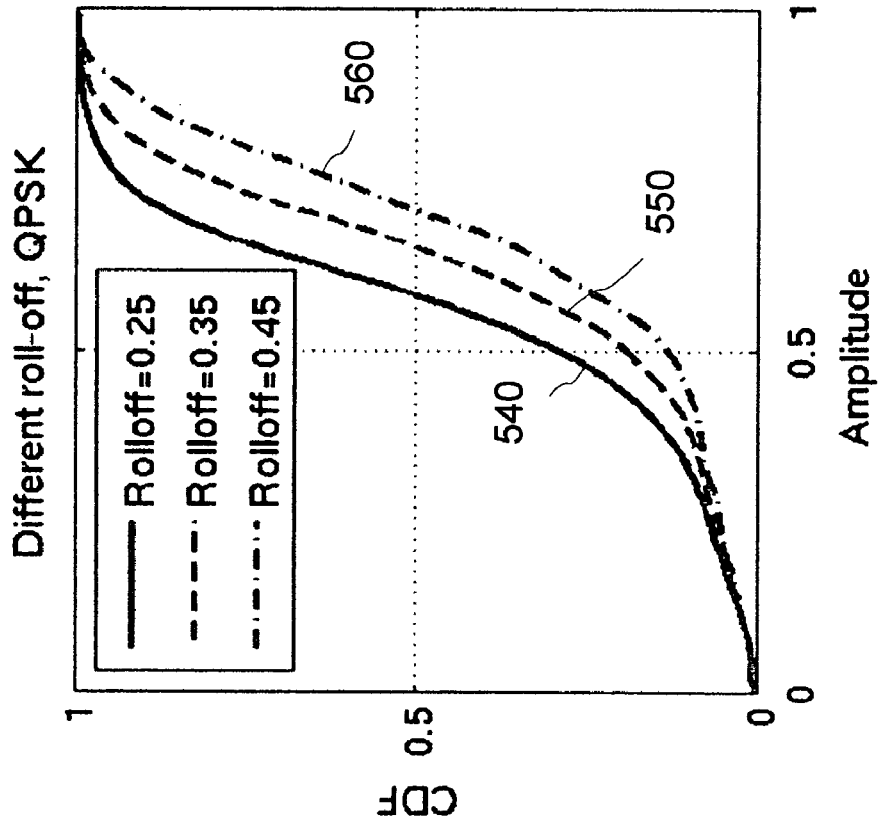
FIG. 5B is a graph illustrating the envelope cumulative distribution function for different roll-off characteristics of a square-root raised cosine pulse-shaping filter.
Figure 5A:
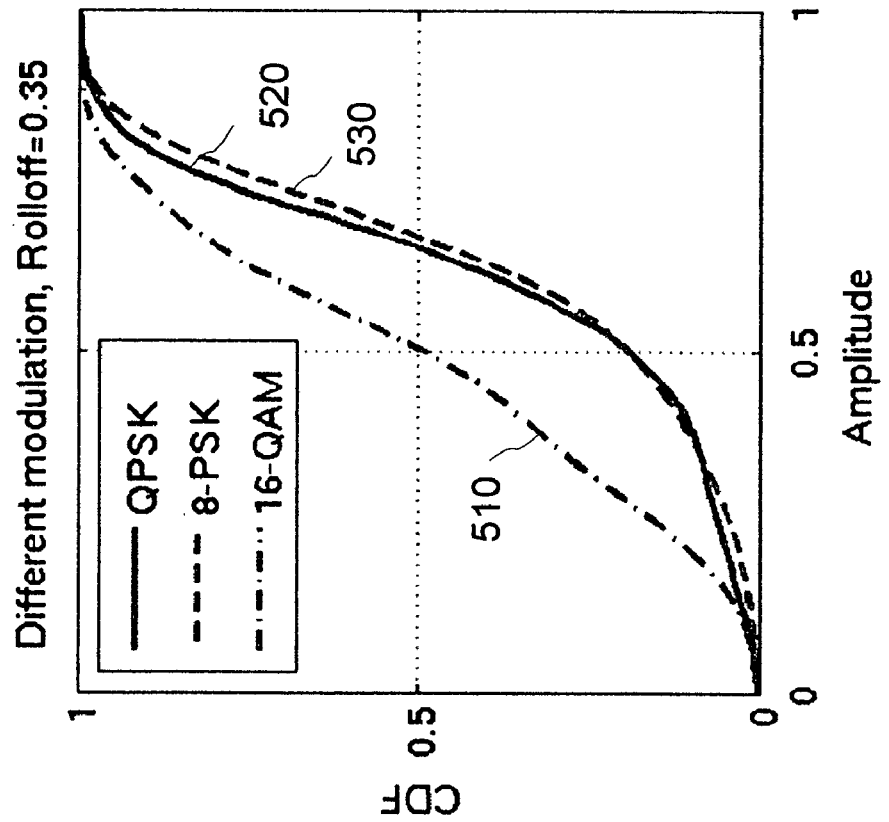
FIG. 5A is a graph illustrating the envelope cumulative distribution function for different modulation formats.

In one embodiment, the PDF of the actual output signal obtained in this way, which will be denoted hereinbelow as $PDF_{actual}$, is directly used as the output distribution information to assess the presence of distortions in the output signal s(t) by comparing it to a reference PDF of an "ideal" modulated signal, denoted as $PDF_{ideal}$, as described hereinbelow. In another embodiment described more in detail hereinbelow, the DSP 245 computes the CDF of the plurality of the output signal samples $\{p_{actual}\}_L$, e.g. by integrating the previously determined $PDF_{actual}$ according to formula (11):

$$CDF_{actual}(m) = \sum_{j=1}^{m} PDF_{actual}(j), m = 1, 2, \ldots, B, . \tag{11}$$

where B is the number of bins in the PDF histogram. By way of example, FIG. 5A shows simulated cumulative distribution functions (CDF) 520, 530 and 510 for signals modulated using the QPSK, 8-PSK and 16-QAM modulation formats, respectively, with the same pulse-shaping function; FIG. 5B shows simulated CDFs 540, 550 and 560 of QPSK modulated signals with different pulse-shaping functions. These figures clearly show that statistical properties, i.e. type information, of a signal envelope differ depending on the modulation scheme and/or the pulse-shaping function used to generate the I and Q signals.

When the vector modulator 150 is characterized by gain, phase imbalances and/or DC offset, its output statistics are distorted. Provided that characteristics of the vector modulator 150 have no discontinuities, a deviation in the modulator output statistics from corresponding statistics of an ideal vector modulator without distortion can be related to the particular gain/phase imbalances and the DC offsets.

Figure 6:
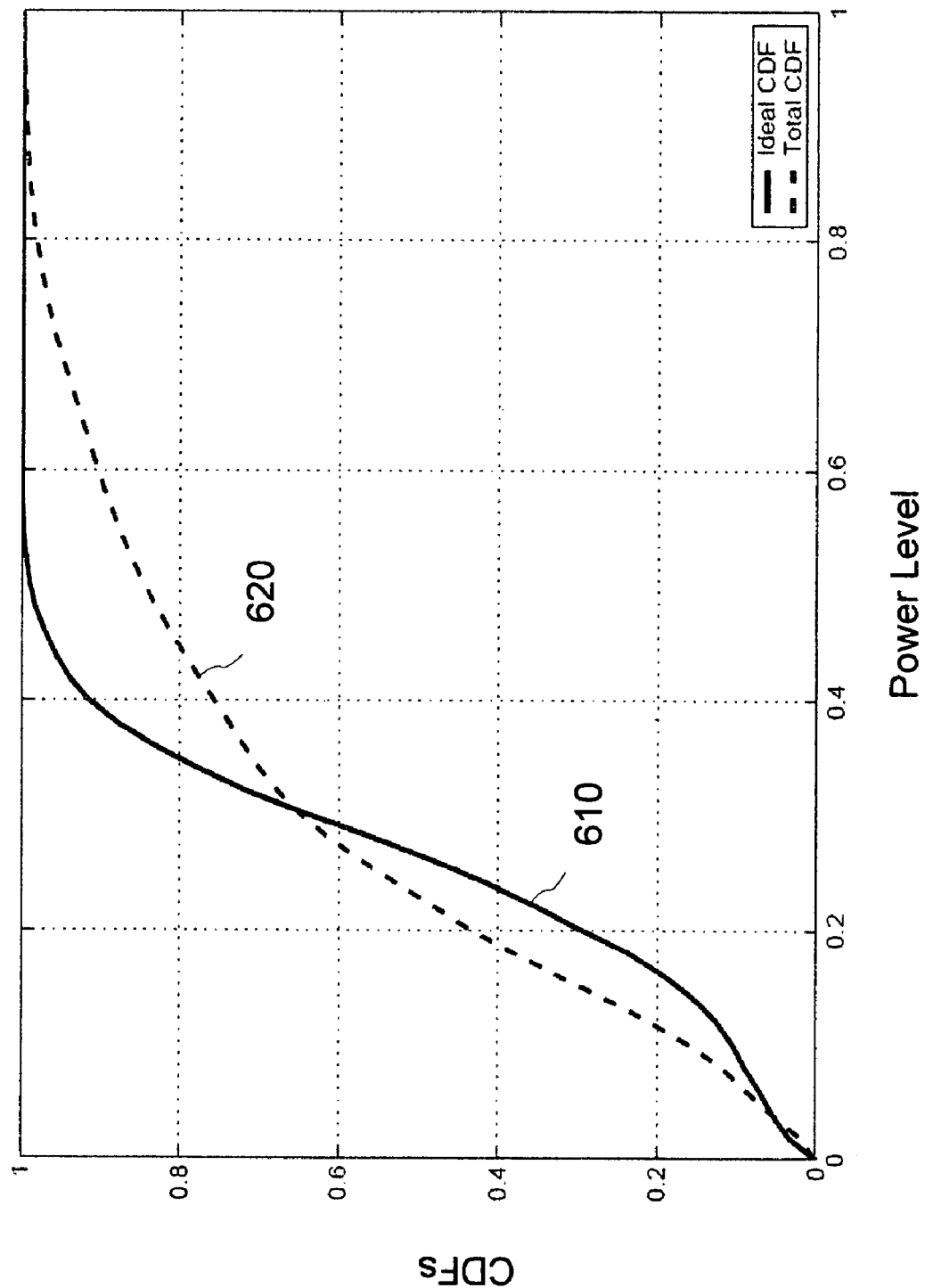
FIG. 6 is a graph illustrating the effect of circuit distortion on the envelope cumulative distribution functions for a QPSK signal.

By way of example, curve 610 in FIG. 6 illustrates $CDF_{ideal}$, i.e. the CDF of the modulator output envelope for an ideal output QPSK signal with a square-root raised-cosine (SQRC) filtering with 0.35 roll off, while a curve 620 shows $CDF_{actual}$, i.e. the CDF of an otherwise similar QPSK signal, but generated in the presence of a gain imbalance characterized by $\alpha_0 = 0.8$, which corresponds to about 68% relative gain imbalance between the I and Q channels, a phase imbalance of $\phi_0 = -20°$, and relative DC offsets of $C_{I,0} = -0.1$ and $C_{Q,0} = 0.1$. The distortion of the CDF due to the gain/phase imbalances and DC offsets is evidenced well in this figure.

In the following we will be referring to a distribution function, for example the PDF or the CDF, corresponding to a plurality of signal samples $p_{ideal}(n)$ of the ideal, distortionless modulated signal $s_0(t)$, as an ideal or reference distribution, or as reference distribution information. A distribution function, e.g. the PDF or the CDF, which is obtained by sampling the actual output signal s(t) detected at the circuit's 200 output with an envelope detector 240, will be referred to as an output distribution or an output distribution information.

According to one embodiment of the invention, the reference distribution information, for example in the form of the reference $CDF_{ideal}(m)$ for the output signal s(t), is stored in memory 290 and in operation is provided to the DSP 245. The reference $CDF_{ideal}(m)$ can be unambiguously generated in advance for any selected modulation format and any selected pulse-shaping function used to generate the I and Q signals. In one embodiment, the memory 290 stores a plurality of reference distributions for a plurality of modulation format/pulse shaping function combinations, which are then selected in operation according to an actual modulation and pulse shaping format used in generating the I and Q signals received in the first and second ports 201, 211 of the self-calibrating QT circuit 200.

Since imbalances in the vector modulator 150 result in a deviation of the actual output distribution function from the ideal one, e.g. as illustrated in FIG. 6, a measure of such deviation can be used as a feedback for determining the pre-distortion parameters for the self-calibrating QT circuit 200 which would result in suppressing the distortions. According to one embodiment of the invention, the DSP 245 computes an objective function $f$ which represents a mean square difference between the output distribution information, e.g. $CDF_{actual}$, and the reference distribution on information, e.g. $CDF_{ideal}$, according to the following equation:

$$f_{CDF}(\alpha, \phi, CI, CQ) = \sum_{m=1}^{B} (CDF_{actual}(m) - CDF_{ideal}(m))^2 \quad (12)$$

where the notation used in the left-hand-side (LHS) of equation (12) indicates that the reference/output distribution information used in this embodiment to compute the objective function is the CDF, and that the objective function is a single-valued function that depends on the set gain, phase and DC-offset pre-distortion parameters.

Figure 8B:
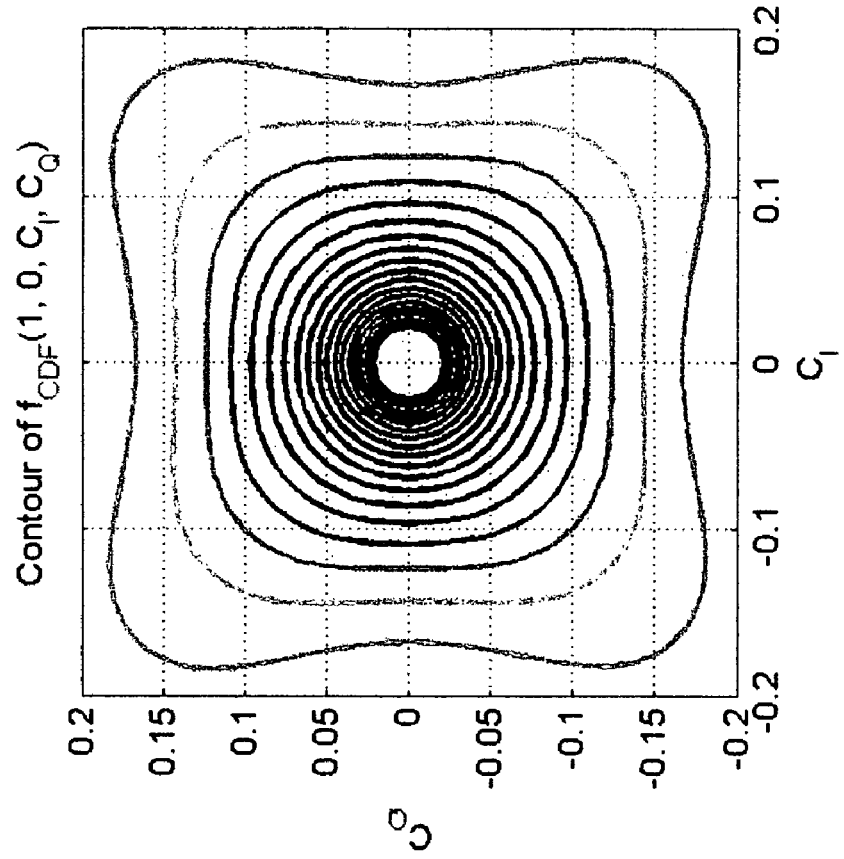
FIGS. 8A and 8B are contour plots of graphs shown in FIGS. 7A and 7B illustrating the objective function in dependence on the gain and phase imbalances and DC offsets, respectively.
Figure 8A:
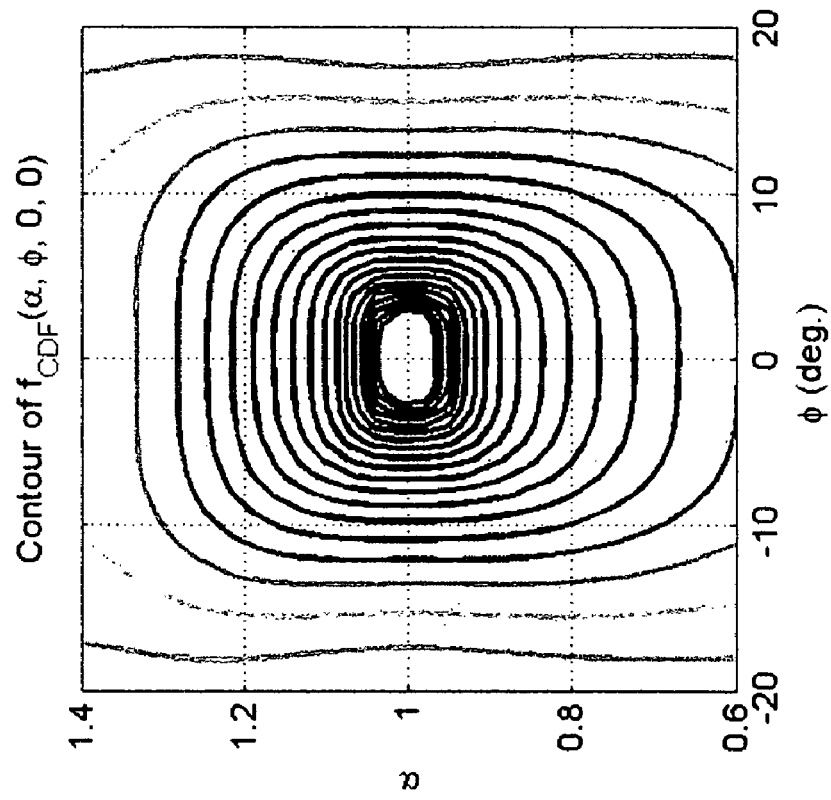

By way of example, FIG. 7A illustrates the objective function defined by equation (12) in dependence on gain and phase imbalances in the circuit 200, while FIG. 7B illustrates the objective function in presence of DC offsets. Note that in these figures, the gain, phase imbalances and DC offsets are the respective net imbalances of the whole self-calibrating circuit 20, including the pre-compensator 210 and the QT circuit 100. FIGS. 8A and 8B show the same function as contour plots on ($\alpha,\phi$) and ($C_I$, $C_Q$) planes, respectively. Advantageously, the shown 3D functions have a smooth surface with a single minimum corresponding to a full compensation of all imbalances and DC offsets in the circuit, as can be clearly seen from the FIGS. 7A-8B.

Therefore, based on the objective function of Equation (12), the problem of determining distortion compensation information, i.e. finding a set of compensation parameters {$\alpha$, $\phi$, $C_I$, $C_Q$} that eliminates or at least decreases the overall signal distortions in the circuit 200, is reduced to the problem of finding a minimum of the objective function (12); using conventional mathematical notation, this minimization problem can be formulated as follows:

$$(\alpha, \varphi, C_I, C_Q) = \arg\left\{\min_{\alpha,\varphi,C_I,C_Q} f_{CDF}(\alpha, \varphi, C_I, C_Q)\right\} \quad (13)$$

Various prior-art minimization techniques can be used to find the location of the minimum said location providing estimates of the compensation parameters {$\alpha$, $\phi$, $C_I$, $C_Q$} that substantially compensate for the overall circuit distortions; one skilled in the art would be able to select a suitable minimization technique given the constraints of a particular implementation.

Once a set of compensation parameters that substantially minimize or at least decrease the objective function is determined, the DSP 245 computes therefrom the scaling coefficients $h_{ij}$ using equations (6), and passes the computed values of the scaling coefficients, together with the found values of the DC-offset pre-compensation parameters, to the pre-compensation circuit 210 for setting values of the multipliers 203, 202, 212 and 213, and to set DC offset values stored in storage elements 221 and 222, so as to suitably modify the first and second input signals I(t) and Q(t) before passing them onto the first circuit 100.

According to the invention, the general steps of determining optimal values of the compensation parameters so as to substantially minimize the objective function are performed iteratively until a predetermined condition is satisfied, e.g. the objective function reaches a pre-defined threshold value, or a pre-defined maximum number of iterations is reached. In other embodiments, the iterations can continue indefinitely during normal operation of the circuit 200 to adaptively adjust the circuit's parameters to changing environmental conditions.

Generally, the method of the present invention for compensating of the multi-port circuit distortions includes the following iterative steps:

sampling the output signal to determine an output distribution information;

determining an objective function from the reference distribution information and the output distribution information;

determining distortion compensation information for the plurality of input signals based on the objective function; and, based on the distortion compensation information, modifying at least one of the input signals so as to add a controlled amount of cross-correlation between the first and a second of the plurality of input signals to reduce distortion of the output signal.

The method is also referred to herein as the type-based method, since it uses type information, which is understood herein in its statistical meaning, i.e. as a statistical distribution function or histogram as described hereinabove, to assess the presence of distortions in the output signal or signals. Advantageously, a relatively low-rate sampling of the output signal or signals, which can be substantially smaller than the modulation bandwidth of the input signals and therefore does not require high-speed data or signal processing or complex hardware, is suitable for obtaining the required statistical distribution, or type, information.

An exemplary embodiment of a method for iteratively determining the distortion compensation information using the objective function as a feedback parameter in accordance with the present invention will now be described with reference to FIGS. 9-15. In this embodiment, the method is based on a minimization technique which is referred to herein as the alternate 1-dimensional search approach. One skilled in the art would appreciate that other more sophisticated techniques, such as the method of steepest descent, or the Newton's method, may enable a faster convergence at the potential expense of a higher computational complexity.

Figure 9:
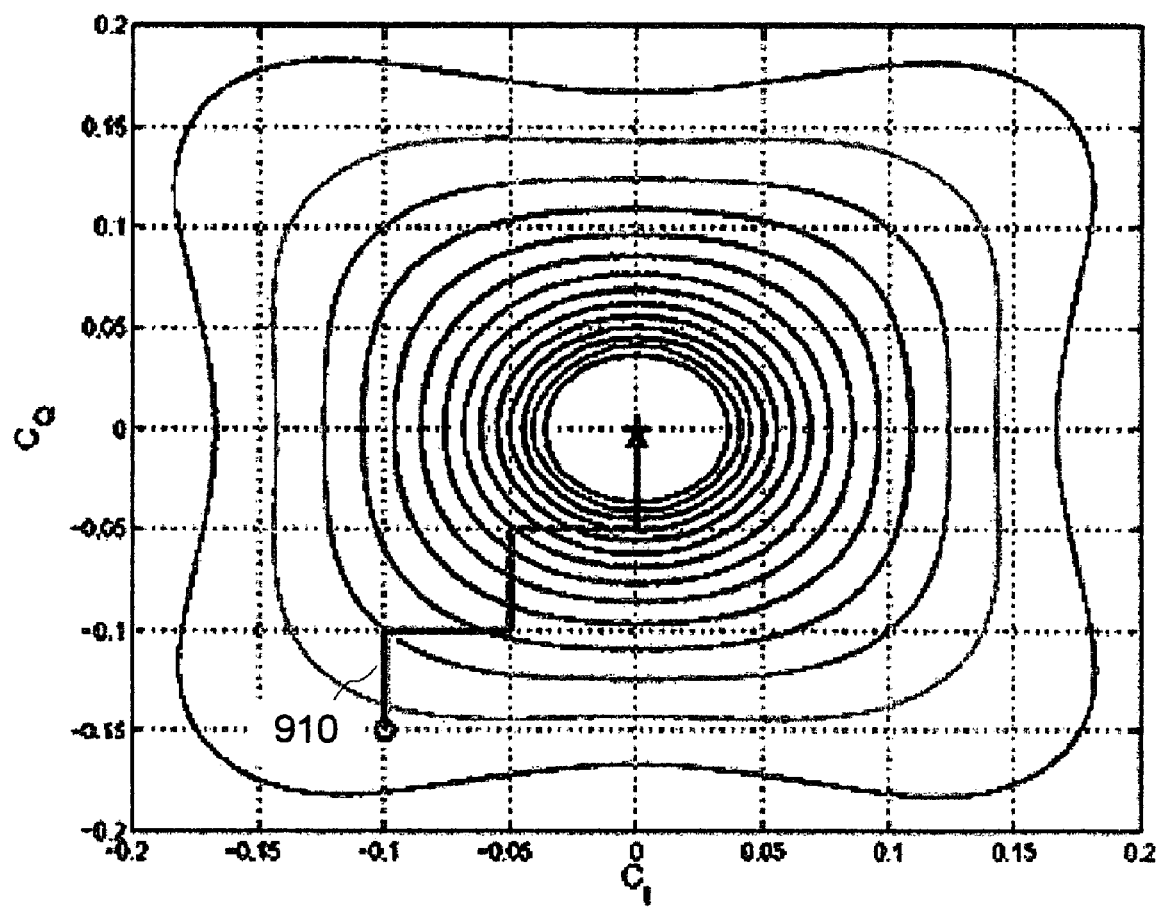
FIG. 9 is diagram illustrating the alternate one-dimensional search for a minimum of the objective function.

The alternate 1-dimensional search approach is substantially a sequence of alternate 1-dimensional searches, each of them locating a lower point on the error surface of the objective function $\theta_{CDF}(\alpha,\phi,C_I,C_Q)$ along one of the four pre-compensation parameters($\alpha,\phi,C_I,C_Q$). Once a lower point is found, the corresponding parameter value is updated to the one that yields the smaller value of $\theta_{CDF}(\alpha,\phi,C_I,C_Q)$. The alternate 1-dimensional search is schematically illustrated in FIG. 9 in the DC offset plane ($C_I$, $C_Q$), showing a contour plot of the objective function on said plane. In the figure, symbol "o" identifies the starting point, "+" identifies the destination, i.e. the point of optimal DC offset distortion compensation, and the zigzag line 910 therebetween shows the path with a fixed step size going from the starting point to the destination i.e. the minimum. This technique can be easily implemented within the self-calibrating QT circuit 200 with the pre-compensation block 210 and the DSP based feedback/measurement circuit 250 shown in FIG. 4.

Figure 10:
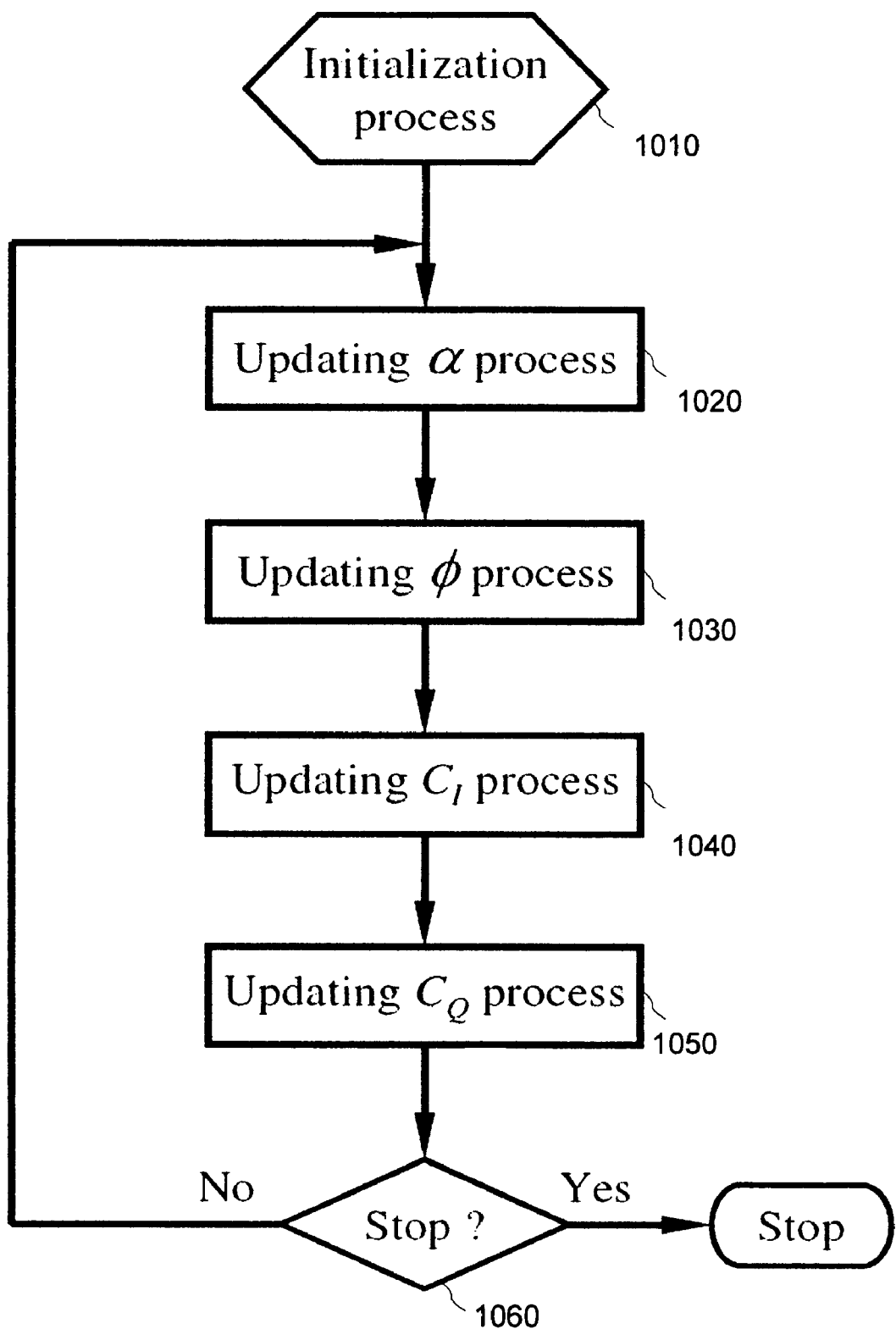
FIG. 10 is a flow-chart illustrating general steps of the iterative method of updating pre-distortion parameters of the self-calibrating transmitter of the present invention.

With reference to FIG. 10, one iteration of the alternate 1-dimensional method of determining the pre-compensation parameters for the self-calibrating circuit 200 includes the following general steps:
Step 1010—Initialization,
Step 1020—Updating α,
Step 1030—Updating φ,
Step 1040—Updating $C_I$,
Step 1050—Updating $C_Q$.

The steps 1010-1050 will also be referred to hereinafter as sub-process 1010-1050, as each of them in turn involves a number of steps of a lower level.

In one embodiment, at the end of step 1050, the DSP 245 checks if a pre-determined condition is met, and if not—the process returns to step 1020, but generally with new values of pre-condensation parameters and new values of corresponding scaling coefficients set in the pre-compensation circuit 210.

Note also that the steps 1010-1050 are preferably performed during normal operation of the self-calibrating QT circuit 200, while it receives the first and second input modulation signals carrying a sequence of information symbols, and forms therefrom the modulated output RF signal s(t) for outputting from the output port 155.

Turning now to FIGS. 11-15, flowcharts are shown illustrating how each of the steps 1010-1050 is implemented in one embodiment of the self-calibrating circuit 200 of the invention.

To facilitate the description, the following notations and parameters are introduced: pre-compensation parameter matrix $$CM(\alpha, \phi, C_I, C_Q) = \begin{pmatrix} h_{11} & h_{21} & C_I \\ h_{12} & h_{22} & C_Q \end{pmatrix}, \quad (14)$$

and increments, or step sizes $\Delta_\alpha$, $\Delta_\phi$, and $\Delta_C$ of the pre-compensation parameters α, φ, $C_I$, and $C_Q$, respectively, which are used in the iterative updating of said parameters. Depending on the performance requirement, either fixed or variable step sizes can be adopted.

Figure 11:
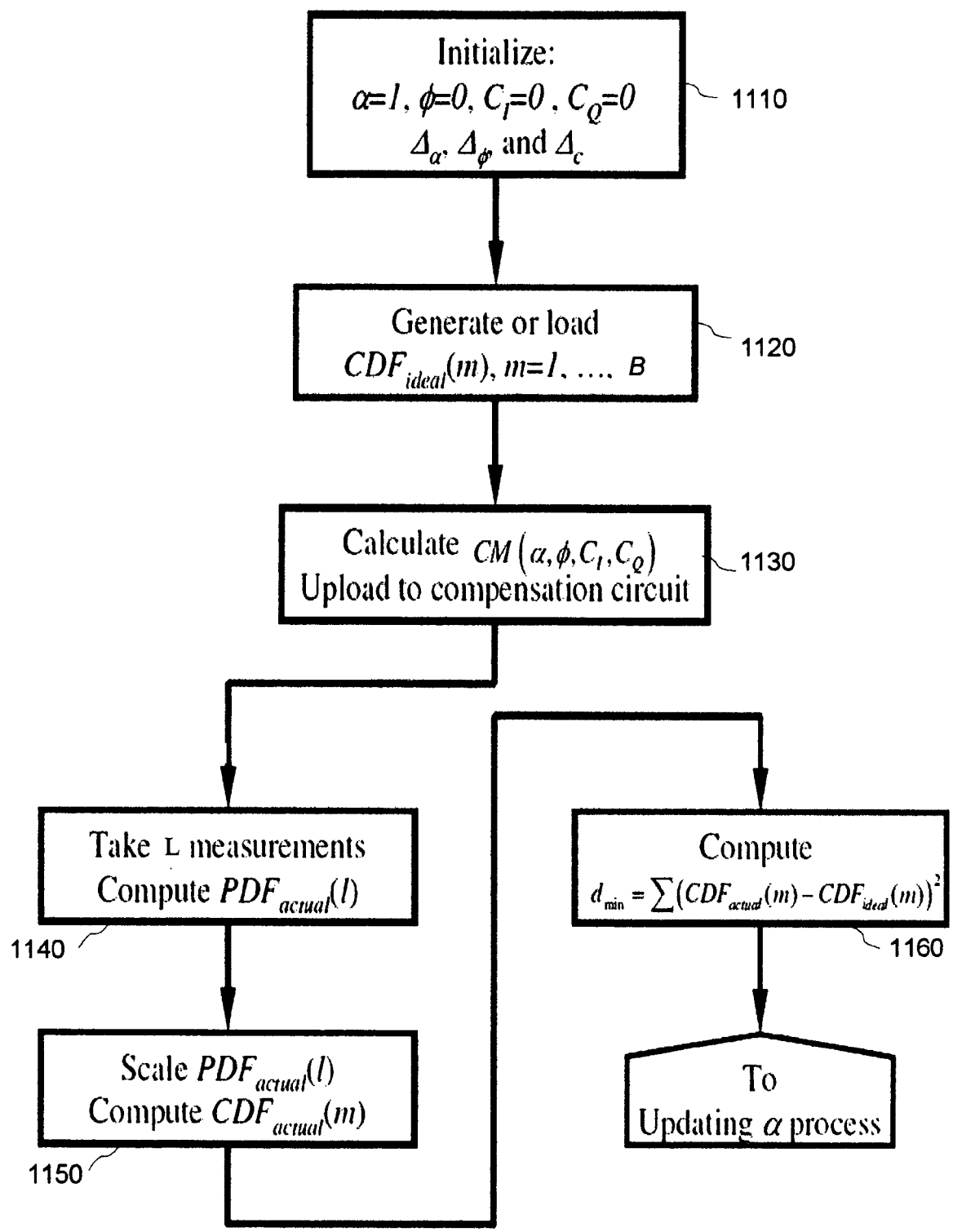
FIG. 11 is a flow-chart of the initialization sub-process of the iterative method according to FIG. 10.

With reference to FIG. 11, during the initialization step 1010 the DSP 245 performs the following operations:

In a step 1110, computer code for performing the alternate 1-dimensional search of the optimal pre-compensation parameters is loaded, and variables of said computer code are initialized; this step includes initialization of variables corresponding to the pre-compensation parameters α, φ, $C_I$, and $C_Q$. By way of example, this initialization can be performed as follows:

$$\alpha=1, \phi=0, C_I=0, \text{ and } C_Q=0 \quad (15)$$

The step size parameters $\Delta_\alpha$, $\Delta_\phi$, and $\Delta_C$ are also initialized in this step according to the performance requirement, with smaller steps leading to a slower convergence of the process but a more stable steady state.

In a next step 1120, the reference distribution information, for example the reference CDF corresponding to an ideal, non-distorted output signal $CDF_{ideal}(m)$ (m=1,2, ..., B), is loaded from the memory 290, or generated by the DSP 245 on the bases of a selected modulation format and selected pulse shaping function.

In a next step 1130, the initial pre-compensation matrix CM(1,0,0,0) is computed and uploaded to the pre-compensation circuit 210.

Next, in a step 1140 the envelope sampling circuit 255 performs L power measurements on the resulting output signal s(t) as described hereinabove, producing L signal samples p(l) (l=1,2, ..., L) which are provided to the DSP 245. The DSP 245 computes the $PDF_{actual}(m)$ (m=1,2, ..., B) using the histogram approach.

In a next step 1150, the $PDF_{actual}(m)$ is scaled in the DSP 245 as required, which then obtains therefrom the corresponding output distribution information represented as $CDF_{actual}(m)$.

Next, in a step 1160 the objective function is computed from the reference and output distribution information using equation (12), and the value obtained is assigned to a current objective function minimum $d_{min}$:

$$d_{min} = \sum_{m=1}^{B} (CDF_{actual}(m) - CDF_{ideal}(m))^2 \quad (16)$$

Figure 12:
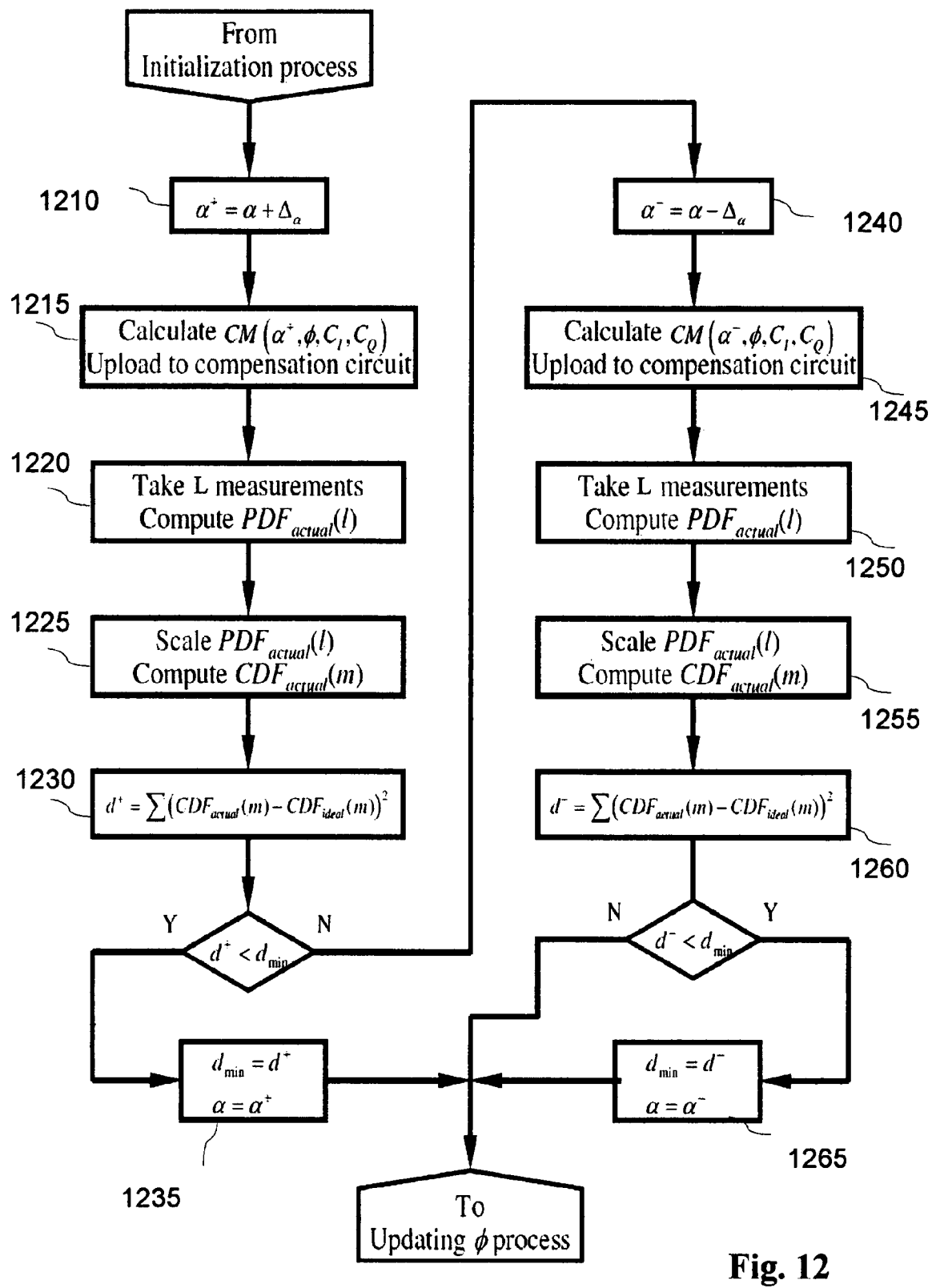
FIG. 12 is a flow-chart of the process of updating the gain compensation parameter in the iterative method according to FIG. 10.

Next, the processing switches to the sub-process 1020—'α update', which is illustrated by a flow chart shown in FIG. 12. This sub-process searches along the α-axis for a smaller value of the objective function $f_{CDF}(\alpha,\phi,C_I,C_Q)$. First, the current value of the gain pre-compensation parameter α is incremented by (+$\Delta_\alpha$) to see whether a smaller value of the objective function is obtained. If not, the current value of the gain parameter α is incremented by (-$\Delta_\alpha$), or decremented, after which the objective function test is performed again.

Turing now to FIG. 12, the 'updating α' sub-process 1020 includes the following sequence of operations:

First, in a step 1210 the current value of the α parameter is incremented by +$\Delta_\alpha$, yielding an incremented α value $\alpha^+=\alpha+\Delta_\alpha$.

Next steps 1215, 1220, 1225 and 1230 substantially repeat the hereinabove described steps 1130, 1140, 1150 and 1160, yielding an updated value of the objective function $f_{CDF}$, which is then assigned to a parameter $d^+$ and compared to the current minimum value $d_{min}$ of the objective function. If $d^+ < d_{min}$, the values of $d_{min}$ and the gain compensation parameter α is updated in a next step 1235 according to the update equations $$d_{min}=d^+, \text{ and } \alpha=\alpha^+, \quad (17)$$

and the processing switches to the 'φ update' sub-process 1030. Otherwise, in a next step 1240 the current value of the α parameter is incremented by (-$\Delta_\alpha$), yielding a decremented α value $\alpha^-=\alpha-\Delta_\alpha$. Next steps 1245, 1250, 1255 and 1260 again substantially repeat the sequence of steps 1130, 1140, 1150 and 1160, resulting again in an updated value of the function, which is assigned to a parameter $d^-$ and then compared to the current objective value $d_{min}$ of the objective function.

If $d^- < d_{min}$, the values of $d_{min}$ and the gain compensation parameters α is updated in a next step 1265 according to the update equations $$d_{min}=d^-, \text{ and } \alpha=\alpha^-, \quad (18)$$

and the processing switches to the 'φ update' sub-process 1030.

Figure 13:
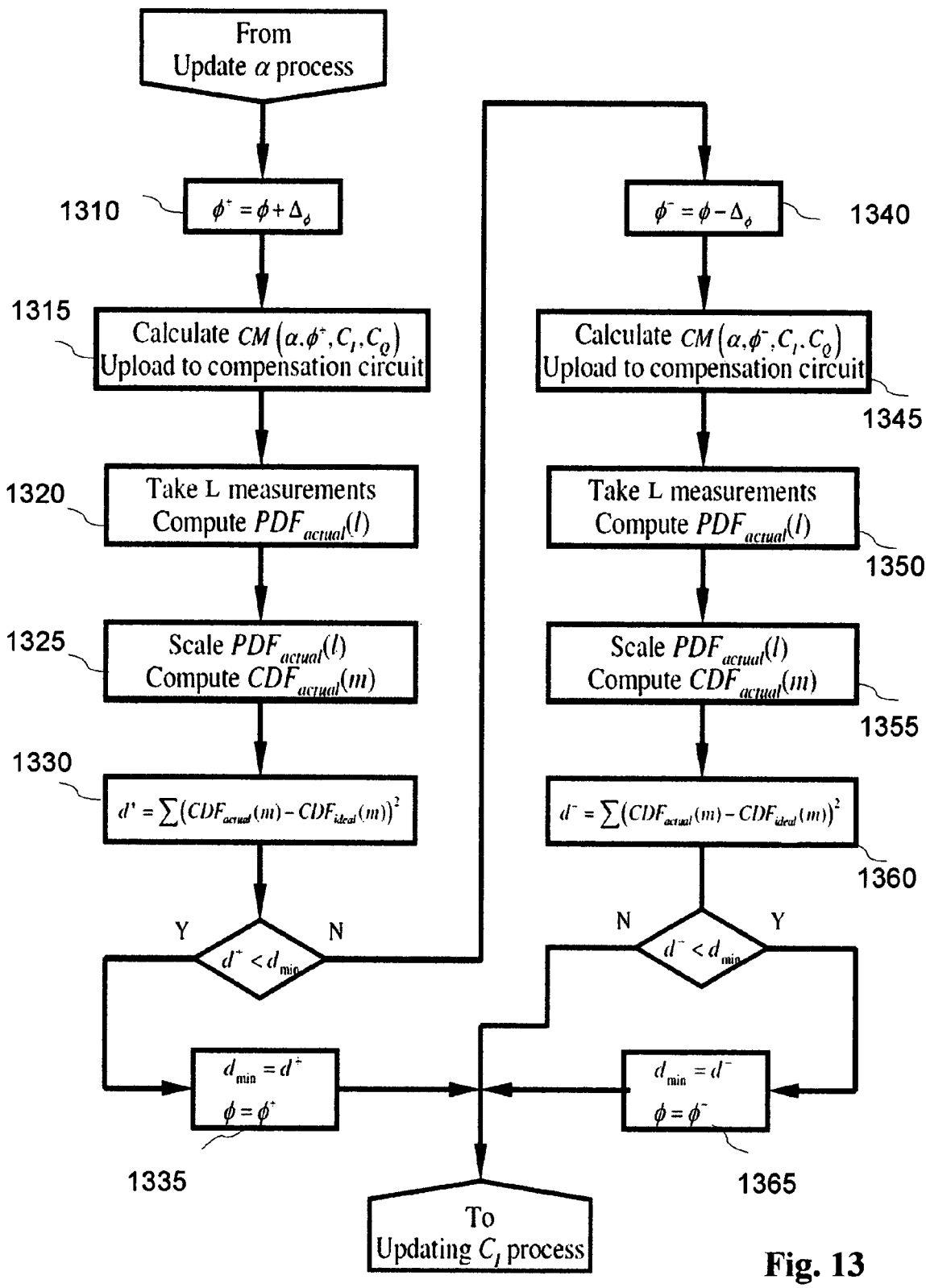
FIG. 13 is a flow-chart of the process of updating the phase compensation parameter in the iterative method according to FIG. 10.
Figure 14:
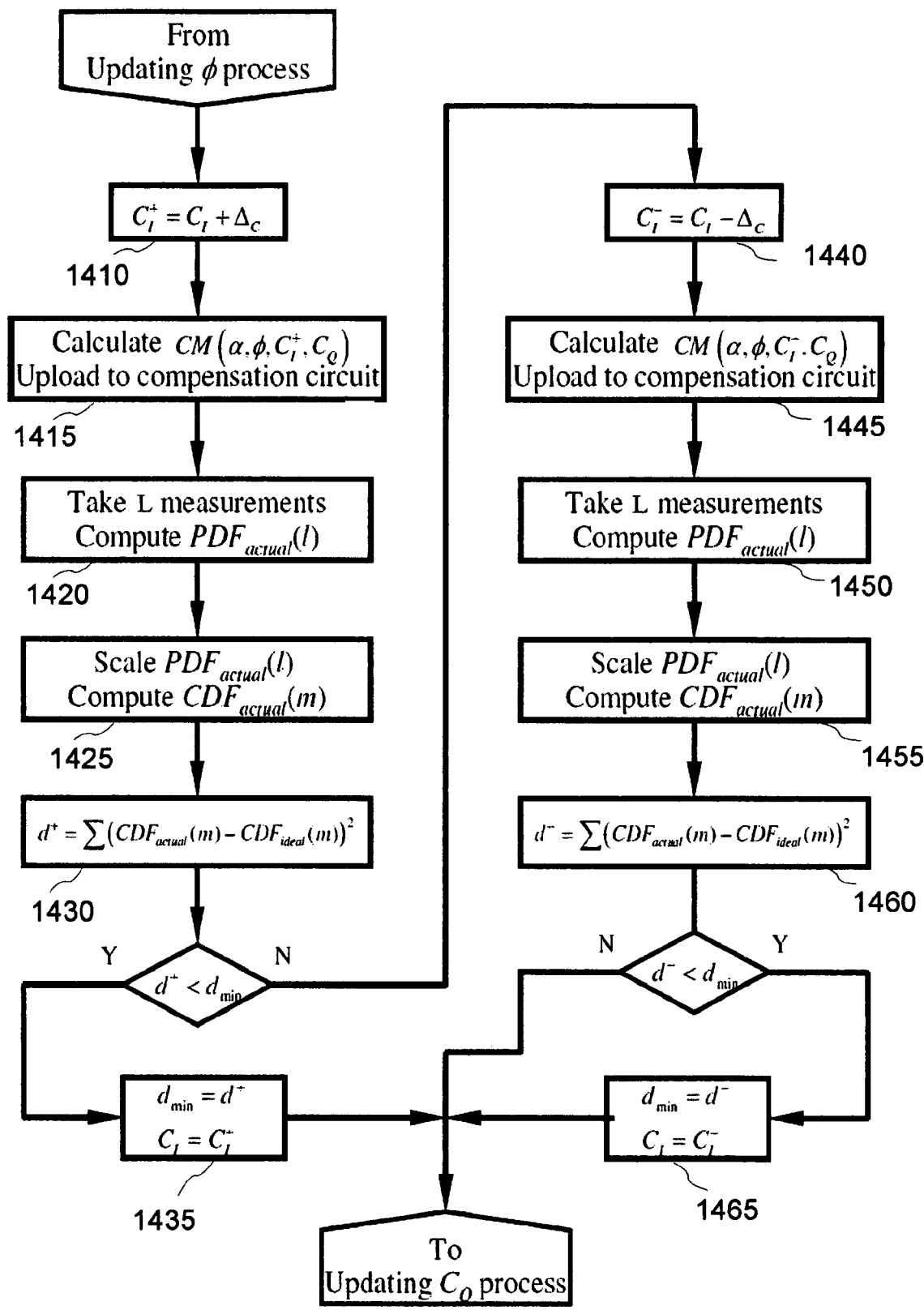
FIG. 14 is a flow-chart of the process of updating the I-channel DC offset compensation parameter in the iterative method according to FIG. 10.
Figure 15:
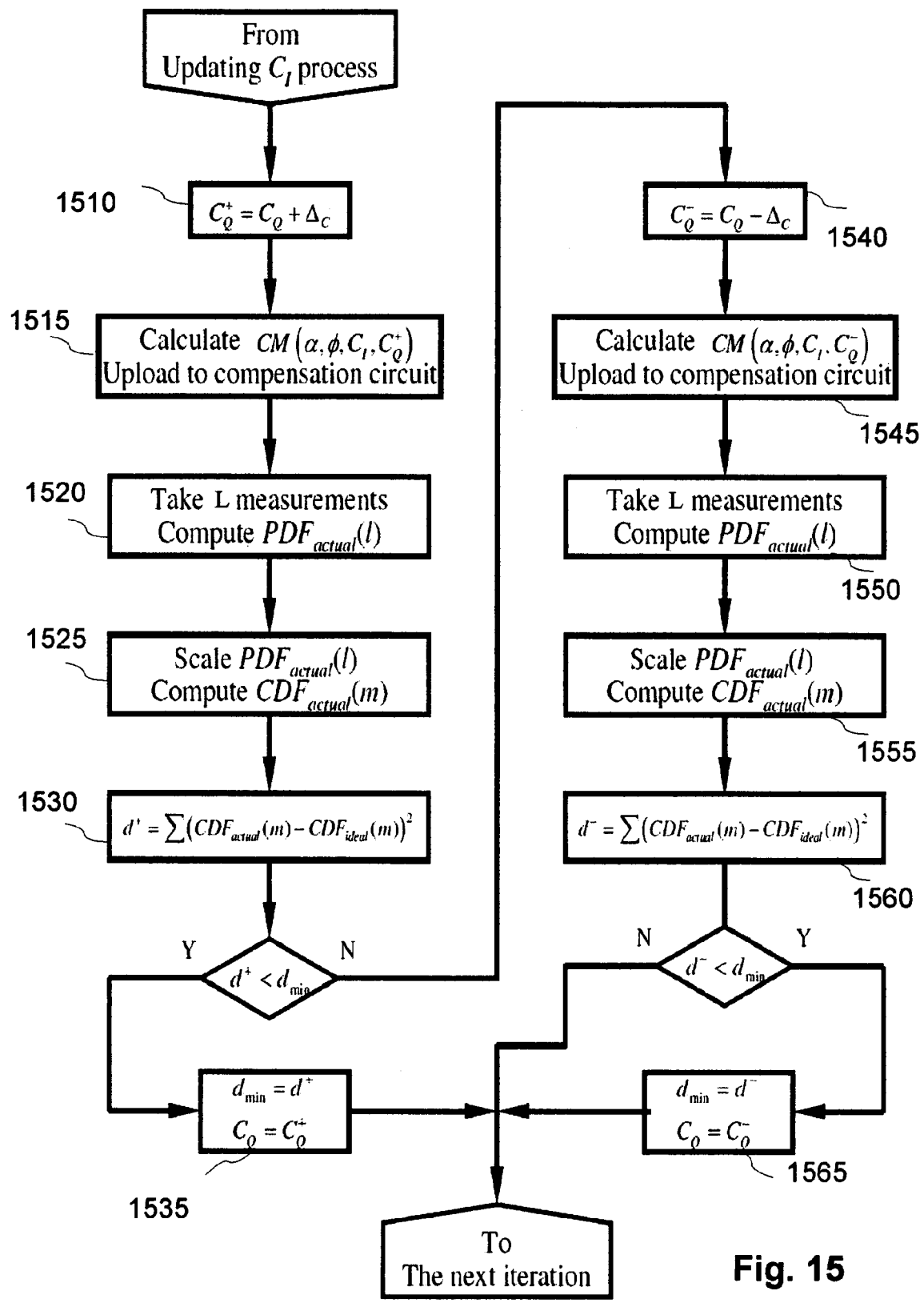
FIG. 15 is a flow-chart of the process of updating the Q-channel DC offset compensation parameter in the iterative method according to FIG. 10.

The 'φ-update' sub-process 1030, the '$C_I$ update' sub-process 1040, and the '$C_Q$ update' sub-process 1050 are illustrated in FIGS. 13-15, and in the current embodiment are performed in substantially the same way as the aforedescribed 'α-update' sub-process 1020 shown in FIG. 12, and therefore will not be described herein in further detail.

In essence, the sub-process 1030 includes the same steps as the 'α update' sub-process 1020 does, except that it searches along the φ-axis for a smaller value of the objective function $f_{CDF}(\alpha,\phi,C_I,C_Q)$. At the end of the process, the parameter φ is updated to the new value that results in a smaller value of the objective function.

Similarly, the sub-process 1040 includes the same steps as the 'α update' sub-process 1020 and the 'φ update' sub-process 1030, except that it searches along the $C_I$-axis for a smaller value of the objective function $f_{CDF}(\alpha,\phi,C_I,C_Q)$. At the end of the process, the parameter $C_I$ is updated to the new value that results in a smaller value of the objective function. And finally, the sub-process 1050 includes the same steps as the '$C_I$ update' sub-process 1040, except that it searches along the $C_Q$-axis for a smaller value of the objective function $f_{CDF}(\alpha,\phi,C_I,C_Q)$. At the end of the process, the parameter $C_Q$ is updated to the new value that results in a smaller value of the objective function.

In one embodiment, the steps 1020-1050 of updating the compensation parameters are iterated until the objective function reaches a suitable value, i.e. until the output distribution information becomes suitably close to the reference distribution information $CDF_{ideal}$. In FIG. 10, the decision step 1060, wherein it is decided if the iterations are to continue, is performed at the end of each compensation parameter update cycle 1020-1050. In other embodiments, the DSP 245 can be programmed to skip one or more of the sub-processes 1020-1050 after a number of iterations if the objective function becomes insensitive to variations of the respective parameter.

Self-Calibrating QT Circuit Performance

Performance of the self-calibrating QT circuit 200 as shown in FIG. 4 programmed to implement the aforedescribed iterative algorithm has been assessed using computer simulations.

By way of example, the first and second input signals I and Q have been selected to provide at the output port a QPSK signal with a pulse shape defined by a 35% roll-off SQRC filter.

Figure 17:
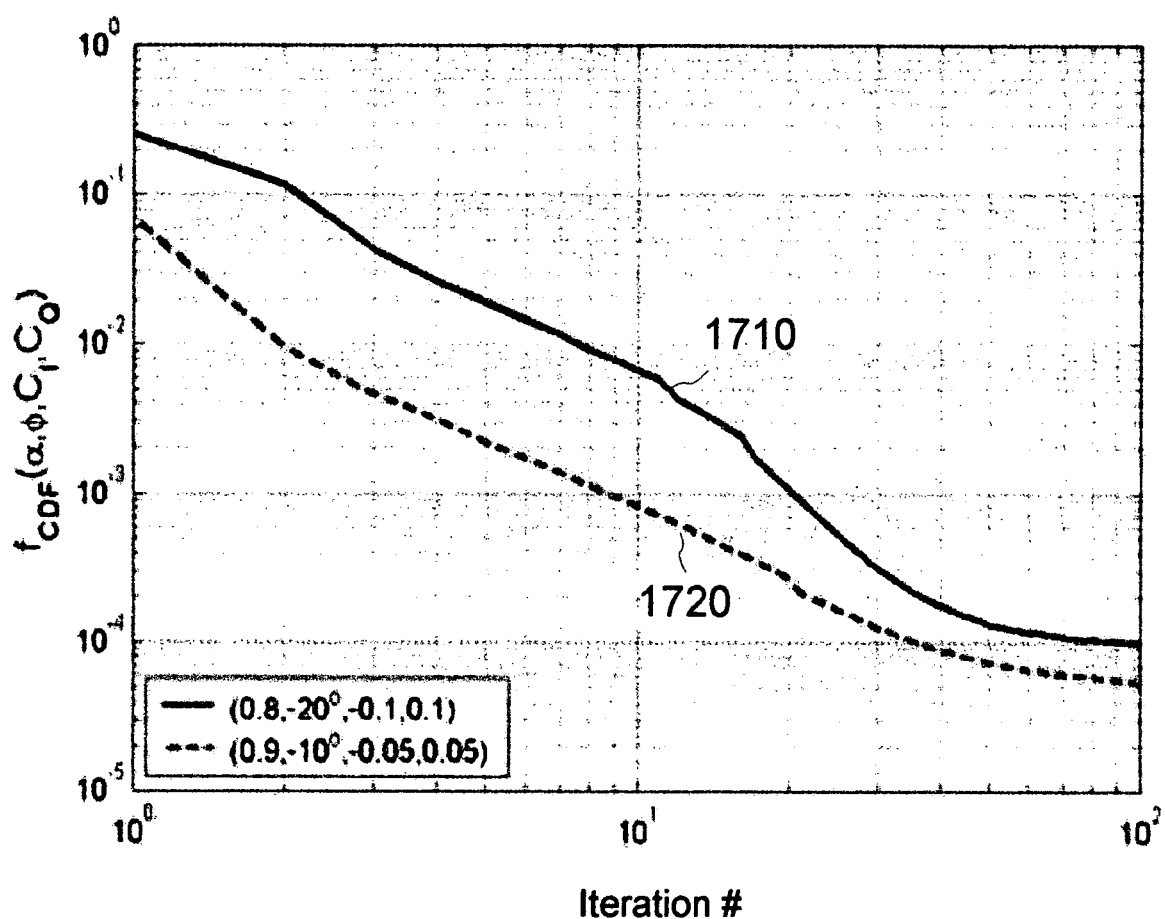
FIG. 17 is a graph illustrating the convergence performance of the QT circuit calibration algorithm in one embodiment of the present invention.
Figure 18:
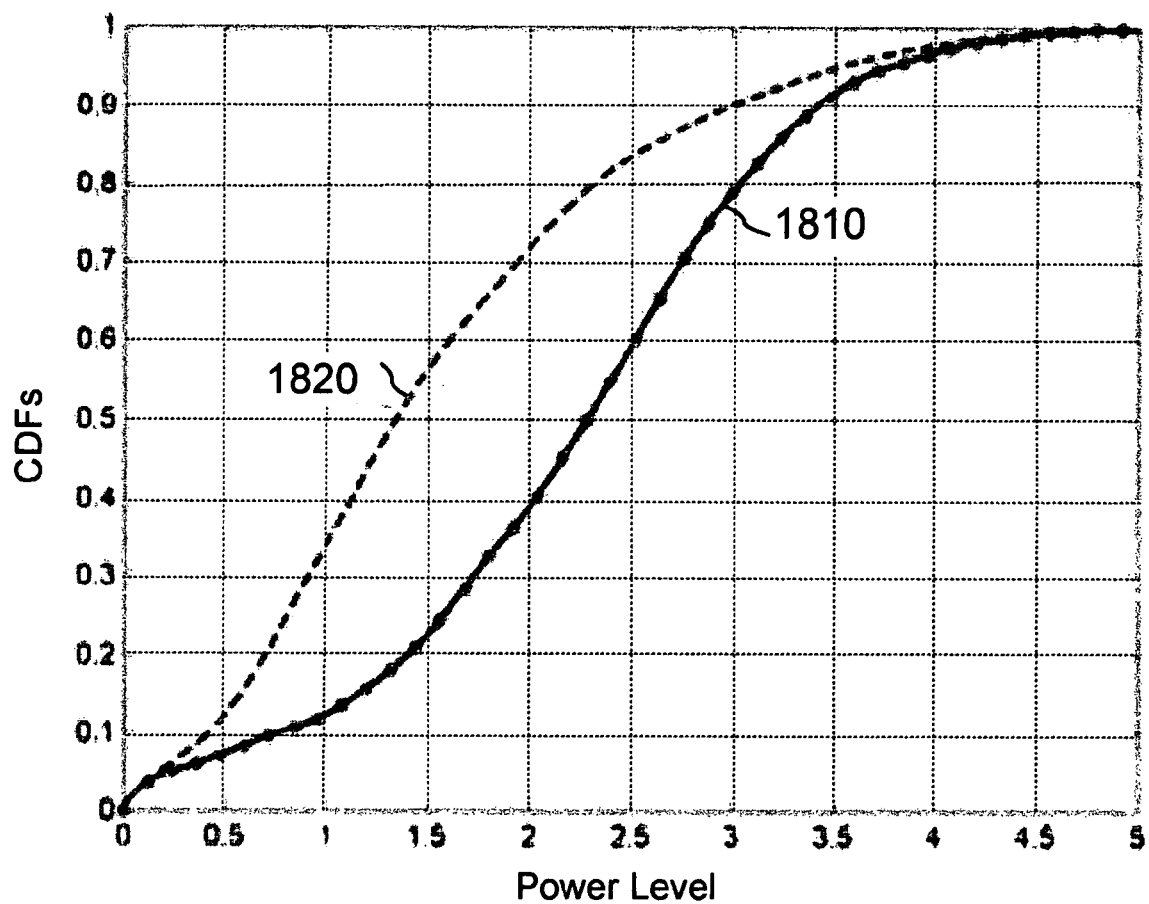
FIG. 18 is a graph illustrating the convergence of the output CDF to a reference, or 'ideal' CDF after the calibration of the self-calibrating QT circuit.

The following relative large imbalances were used in the simulation:

$$(\alpha_o,\phi_o,C_{I,}C_{Q,o})=(0.8,-20°,-0.1,0.1), \quad (20)$$

with the gain imbalance value corresponding to about 3.3 dB power imbalance between the I and Q channels in the vector modulator 150. Results of the simulation with fixed step sizes of $\Delta_\alpha=\Delta_\phi=\Delta_C=0.02$ after 100 iterations are shown in FIGS. 16-18.

Figure 16:
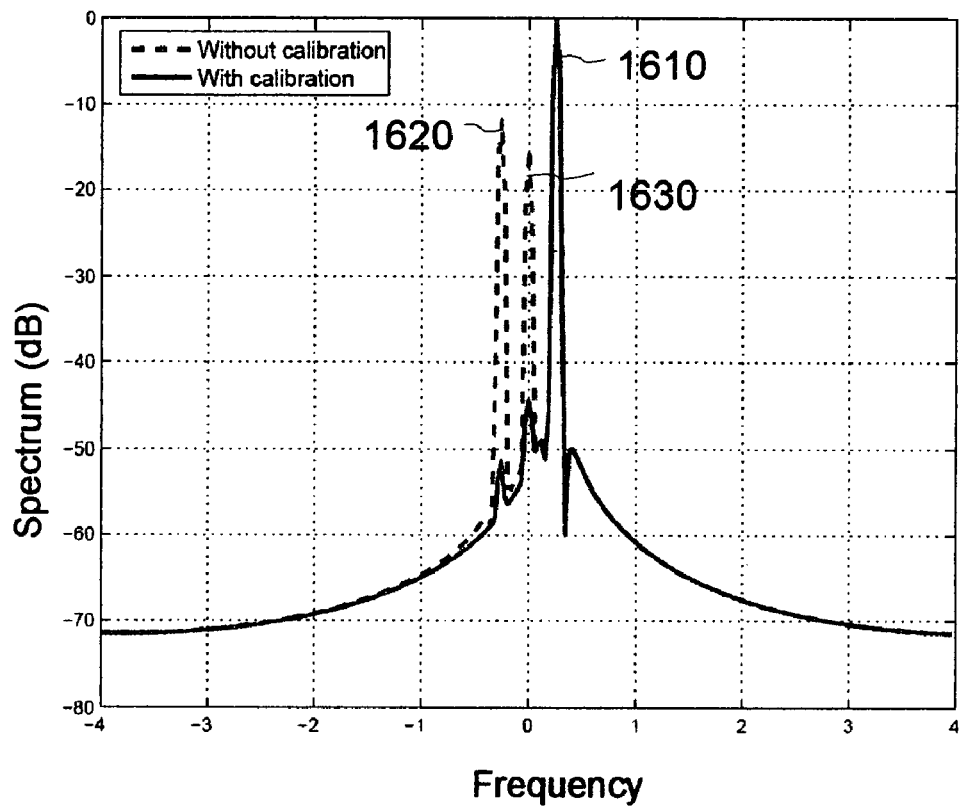
FIG. 16 is a plot showing output spectra of the self-calibrating quadrature transmitter before and after the calibration.

Turning first to FIG. 16, the output signal spectrum is shown before and after the self-calibration process when a single tone is transmitted before and after calibration. Advantageously, the spectrum after the self-calibration process demonstrates a significant suppression of the undesirable frequency peaks 1630 and 1620 corresponding to the LO signal and an image, i.e. an unwanted sideband signal of the modulating tone, respectively.

Advantageously, the self-calibration method of the present invention yields substantially unbiased estimates of the distortion or imbalance parameters of the analogue circuitry of the quadrature transmitter 100 or the vector modulator 150. The estimation accuracy improves significantly with the sample size L. More specifically, in the simulation example the variances of the parameter estimates are significantly reduced as the sample size increases from 80K to 800K. In both cases, the standard deviations of all the parameter estimates are smaller than 1% of the true values, as illustrated in Table 1.

TABLE 1

Means and variances of the parameter estimates for different sample sizes

| | Parameters | | | | | | | |
|---|---|---|---|---|---|---|---|---|
| | α | | φ | | $C_I$ | | $C_Q$ | |
| | True values | | | | | | | |
| | 0.8 | | −20° | | −0.1 | | 0.1 | |
| Measure | Mean | Variance | Mean | Variance | Mean | Variance | Mean | Variance |
| 80K samples | 0.8010 | 2.9634e−5 | −19.9895 | 0.1879 | −0.0999 | 5.7945e−6 | 0.0998 | 4.4497e−7 |
| 800K samples | 0.8001 | 0.4344e−5 | −20.0301 | 0.0025 | −0.0999 | 0.3127e−6 | 0.1000 | 1.2677e−7 |

FIG. 17 illustrates the convergence of the method by showing the objective function $f_{CDF}(\alpha,\phi,C_I,C_Q)$ versus the number of iterations for two exemplary sets of distortion parameters ($\alpha_o$, $\phi_o$, $C_{Io}$, $C_{Qo}$). Curve 1710 represents the objective function versus the iteration number in the case of the large distortions in the circuit 100 as defined by relation (20); one can see that the objective function 1710 falls to about $10^{-4}$ in about 100 iterations. Curve 1720 represents the objective function for 50% smaller circuit distortion parameters ($\alpha_o,\phi_o$, $C_{Io},C_{Qo}$)=(0.9,−10°,−0.05,0.05)|; in this case, the objective function 1720 decreases to the same small level in about 35 iterations. In this example, 800,000 samples were used to calculate the output CDF.

Turning now to FIG. 18, the output $CDF_{actual}$ 1820 of the self-calibrating QT circuit 200 is shown before the aforedescribed iterative technique of the circuit self-calibration was turned on; also shown is the reference distribution $CDF_{ideal}$ represented by a solid curve 1810. The output CDF after 100 iterations of the method is shown by dots that substantially overlap with the reference CDF 1810. FIG. 18, together with the Table 1, indicate an excellent convergence of the method and its ability to correctly calibrate the circuit so to substantially compensate for each of the particular distortions in the QT 100, including the gain, phase imbalances and DC offsets.

Second Embodiment

Self-Calibrating Multi-Port Amplifier Circuit

FIGS. 4-18 illustrate the first embodiment of a multi-port self-calibrating circuit and related method for distortion compensation of the present invention in application to quadrature transmitters. In the following portion of the description we will show that essentially the same approach can be used to provide self-calibration capabilities to other multi-port circuits which operate on multiple input modulated signals and can have internal mismatches and imperfections leading to distortions in output signal or signals.

Accordingly, we will now turn to describing a second embodiment of the present invention, wherein the method of the present invention is applied to calibrating a multi-port amplifier (MPA), and a self-calibrating MPA is provided.

A four-port example of a prior-art MPA is shown in FIG. 1 and has been briefly described hereinabove according to prior art. From the point of view of circuit calibration and compensation for distortions associated with circuit mismatches and imperfections, a main difference from the QT 100 described hereinabove is that an MPA has typically as many output ports as it has input ports, and the number of input ports typically exceeds 2. In a next difference, input signals that an MPA receives may be modulated by differing modulation formats and therefore have differing reference distribution information associated therewith and with the corresponding output signals.

Before turning to a detailed description of the circuit and method of the present invention in this second embodiment, it is instructive to present a mathematical model of a prior-art MPA having N input ports and N output ports.

Figure 19:
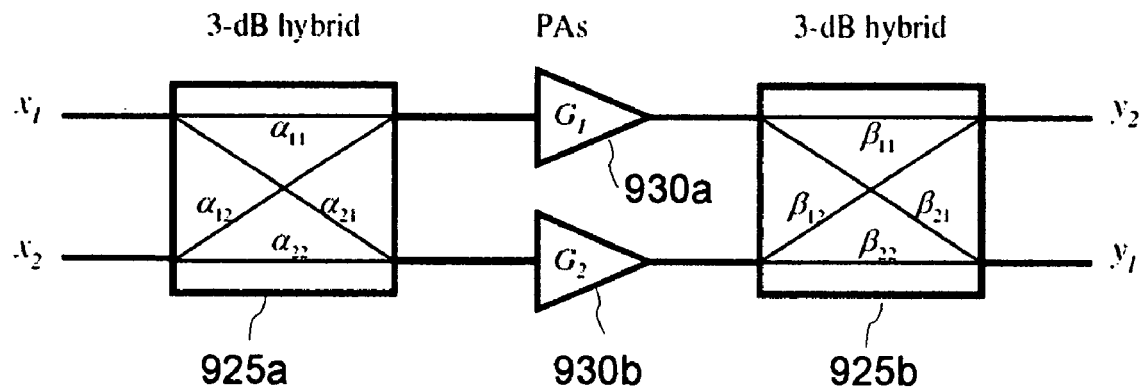
FIG. 19 is a diagram of a prior art 2-port MPA.

Referring now to FIG. 19, a simple 2-port MPA 1900 is shown, which consists of two preferably identical amplifiers (PAs) 930a and 930b connected between an input 3-dB 90° hybrid combiner 925a and an output 3-dB 90° hybrid combiner 925b. Hereinafter in this specification the 3-dB 90° hybrid combiners, including the 3-dB 90° hybrid combiner 925a,b will be referred to as 3-dB couplers.

In the figure, $x_1$ and $x_2$ denote the two input signals, while $y_1$ and $y_2$ denote the two output signals. The transfer functions of the input and the output couplers are denoted by an input and an output matrices $H_I$ and $H_O$, respectively, as follows:

$$H_I = \begin{pmatrix} \alpha_{11} & \alpha_{12} \\ \alpha_{21} & \alpha_{22} \end{pmatrix} \quad (21)$$

and $$H_O = \begin{pmatrix} \beta_{11} & \beta_{12} \\ \beta_{21} & \beta_{22} \end{pmatrix} \quad (22)$$

The amplifiers 930a,b are represented by a diagonal matrix $$P_2 = \begin{pmatrix} G_1 & \\ & G_2 \end{pmatrix} \quad (23)$$

with $G_1$ and $G_2$ representing the complex gains of the respective PAs. The input-output relationship of the 2-port MPA is characterized by an MPA transmission matrix $T_2$ $$T_2 = H_O \times P_2 \times H_I \quad (24)$$

In the last equation, the subscripts "2" identifies the number of input ports of the MPA, and simultaneously the size of the respective matrix.

Ideally, the transfer matrix of the 3-dB couplers 925a,b have the following form:

$$H_I = H_O = \begin{pmatrix} 1/\sqrt{2} & j/\sqrt{2} \\ j/\sqrt{2} & 1/\sqrt{2} \end{pmatrix} \quad (25)$$

where $j=\sqrt{-1}$ represents a 90° phase shift. If the two PAs 930a,b have equal gains, i.e., $G_1=G_2=G$, then the MPA transmission matrix has an anti-diagonal form:

$$T_2 = \begin{pmatrix} 1/\sqrt{2} & j/\sqrt{2} \\ j/\sqrt{2} & 1/\sqrt{2} \end{pmatrix} \begin{pmatrix} G & \\ & G \end{pmatrix} \begin{pmatrix} 1/\sqrt{2} & j/\sqrt{2} \\ j/\sqrt{2} & 1/\sqrt{2} \end{pmatrix}$$

$$= \begin{pmatrix} 0 & jG \\ jG & 0 \end{pmatrix} \quad (27)$$

Therefore, the transfer function of an ideal 2-port MPA is characterized by an anti-diagonal matrix, whose anti-diagonal elements are equal to the PA's gain while all other elements are equal to zero. Under this condition, the output signals of the ideal 2-port MPA are just scaled, i.e. amplified versions of the input signals, without any added cross-talk or "leakage" of any of the input signals into more than one output port:

$$y_1 = j \cdot G \cdot x_1,$$

$$y_2 = j \cdot G \cdot x_2 \quad (28)$$

Note that the equations (27) and (28) hold due to a perfect mutual cancellation of fractions each of the input signals as they arrive at all but one output port, due to a particular balanced form of the 3-dB coupler matrix and the gain equality of all the PAs of the MPA 1900. Accordingly, under the ideal conditions, the MPA's output signals are the amplified versions of the input signals. Generally, an ideal 2-port MPA provides 2 independent amplification channels for the 2 input signals without any cross-talk between said channels. In practice, however, there always exist some mismatches and imperfections in the 3 dB couplers 925a,b and the PAs 930a,b. Therefore, due to non-ideal characteristics of the used components, the MPA 1900 transmission matrix in general non-diagonal:

$$T_2 = \begin{pmatrix} t_{11} & t_{12} \\ t_{21} & t_{22} \end{pmatrix}, \quad (29)$$

and the relationship between the output signals and the input signals can be presented in the following matrix form:

$$\begin{pmatrix} y_2 \\ y_1 \end{pmatrix} = \begin{pmatrix} t_{11} & t_{12} \\ t_{21} & t_{22} \end{pmatrix} \begin{pmatrix} x_1 \\ x_2 \end{pmatrix} = \begin{pmatrix} t_{11}x_1 + t_{12}x_2 \\ t_{21}x_1 + t_{22}x_2 \end{pmatrix} \quad (30)$$

where $$\begin{cases} t_{11} = \alpha_{11}\beta_{11}G_1 + \alpha_{21}\beta_{12}G_2 \\ t_{12} = \alpha_{12}\beta_{11}G_1 + \alpha_{22}\beta_{12}G_2 \\ t_{21} = \alpha_{11}\beta_{21}G_1 + \alpha_{21}\beta_{22}G_2 \\ t_{22} = \alpha_{12}\beta_{21}G_1 + \alpha_{22}\beta_{22}G_2 \end{cases} \quad (31)$$

and $\alpha_{ij}$ and $\beta_{ij}$ are coefficients of the non-ideal transmission matrices of the 3-dB couplers 925a and 925b, as shown in FIG. 19, and $G_1$ and $G_2$ are the complex transfer functions of the first 930a and second 930b PA respectively.

Equations 30 and 31 demonstrate that in the presence of device mismatches and imperfections, the MPA output signals are distorted by cross-talks between the amplification channels, or coupling between each input port and a plurality of the output ports.

Figure 20:
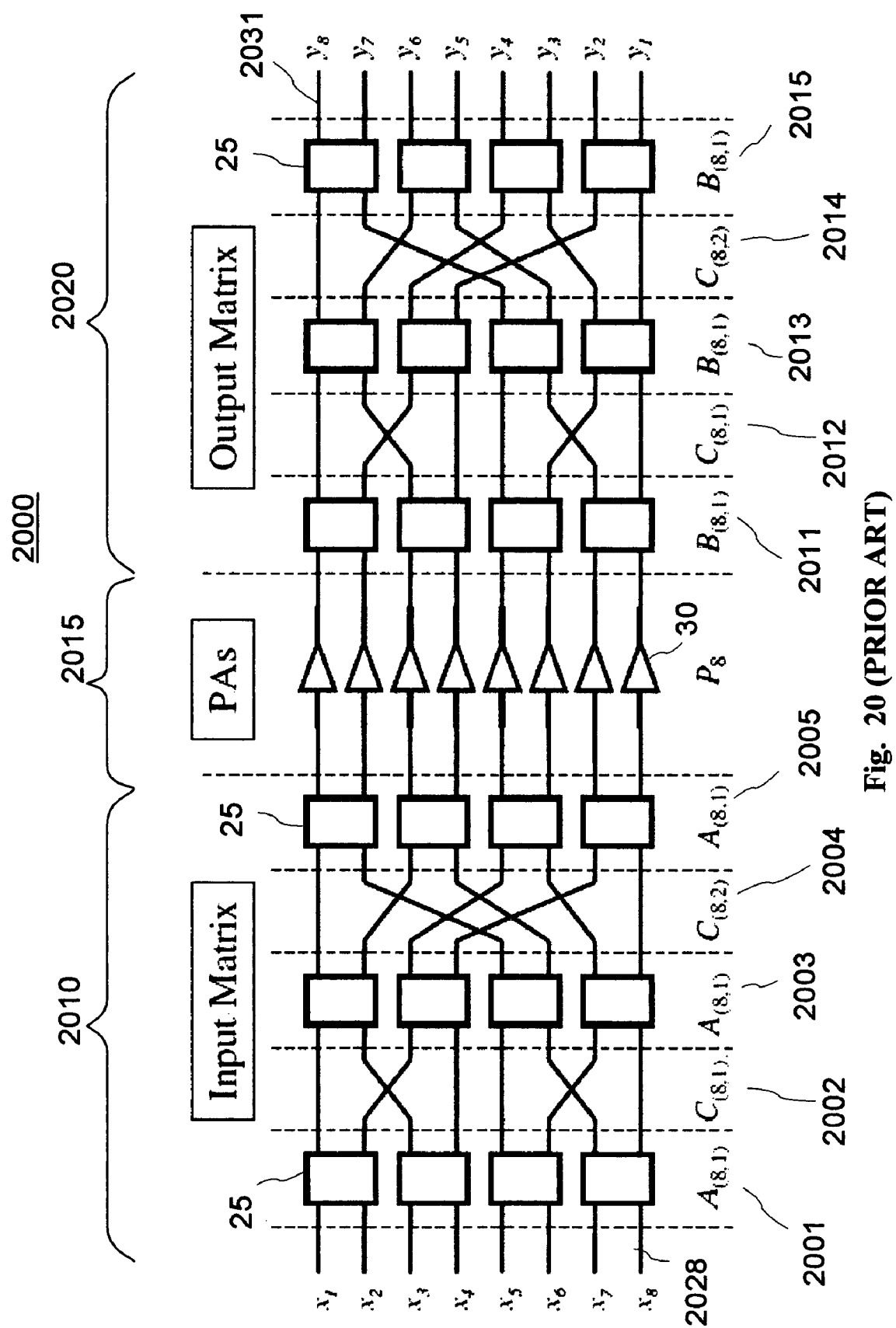
FIG. 20 is a diagram of a prior art 8-port MPA.

Referring now to FIG. 20, a prior-art 8-port MPA 2000 is shown by way of example. Similar to the 2-port MPA shown in FIG. 19 and a 4-port MPA shown in FIG. 1, the MPA 2000 which consists of an input hybrid matrix (IHM) 2010, a bank of 8 amplifiers 2015, and an output hybrid matrix (OHM) 2020.

The IHM 2010 includes three columns 2001, 2003 and 2005 of four 3-dB couplers 25, connected by two connection networks 2002 and 2004. Similarly, the OHM 2020 includes three columns 2011, 2013 and 2015 of four 3-dB couplers 25, connected by two connection networks 2012 and 2014, wherein the connecting networks 2002, 2012 and 2004, 2014 are pair-wise identical.

If all of the 3 dB couplers 25 have the same ideal parameters, and all of the PAs 30 have exactly the same gain and phase delay associated therewith, transmission characteristics of the MPA 2000 can be described by an anti-diagonal 8×8 matrix $T_8$:

$$T_8 = \begin{pmatrix} 0 & 0 & 0 & 0 & 0 & 0 & 0 & -jG \\ 0 & 0 & 0 & 0 & 0 & 0 & -jG & 0 \\ 0 & 0 & 0 & 0 & 0 & -jG & 0 & 0 \\ 0 & 0 & 0 & 0 & -jG & 0 & 0 & 0 \\ 0 & 0 & 0 & -jG & 0 & 0 & 0 & 0 \\ 0 & 0 & -jG & 0 & 0 & 0 & 0 & 0 \\ 0 & -jG & 0 & 0 & 0 & 0 & 0 & 0 \\ -jG & 0 & 0 & 0 & 0 & 0 & 0 & 0 \end{pmatrix} \quad (32)$$

Accordingly, an ideal 8-port MPA provides 8 independent amplification channels for the 8 input signals without any cross-talk between said channels. However, if, for example, there are internal mismatches and imperfections in at least some of the 3 dB couplers leading to an imbalance between their output ports, in the MPA transmission matrix appear non-antidiagonal elements resulting in cross-talk between the amplification channels and the undesired cross-coupling of the output signals, when, for example, an output signal $y_1$ from an output port 2031 includes not only an amplified signal $x_1$ received in an input port 2028, but also traces of one or more input signals $x_i$, i=2, . . . , 8 from other input ports.

In a general case of N-port MPA, where $N=2^q$, where q is an integer, an ideal transfer matrix $T_N$ can be represented as $$T_N = \begin{pmatrix} 0 & \cdots & 0 & j^qG \\ 0 & & j^qG & 0 \\ \vdots & \iddots & & \\ j^qG & 0 & & 0 \end{pmatrix}_{N \times N} \quad (33)$$

i.e. again having an anti-diagonal form with all the other elements of the matrix being zero, resulting in a desired amplification operation when each of the output signals $y_i$, i=1, . . . , N is an amplified input signal $x_i$, without any cross-talk between the channels. Here again, this ideal result is a consequence of a perfect cancellation of fractions of the input signals arriving at each output port but one, due to perfectly balanced 3 dB couplers and PAs within the N-port MPA.

Accordingly, if transmission characteristics of at least some of these elements deviate from the ideal, a transfer matrix of such a non-ideal, or real MPA has non-diagonal elements and is representable as a general-form N×N matrix $$T_N = \begin{pmatrix} t_{11} & t_{12} & \cdots & t_{1N} \\ t_{21} & t_{22} & \cdots & t_{2N} \\ \vdots & & \ddots & \vdots \\ t_{N1} & t_{N2} & \cdots & t_{NN} \end{pmatrix} \quad (34)$$

wherein at least some of the non-antidiagonal transmission coefficients $t_{i,j}$, with j≠(N+1−i), are non-zero.

Figure 21:
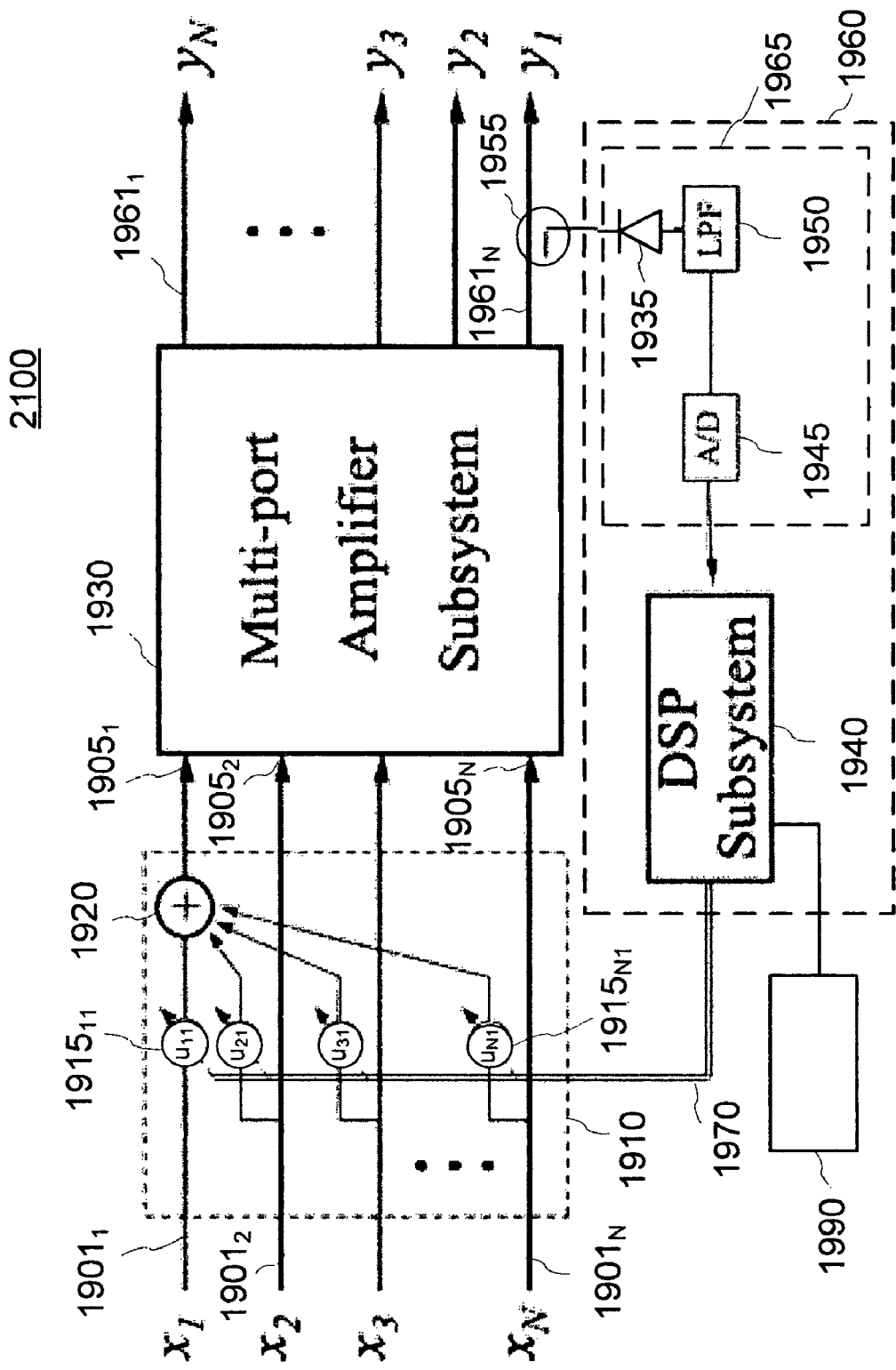
FIG. 21 is a block diagram of a self-calibrating MPA according to the present invention.

Turning now to FIG. 21, the second embodiment of the self-calibrating multi-port circuit of the present invention 2100 includes an N-port MPA 1930, a distortion compensation network 1910, and a feedback circuit 1960. The self-calibrating multi-port circuit 2100, which is also referred to hereinbelow as the self-calibrating MPA (SCMPA) circuit 2100 or the SCMPA 2100, receives in operation N input signals $x_i$, i=1, . . . , N, in N input ports 1901$_1$ to 1901$_N$, and provides at the output N output signals $y_i$, i=1, . . . , N, each of which is ideally one of the input signals amplified by a gain coefficient G of the MPA 1930. In an alternative embodiment, the number of output ports of the MPA 1930 may differ from the number of input ports thereof. The signals $x_i$ to be amplified by the SCMPA 2100 are digitally modulated signals modulated using same or differing modulation schemes, for example such as M-PSK or M-QAM. As discussed hereinabove, such a signal modulated using a given modulation format and a pulse-shaping function has a unique statistical distribution, referred to herein as the reference distribution, such as the PDF or CDF; according to the method of the present invention, this reference distribution is compared to an output distribution for the respective signal as measured as the output of the SCMPA 2100 to assess signal distortions introduced by the SCMPA.

The N-port MPA 1930, which in the context of this embodiment will be referred to as the first circuit 1930 or the MPA Subsystem (MPAS) 1930, has N input ports 1905$_1$ to 1905$_N$ which are commonly referred to hereinafter as the MPAS input ports 1905, and N output ports 1961$_1$ to 1961$_N$ which are commonly referred to hereinafter as the MPAS output ports 1961. Counting the input and output ports of the MPAS 1930 from top to bottom as shown in FIG. 21, the ports 1905$_1$ and 1961$_1$ will be referred to hereinafter as the first input and first output ports of the MPAS 1930, respectively, while the ports 1905$_N$ and 1961$_N$ Will be referred to hereinafter as the $N^{th}$ input and $N^{th}$ output ports of the MPAS 1930, respectively. The MPAS output ports 1961 serve also as the output ports of the SCMPA circuit 2100.

The distortion compensation network 1910 has N input ports 1901$_1$ to 1901$_N$, which serve also as input ports of the self-calibrating MPA circuit 2100, and will be commonly referred to hereinafter as the circuit input ports 1901. In a preferred embodiment, each of the circuit input ports 1901 is connected to each of the MPA input ports 1905 using a connecting link that includes an externally controllable multiplier 1915$_{ij}$, for tuning a transmission coefficient $u_{ij}$, i,j=1, . . . , N, of the link 'ij'. The transmission coefficients $u_{ij}$, which are generally complex-valued and characterized each by an amplitude coefficient and a phase shift, will also be referred to hereinafter as scaling coefficients. The notation 'ij' is used herein to indicate a connecting link that couples an i-th circuit input port 1901$_i$ with a j-th MPA input port 1905$_j$; when used as a subscript in notation "$u_{ij}$", it indicates a transmission coefficient of the 'ij' link, i.e. the link coupling an i-th circuit input port 1901$_i$ with a j-th MPA input port 1905$_j$. Transmission coefficients $u_{ij}$ with i≠j will also be referred to herein as cross-coupling coefficients, as they couple a controlled fraction of an input signal $x_i$ into a j-th MPA input port 1905$_j$, resulting in a cross-talk between signals received into the MPA 1910 through different MPA input ports 1905. In the preferred embodiment, each of the MPAS input ports 1905 receive a modified input signal which is representable as a linear combination of the N input signals $x_i$, i=1, . . . , N.

The feedback circuit 1960 includes a processor 1940 that can be embodied as a DSP, and a sampling circuit 1965 connected between one of the output ports 1961 and the DSP 1940. The sampling circuit 1965 can be functionally and structurally substantially identical to the sampling circuit 255 of the first embodiment and is described hereinabove with reference to FIG. 4; it includes a tap-off coupler 1955, an envelope detector 1935, and anti-aliasing LPF 1950 and an A/D 1945. As shown in FIG. 21 by way of example, the sampling circuit 1965 is coupled to the N-th output port 1961$_N$, and cooperates with the DSP 1940 for monitoring the output signal $y_1$ from said output port 1961$_N$.

The DSP 1940 is linked to the distortion compensation network 1910 by one or more control links exemplified in FIG. 21 by a bus 1970, and in operation generates signals for controlling the multipliers 1915$_{ij}$ to adjust complex transmission coefficients $u_{ij}$ of the connecting links 'ij' within the compensation circuit 1910. Similarly to the operation of the DSP 245 of the first embodiment, the DSP 1940 is programmed to perform the following operations:

a) determines output distribution information for the output signal $y_1(t)$ from a plurality of samples {$p_1$} of the output signal $y_1$, said plurality of samples {$p_1$} provided by the sampling circuit 1965, b) compares the output distribution information with a respective reference distribution information for the monitored output signal $y_1$ which is stored in a memory 1990, and c) determines therefrom distortion compensation information for setting the complex transmission coefficients $u_{ij}$ so as to reduce a difference between the reference and output distribution information; this difference is reduced by the addition of a controlled amount of cross-coupling and cross-correlation between the signals input into the ports of the MPAS 1930 so as to compensate for the undesired imbalances and cross-coupling therewithin the first circuit 1930, thereby reducing the cross-talk between the amplification channels appearing at the output channels of the self-calibrating MPA circuit.

FIG. 21 shows one sampling circuit 1965 for monitoring output from one, i.e. N-th, of the N output ports 1961, and a corresponding portion of the distortion compensation network 1910 which is responsible for modifying only a signal that is provided to the first input port 1905$_1$ of the MPAS 1930; it includes a set of N multipliers 1915$_{ij=1}$ with corresponding cross-connecting links 'i1' coupling each of the input signals $x_i$ into the first input port of the MPAS 1930. The shown elements are sufficient to substantially compensate distortions that the MPAS circuit 1930 introduces to the output signal $y_1$. However, it may also in the process additionally distort the other (N−1) output signals $y_i$, i=2, . . . , N, if those signals are not monitored. In a preferred embodiment, the feedback circuit 1960 includes N sampling circuits such as the sampling circuit 1965, each coupled to a different one of the N output ports 1961 so as to monitor each of the output signals $y_i$, i=1, . . . , N, of the self-calibrating MPA circuit 2100, providing to the DSP 1940 N pluralities of signal samples {$p_n$}. The DSP 1940 processes the received pluralities of signal samples to determine output distribution information for each of the N output signals, and compare the output distribution information for each of the output N output signals $y_i$ with reference distribution information for the respective output channel. In another embodiment, the single sampling circuit 1965 is used sequentially to gather the signal power distribution at each output port 1961, i.e. one after the other, for example using an N×1 switch connected between the output ports 1961 and the sampling circuit 1965. In yet another embodiment, one or more of the input signals $x_i$ includes frequency-multiplexed modulated channels and the feedback circuit 1960 processes these channels as a single one, using reference distribution information representing statistical characteristics of the multiplexed signal without distortions.

If each of the input signals $x_i$ has the same modulation format and same pulse shape, only one reference distribution information, such as the PDF or the CDF, needs to be stored in the memory 1990. Otherwise, different reference distribution information should be provided for each different modulation format/pulse shaping function combination, so that the memory 1990 may store a plurality of reference distributions corresponding to a plurality of modulation and pulse shaping formats.

Alternatively, the modulation format of each of the N input signals $x_i$ can be determined in operation by providing to the DSP 1940 samples of the input signals $x_i$, e.g. using sampling circuits similar to circuit 1965 but coupled to the input ports 1901, and programming the DSP 1940 to determine therefrom input signal envelope distributions to use as the reference distributions for the respective output signals. In one such embodiment, the sampling circuit 1965 can be time shared, e.g. switched between the input 1901 and output 1961 ports to tap off and sample the respective input and output signal alternately.

Before describing the operation of the SCMPA 2100 in further detail, it is instructive to provide several mathematical notations and formulas representing the SCMPA operation in mathematical terms.

Denote the plurality of input signals with a vector X, the plurality of output signals with a vector Y, and the plurality of transmission coefficients $u_{ij}$ with a matrix U, hereinafter referred to as the compensation matrix:

$$X = \begin{pmatrix} x_1 \\ x_2 \\ \vdots \\ x_N \end{pmatrix} \quad (35)$$

$$U = \begin{pmatrix} u_{11} & u_{12} & \cdots & u_{1N} \\ u_{21} & u_{22} & \cdots & u_{2N} \\ \vdots & & \ddots & \vdots \\ u_{N1} & u_{N2} & \cdots & u_{NN} \end{pmatrix}.$$

and $$Y = \begin{pmatrix} y_N \\ y_{N-1} \\ \vdots \\ y_1 \end{pmatrix}$$

With these notations, the operation of the SCMPA 2100 is described by the following matrix equation:

$$Y = T_N U X \quad (36)$$

Equations (36) and (35) result in a following formula (37) for an n-th output signal $y_n$, n=1, ..., N $$y_n = \sum_{k=1}^{N} \sum_{l=1}^{N} t_{nk} u_{kl} x_l = \left( \sum_{k=1}^{N} t_{nk} u_{kn} \right) x_n + \sum_{l=1, l \neq n}^{N} \left( \sum_{k=1}^{N} t_{nk} u_{kl} \right) x_l \quad (37)$$

One can see that the last term in the RHS of equation (37) represents signal cross-talk at the n-th output port 1961$_n$, and should be minimized or, preferably, eliminated. This is possible by selecting the transmission coefficients $u_{ij}$, ij=1, ..., N, of the connecting links in the compensation network 1910 so that $$\sum_{k=1}^{N} t_{nk} u_{kl} = 0. \quad (38)$$

The process of selecting such values of the transmission coefficients $u_{ij}$, ij=1, ..., N, that satisfy the equation (38) so as to compensate for the imbalances in the first circuit 1930 thereby providing for cross-talk-free output, will be referred to as calibration of the SCMPA 2100. This is done in the present invention by iteratively adjusting the transmission coefficients $u_{ij}$ so as to reduce an objective function representing distortions of the output signals statistics.

For this purpose, the DSP 1940 computes for each of the output signals $y_i$ an output $PDF^n{}_{actual}(m)$ from the respective plurality of L signal samples $\{P\}L$, and then compares it with a corresponding reference distribution $PDF^n{}_{ideal}(m)$ stored in the memory 1990. In one embodiment, N objective functions can be formed for each output signal using a measure of differences between the respective reference and output distributions, which can then iteratively be minimized one by one for each of the output signals individually, similarly to how it is described hereinabove for the first embodiment. Advantageously, an embodiment described hereinbelow employs a single objective function combining together distortions of output signal statistics in a single error function M(U)|:

$$M(U) = \sum_{n=1}^{N} M_n(U) \quad (39)$$

$$= \sum_{n=1}^{N} \sum_{m=1}^{M} (PDF_{actual}^n(m) - PDF_{ideal}^n(m))^2$$

where $$M_n(U)| = \sum_{m=1}^{M} (PDF_{actual}^n(m) - PDF_{ideal}^n(m))^2 \quad (40)$$

where denotes the PDF mean-squared error (MSE) for the output signal at an n-th output port 1961$_n$. Alternatively, other measures of PDF difference may also be used. In another alternative embodiment, respective CDFs can be used in place of the PDFs to assess the circuit-induced distortion of statistical properties of the output signal and to compute the objective function, as described hereinabove with reference to the self-calibrating QT 200.

In accordance with the invention, the compensation circuit 1910 is tuned during normal operation of the SCMPA 2100, by iteratively adjusting the transmission coefficients $u_{ij}$ forming the compensation matrix U so as to minimize the objective function M(U), which has a minimum when equation (27) is satisfied, and the output signals $y_i$ have statistical distributions approximating the respective reference distributions of un-distorted modulated signals. Mathematically, the circuit calibration process can be expressed as finding a minimum of the objective function M(U):

$$\min_U \{M(U)\} = \min_U \left\{ \sum_{n=1}^{N} \sum_{m=1}^{M} (PDF_{actual}^n(m) - PDF_{ideal}^n(m))^2 \right\} \quad (41)$$

By solving this minimization problem, we achieve the purpose of calibrating the N-port MPA. To this end, many approaches can be used. Examples are the alternate 1-dimensional search described hereinabove, and the method of steepest descent.

An embodiment of the iterative circuit calibration method according to the present invention that employs the method of steepest descent will be now described. The method of steepest descent is one of the oldest methods of optimization, and is well know to those skilled in the art. It employs an iterative procedure to search for the minimum of an objective function of many variables. At each iteration, a direction of the steepest descent from the current position on the surface of the objective function is found, and the operating point is moved along this direction to a next position, resulting in a smaller value of the objective function.

Mathematically, the direction of the steepest descent is defined by a gradient vector $$D_t = \Delta \nabla M(U_t),$$

and the updating process is described by the following equation:

$$U_{t+1} = U_t - \lambda_t d_t$$

where the subscript "t" denotes the time index, $D_t$ denotes the matrix of derivatives of M(U) with respect to U at time "t".

$\lambda_t$ represents the step size of the adjustment, and its subscript "t" implies that its value may be adjusted over time.

Figure 22:
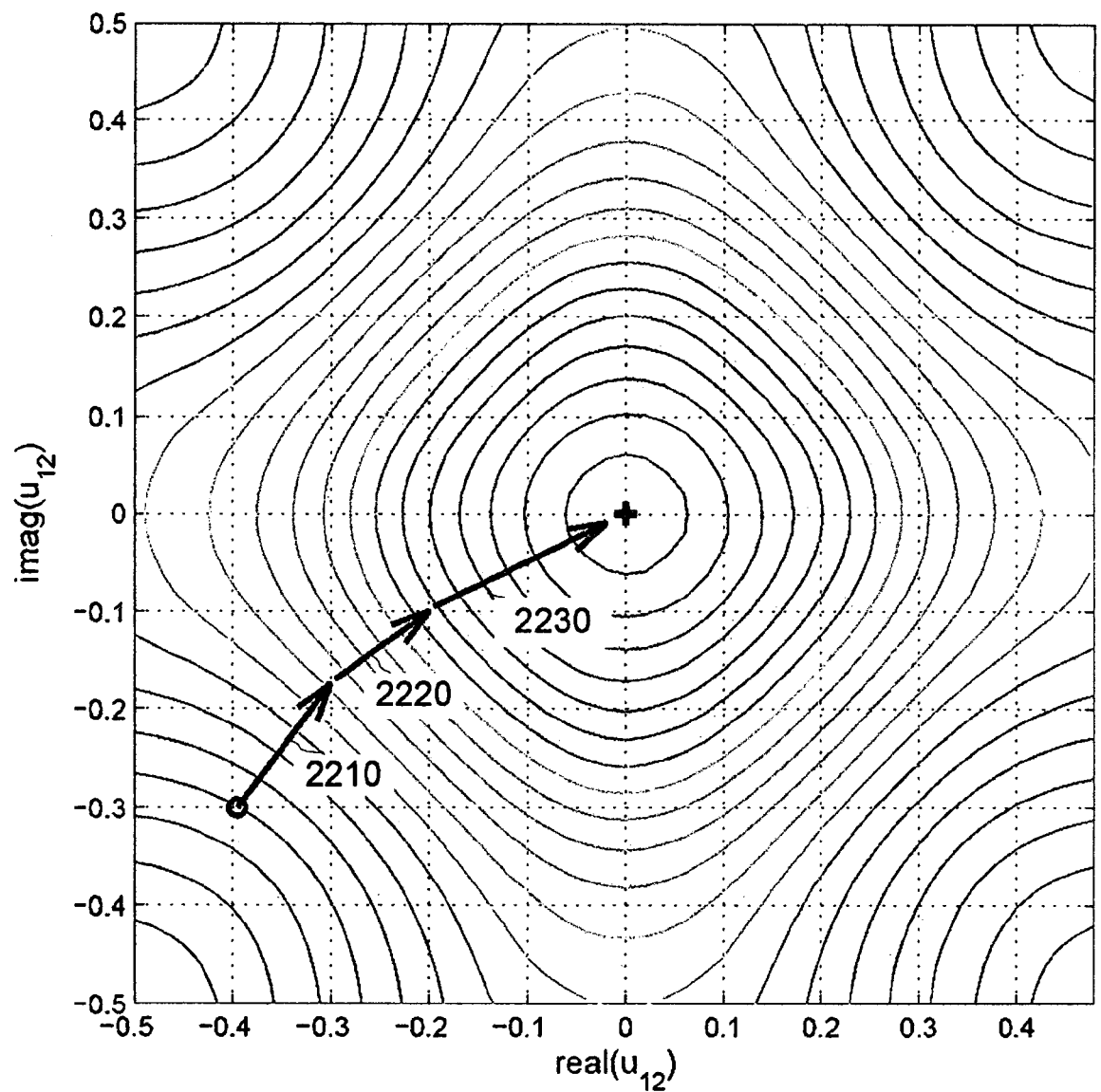
FIG. 22 is a contour plot of the objective function illustrating an application of the method of steepest descent to calibrating a 2-port MPA according to the present invention.

Intuitively, the successive updates or corrections to the calibration matrix U in the direction of the negative gradient, i.e., the direction of the steepest descent, should eventually lead to the minimum value of the objective function M(U), at which point the calibration matrix U reaches its optimum value. As an illustration, arrows 2210, 2220 and 2230 in FIG. 22 show the search path on a plane of two parameters for three consecutive steps of the steepest descent for the case of a two-port MPA, when it is sufficient to adjust only one complex cross-coupling coefficient $u_{12}$.

Figure 23:
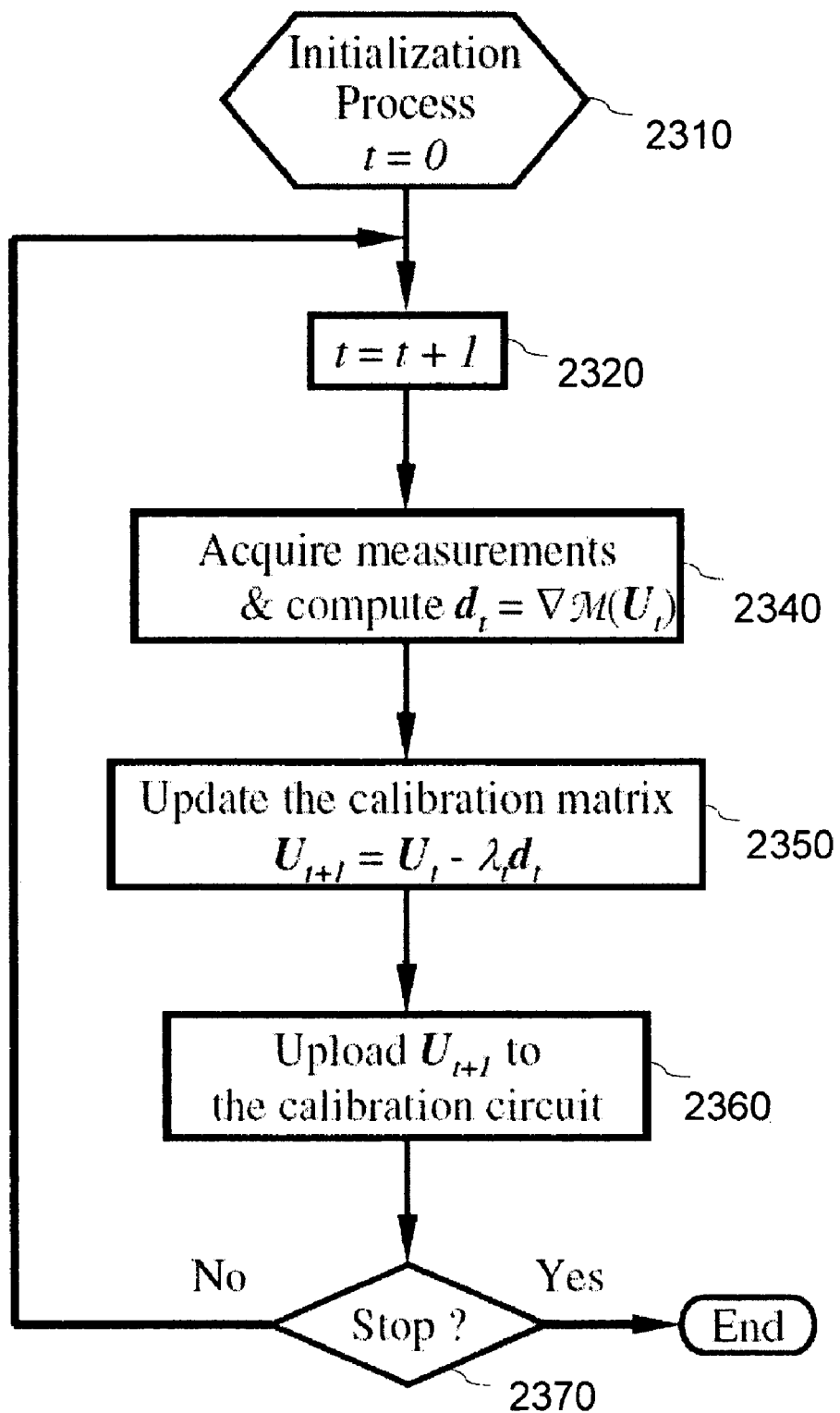
FIG. 23 is a flowchart showing main steps of the process of self-calibrating an MPA using the algorithm of the steepest descent according to the present invention.

Turning now to FIG. 23, an implementation of the method for distortion compensation of the present invention for the SCMPA 2100 using the steepest descent algorithm to tune the compensation circuit 1910 will now be described. This figure shows a flowchart of the calibration process. It includes four major sub-processes, or steps: Initialization step 2310, determining compensation information step 2340, which takes the form of Determining Matrix of Derivatives as labeled in FIG. 23 and explained hereinbelow, Calibration Matrix Update step 2350, and Modifying the Compensation circuit step 2360. These steps are described hereinbelow.

During the initialization step 2310, the following operations are performed:

A) the reference PDFs for the N output signals, $PDF''_{ideal}(m)$, (m=1, 2, ..., M) for given modulation schemes and pulse-shaping functions of the MPA input signals $x_n$ are loaded from the memory 1990, computed or determined by measurements;

B) the compensation matrix U is initialized as follows: $U=U_0$, $$U_o = \begin{pmatrix} 1 & 0 & \cdots & 0 \\ 0 & 1 & & 0 \\ \vdots & & \ddots & \vdots \\ 0 & 0 & \cdots & 1 \end{pmatrix}_{N \times N}$$

and the matrix $U_0$ is uploaded to the compensation circuit 1910;

C) N sets of signals samples $\{s\}_L$ is acquired as described hereinabove, each of which consisting of L samples and taken from one of the MPA output ports 1961 using sampling circuits such as the sampling circuits 1965.

D) N output distributions are determined in the form of $PDF''_{actual}(m)$, (m=1, 2, ..., B) from the N sets of signals samples $\{s_n\}$, each for a different output signal $y_n$;

E) Compute the objective function M(U) using the current compensation matrix, for example using equation (39).

The step 2340 of determining the compensation information involves determining the direction of the steepest decent to the minimum of the objective function, i.e. the calculation of the gradient vector $D_t$. It includes performing the following sub-steps for each cross-coupling coefficient $u_{jk}$:

increment $u_{jk}$ by a small pre-defined step $\delta$, perform sub-steps (C)-(E) as described hereinabove with reference to the initialization step 2310;

compute a derivative parameter $d_{jk}$ using the following equation (42):

$$d_{jk} = \frac{1}{\delta}(M(U) - M(U_t)) \tag{42}$$

Performing the above defined sub-steps for each cross-coupling coefficient $u_{ij}$, results in a gradient matrix $$D_t = \begin{pmatrix} 0 & d_{12} & d_{13} & \cdots & d_{1N} \\ d_{21} & 0 & d_{23} & \cdots & d_{2N} \\ \vdots & & & \ddots & \vdots \\ d_{N1} & d_{N2} & d_{N3} & \cdots & 0 \end{pmatrix} \tag{43}$$

In the next step 2350, each of the cross-coupling coefficients $u_{jk}$ is updated according to the following update equation:

$$u_{jk}(t+1) = u_{jk}(t) - \lambda_t d_{jk}$$

where $u_{jk}(t)$ denotes the cross-coupling coefficient $u_{jk}$ at time index t prior to performing the step 2340. At the end of step 2360, thereby updated compensation matrix U(t+1) is uploaded to the compensation circuit 1910, and the transmissions of the connecting links 'ij' is adjusted accordingly. The process iterates until a pre-determined condition is met, for example, until objective function reaches a pre-determined threshold value.

The overall performance of the aforedescribed circuit calibration process depends on a number of process parameters, optimal values of which should be determined depending on particular application requirements, as would be known to those skilled in the art.

For example, the number of samples L and the bin size used in the PDF calculation need to be chosen properly. To achieve accurate distortion compensation, a large sample size should be used. The bin size and locations also affect the performance, and an optimal choice of the bin size depends on the sample size.

Two other important parameters are $\delta$ for the gradient matrix calculation, and $\lambda$ for the compensation matrix update. Their values control the convergence rate and the steady-state performance, where large values result in a faster convergence rate at the expense of the steady-state performance. Variable values of $\delta$ and $\lambda$ may be used to alleviate these issues.

The above described procedure does not update the diagonal elements $u_{ii}$ of the compensation matrix U. These diagonal elements control the output powers of the SCMPA 2100, and they can be adjusted separately by directly monitoring the output signal powers, and updating the scaling coefficients $u_{ii}$ accordingly. This approach reduces the number of degrees of freedom in the optimization, and simplifies the computational requirements.

SCMPA Simulation Results

The performance of the aforedescribed SCMPA 2100 and of the related method for compensation in MPA circuit has been verified in simulations. By way of example, simulations have been preformed for a 4-port MPA whose co-channel input signals are as follows:

Port 1: QPSK modulation, Square-root raised-cosine pulse-shaping, Roll off=0.35.

Port 2: QPSK modulation, Square-root raised-cosine pulse-shaping, Roll off=0.25.

Port 3: 8-PSK modulation, Square-root raised-cosine pulse-shaping, Roll off=0.35.

Port 4: 16-QAM modulation, Square-root raised-cosine pulse-shaping, Roll off=0.35.

Without loss of generality, these signals are normalized to a power of 1 at the input to the calibration circuit.

It is assumed that the 3-dB 90° hybrid combiners in the input and output sections of the MPA have a gain error within +/−1 dB and a phase error within +/−10 degrees; the PAs have a gain variation within +/−1$l$ dB and a phase variation within +/−10 degrees; and the hybrids in the output section have a gain error within +/−1 dB and a phase error of +/−10 degrees. These errors are generated from a uniform random number generator. The resulting total transfer function of the MPA used in the simulation is listed in Table 2.

TABLE 2

The total transfer function generated for simulations

| Amplitude (dB) | | | | Phase (Degree) | | | |
|---|---|---|---|---|---|---|---|
| −15.0 | −17.8 | −17.6 | 0.3 | −149.7 | −9.1 | −122.4 | −1.3 |
| −20.4 | −15.7 | −0.4 | −22.8 | −16.1 | 25.0 | −13.6 | −112.6 |
| −25.2 | 0.9 | −19.1 | −14.9 | −174.2 | 11.3 | −62.5 | 173.2 |
| 0.0 | −26.5 | −16.0 | −18.7 | 0.0 | −87.3 | 167.1 | 95.7 |

In the PDF calculation, thirty-one bins are used, located at $b_j=0.1(j-1)$, ($j=1, 2, \ldots, 31$). The parameter $\delta$ is set to 0.0 to calculate the gradient matrix $D_r$, and a fixed step size $\lambda=0.01$ is used for the calibration matrix update. Two sample sizes, $10^5$ and $10^6$, are used in the calculation.

The following results show the effectiveness of the aforedescribed MPA self-calibration technique: the PDFs without/with calibration, the convergence performance, the isolation improvement, and the received signal constellation.

Figure 24:
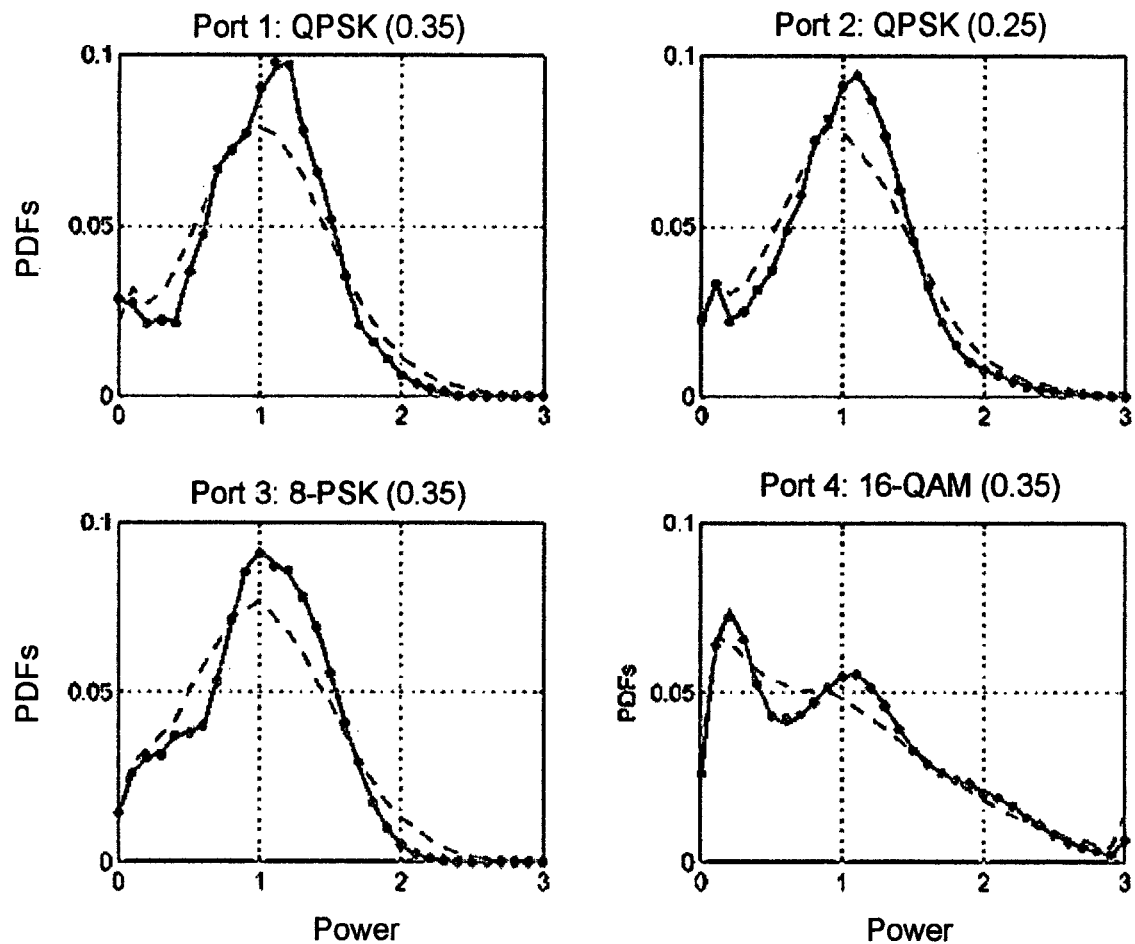
FIGS. 24 and 25 illustrate the per-channel convergence of output PDFs to the corresponding reference PDFs for a four-channel MPA in dependence of the modulation scheme for sample sizes $10^5$ and $10^6$, respectively.
Figure 25:
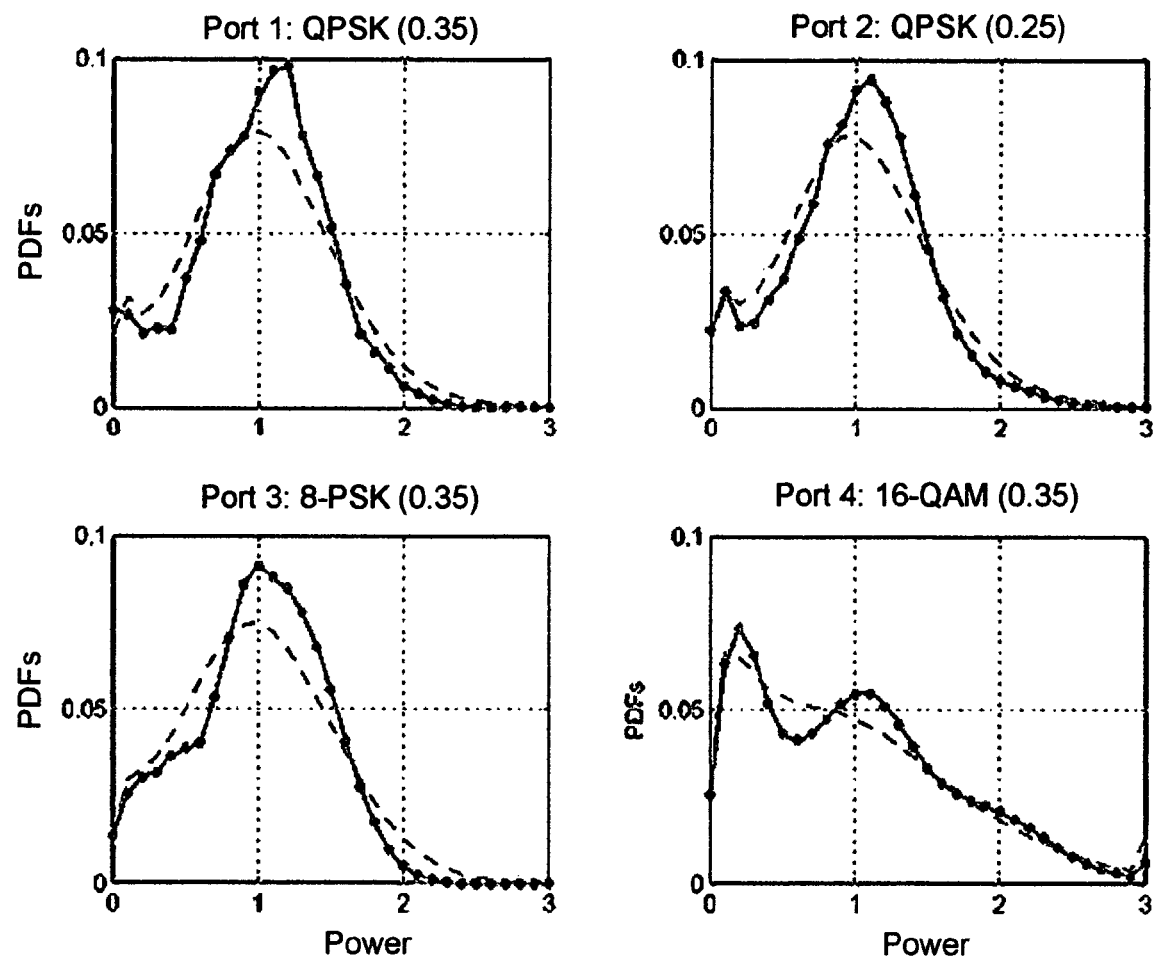

FIGS. 24 and 25, for sample size $10^5$ and $10^6$ respectively, show four sets of PDFs each. Each set has three curves, wherein solid curves represent the ideal, or reference PDF, dashed curves represent the MPA output PDF without calibration, and the dotted curves represent the MPA output PDF with calibration. In this example, 100 iterations are performed. The PDFs calculated at the first and the last iterations are plotted as the ones without calibration and with calibration, respectively. It is observed that the self-calibration indeed restores all PDFs to their ideal ones.

At the end of the simulation, the improvement in isolation between the four ports are calculated, and the results are listed in Table 3 for both sample sizes. The first 4 columns in the table are the MPA's amplitude transfer functions from Table 2, listed as reference. The second 4 columns list the combined amplitude transfer functions of the MPA and the calibration circuit. The last 4 columns show the differences between them, i.e., the isolation improvement due to the aforedescribed self-calibration technique of the present invention. It shows that using the self-calibration technique, the isolation between the ports are reduced at least to −31 dB with the sample size of $10^5$, and to −33 dB with the sample size of $10^6$. Depending on the original isolation, the improvement can be as large as 29 dB.

Figure 26:
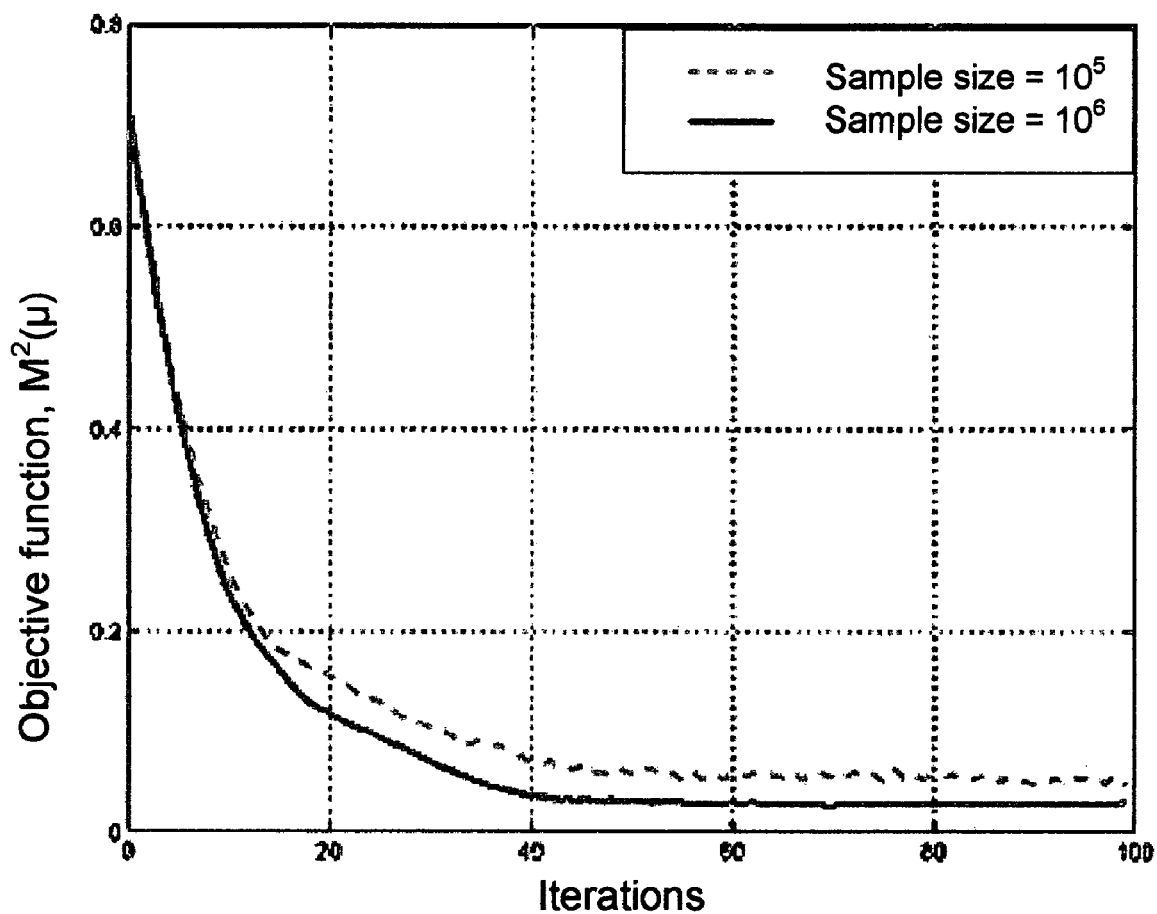
FIG. 26 is a graph showing the convergence performance of the self-calibration method of the present invention for the 4-port MPA in dependence on the used sample size.
Figure 27:
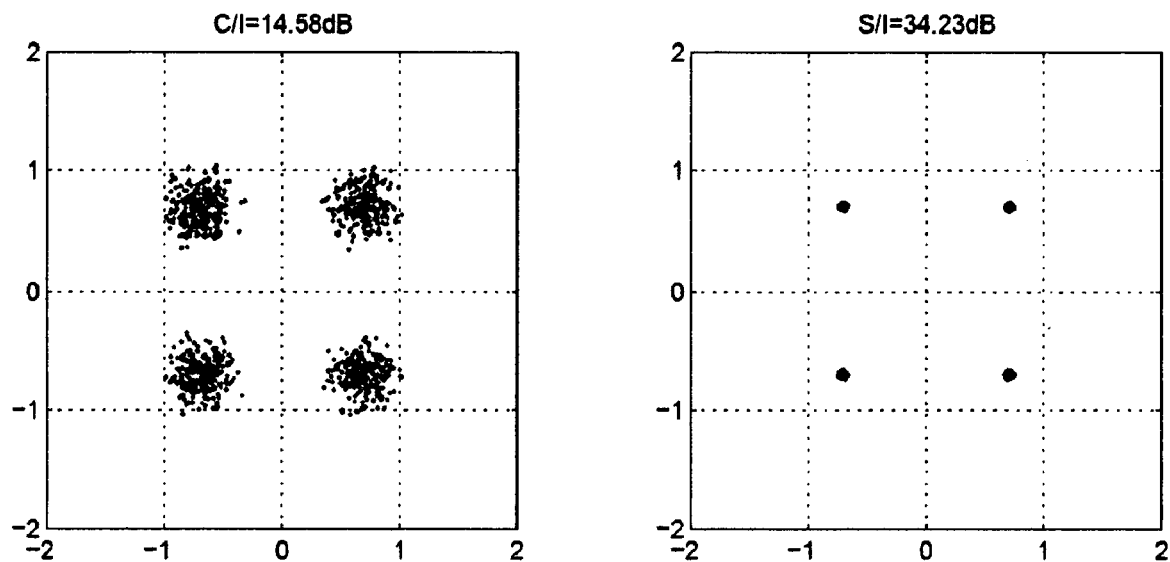
FIG. 27 is a graph illustrating QPSK signal constellation at an output of the 4-port MPA before (left pane) and after (right pane) of performing the MPA self-calibration according to the present invention.
Figure 28:
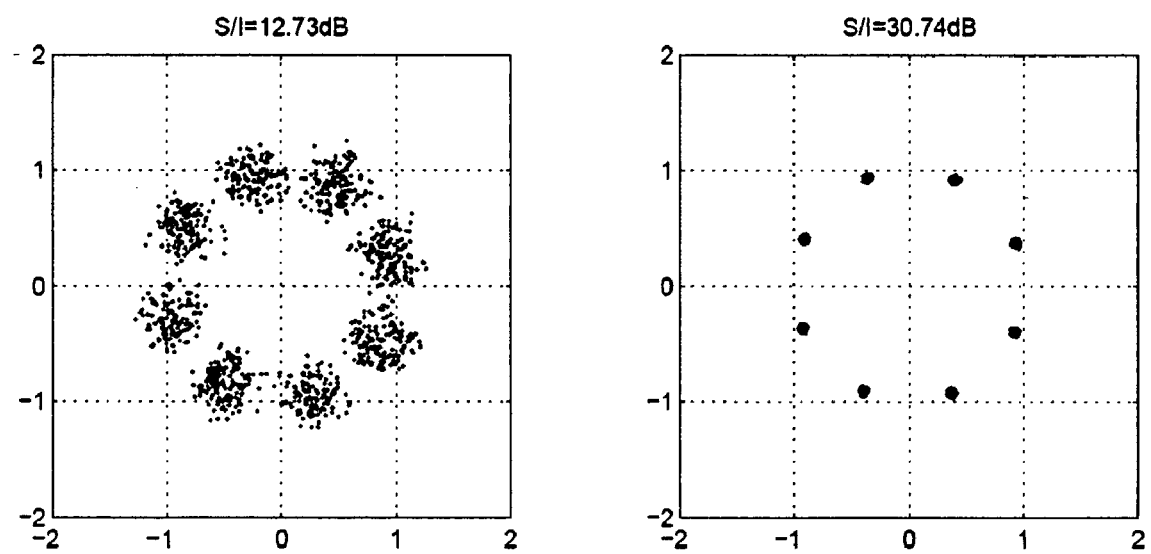
FIG. 28 is a graph illustrating 8-PSK signal constellation from output port 3 of the 4-port MPA before (left pane) and after (right pane) of performing the MPA self-calibration according to the present invention.
Figure 29:
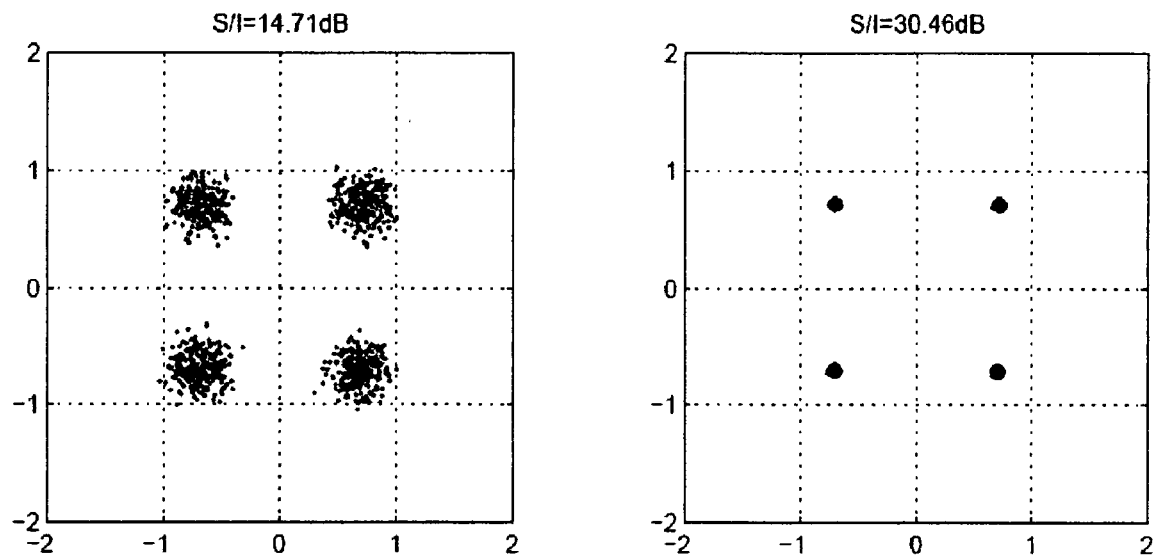
FIG. 29 is a graph illustrating QPSK signal constellation from output port 2 of the 4-port MPA before (left pane) and after (right pane) of performing the MPA self-calibration according to the present invention.
Figure 30:
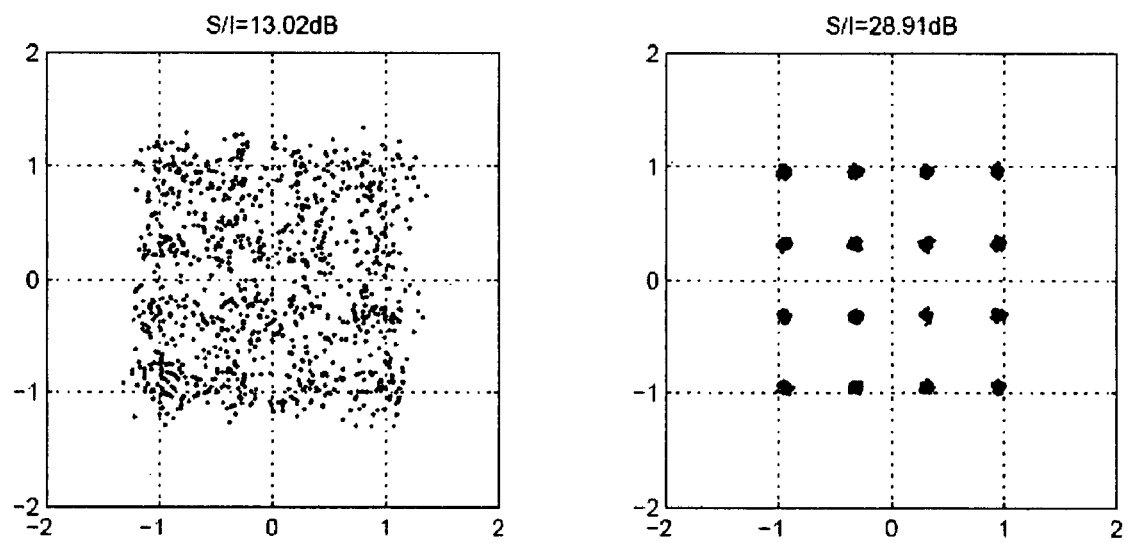
FIG. 30 is a graph illustrating 16-QAM signal constellation from output port 4 of the 4-port MPA before (left pane) and after (right pane) of performing the MPA self-calibration according to the present invention.

FIG. 26 illustrates that the method converged within 50 iterations, yielding a smaller residual error for the larger set of samples.

FIGS. 27-30 illustrate output signal constellations before (left panes) and after (right panes) the calibration process for the sample size $10^5$. The figures also indicate at the top the signal-to-interference ratio (SIR) as the performance measure. These figures clearly show the signal constellation degradation due to the cross channel interference caused by the MPA imperfections. They also show that the self-calibration technique significantly reduces the cross

TABLE 3

Isolation improvements (in dB) achieved by the self-calibration technique

| T | | | | T × U | | | | Improvement | | | |
|---|---|---|---|---|---|---|---|---|---|---|---|
| | | | | Sample size = $10^5$ | | | | | | | |
| −15.0 | −17.8 | −17.6 | 0.3 | −31.8 | −33.3 | −36.2 | −0.008 | 16.8 | 15.5 | 18.6 | 0.3 |
| −20.4 | −15.7 | −0.4 | −22.8 | −35.0 | −37.5 | −0.005 | −39.5 | 14.6 | 21.8 | −0.4 | 16.7 |
| −25.2 | 0.9 | −19.1 | −14.9 | −38.8 | −0.008 | −32.0 | −37.3 | 13.6 | 0.9 | 12.9 | 22.5 |
| 0.0 | −26.5 | −16.0 | −18.7 | −0.005 | −43.7 | −37.7 | −36.9 | 0.0 | 17.2 | 21.7 | 18.2 |
| | | | | Sample size = $10^6$ | | | | | | | |
| the same as above | | | | −33.2 | −39.2 | −34.7 | −0.005 | 18.2 | 21.5 | 17.0 | 0.3 |
| | | | | −39.0 | −36.9 | −0.002 | −35.4 | 18.6 | 21.2 | −0.4 | 12.6 |
| | | | | −46.4 | −0.000 | −48.1 | −53.0 | 21.2 | 0.9 | 29.0 | 38.1 |
| | | | | −0.001 | −41.9 | −43.0 | −43.7 | 0.0 | 15.4 | 27.0 | 25.0 |

TABLE 4

SIRs before and after the self-calibration. Values in bracket are improvement.

| | | After (dB) | |
|---|---|---|---|
| Port# | Before (dB) | Sample size = $10^5$ | Sample size = $10^6$ |
| 1 | 14.6 | 34.2 (19.6) | 38.3 (23.7) |
| 2 | 14.7 | 30.5 (15.8) | 36.5 (21.8) |
| 3 | 12.7 | 30.7 (18.0) | 31.5 (18.8) |
| 4 | 13.0 | 28.9 (15.9) | 30.4 (17.4) | channel interference and restores the signal constellations, resulting in significant SIR improvements as summarized in Table 4.

Third Embodiment

Self-Calibrating Beam Forming Network (SCBFN)

Another example of a multi-port circuit operating on a plurality of modulated input signals to produce a plurality of output modulated signals is a Beam Forming Network (BFN), which is commonly used in wireless communication.

Figure 31:
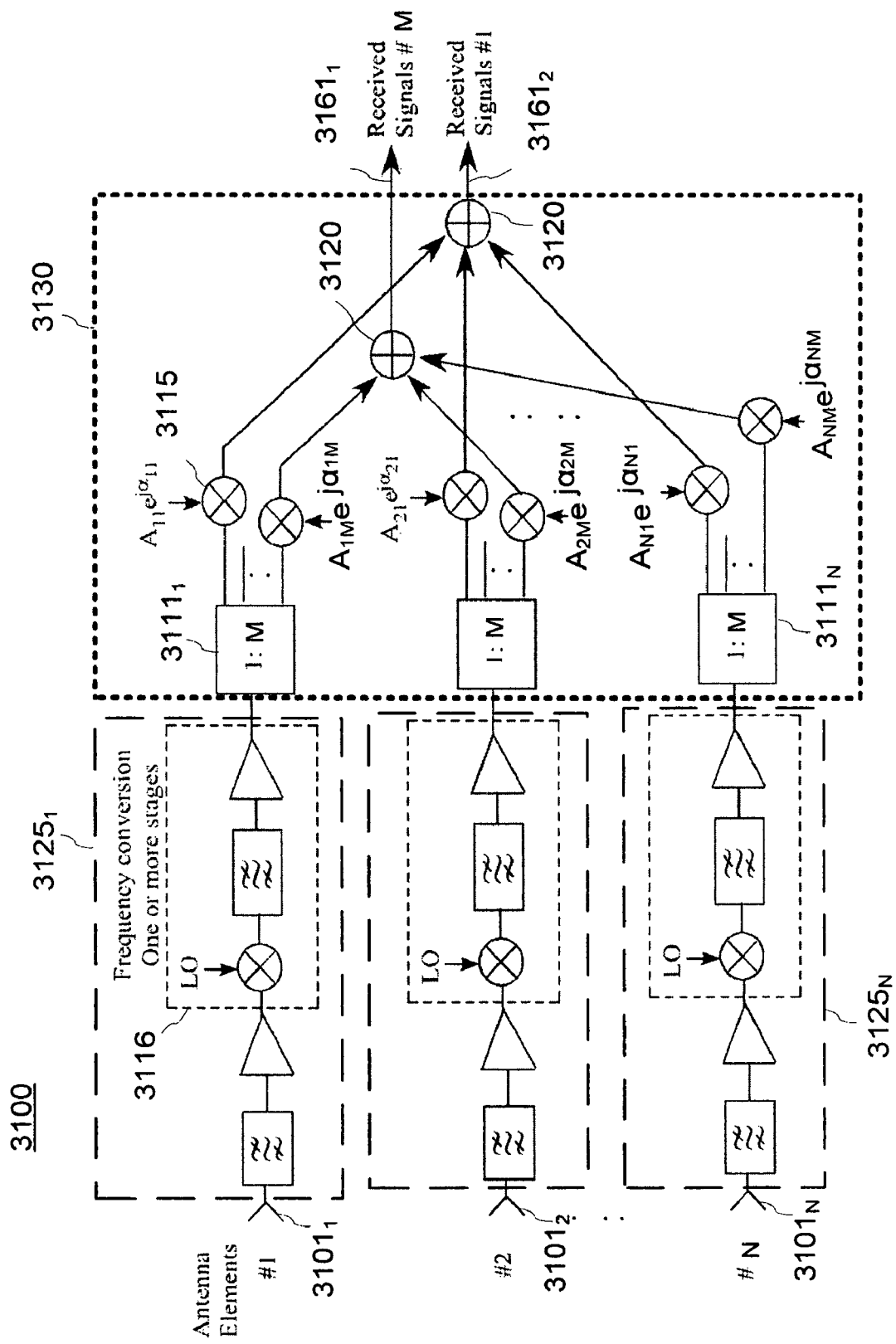
FIG. 31 is a diagram of a prior art BFN.

FIG. 31 schematically shows a prior art BFN circuit 3100 in a receive mode of operation. Each of the N antenna elements 3101 receives incoming wireless signals from a plurality of sources located in different directions and at different distances from the BFN circuit 3100, so that signals received by different antenna elements 3101 from a particular source differ in phase and amplitude depending on the directions of the incoming signals. A signal received by each antenna element is passed through respective front-end antenna circuits 3125, where it undergoes filtering, amplification and optionally frequency conversion in one or more frequency conversion stages. Resulting signals form input signals for a BFN sub-circuit 3130, wherein they are each first split into M split-off signals by 1×M splitters 3111, where M≧2.

Each of the M outputs of each of the N splitters is coupled into one of M signal combiners/adders 3120 using a connecting link so as to form M output signals. The connecting links include multipliers 3115 which impose complex weighting coefficient $W_{mn}=A_{mn}e^{j\alpha_{mn}}$, m=1, ..., M, n=1, ..., N on respective signals individually providing pre-selected amplitude weighting and phase shifting to said signals.

The weight coefficients $W_{mn}$ are selected so as to improve reception directivity of the BFN 3100 with respect to a wireless signal received or transmitted from a particular wireless source, as compared to reception directivity provided by each individual antenna element 3101. With the M sets of weights, M different receive directivity patterns, also referred to as receive beams, can be formed, corresponding to the M output signals.

In practice, the front-end antenna circuits 3125 may have gain and phase transfer functions that differ from one to another. In addition, these transfer functions may vary over time and temperature. If the weighting factors $W_{nm}$ have been selected without accounting for the real parameters of the front-end antenna circuits 3125 associated with each antenna element 3101, any mismatch in the gain and phase transfer functions between them will result in a distorted directivity pattern, characterized for example by a reduced gain, skewed directivity, higher side-lobe levels, etc. There is thus a need to compensate for the circuit imperfections and imbalances in the front-end antenna circuits 3125 and the BFN sub-circuit 3130.

Figure 32:
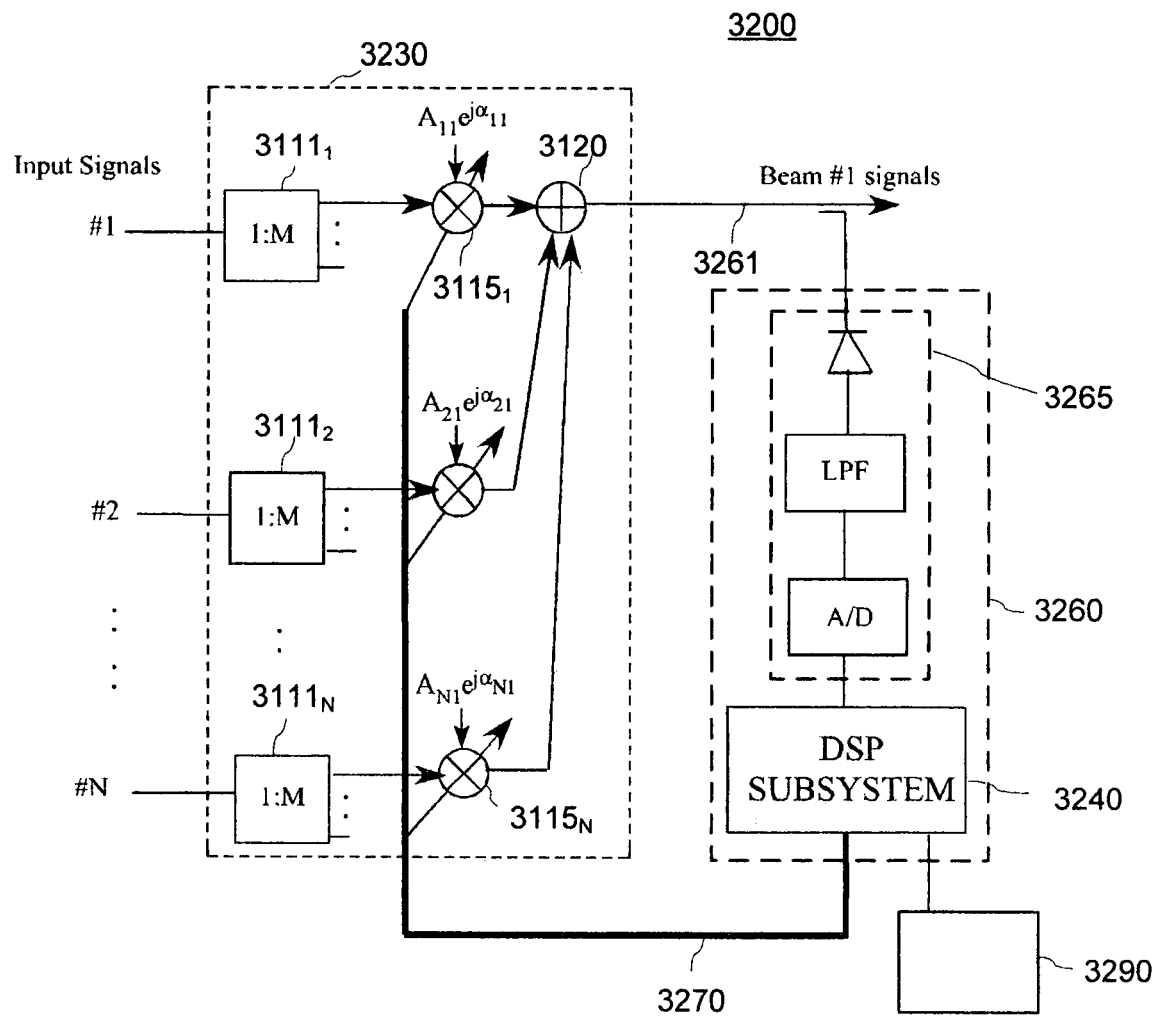
FIG. 32 is a diagram of a self-calibrating BFN circuit according to an embodiment of the present invention.

These distortions in the BFN 3100 resulting from internal mismatches and component parameter variations can be compensated using another embodiment of the method of the present invention, which will now be described with reference to FIG. 32 showing one possible configuration of a self-calibrating BFN(SCBFN) implementing the method.

The SCBFN 3200 includes a BFN sub-circuit 3230 and a feedback circuit 3260, which is structurally and functionally similar to the feedback circuits 1960 and 250 described hereinabove, and includes a DSP 3240 coupled to receive output signal samples from a sampling circuit 3265.

Antenna elements and their respective receive chains as shown in FIG. 31 are not shown in FIG. 32 so as not to obscure important features of the invention, as said elements are not affected by the modifications of the present invention in this embodiment thereof. They are nevertheless a part of the SCBFN circuit 3200, which compensates for distortions within said antenna and front-end antenna circuits elements that are not shown in FIG. 32.

The BFN sub-circuit 3230 is similar to the prior-art BFN sub-circuit 3130 shown in FIG. 31 and includes all the elements thereof. It receives the N modified signals from respective front-end antenna circuits 3125 as shown in FIG. 31; these N modified signals are originated from the N input signals received by the N antenna elements 3101, which can be considered as the input ports of the SCBFN 3200. The BFN sub-circuit 3230 has M output ports for outputting M output, or beam signals. However, for clarity only one of the M output ports, which is labeled '3261', that outputs the beam signal #1 is shown in FIG. 32. Also for clarity, only a portion of the BFN sub-circuit 3230 that forms the beam signal #1 is shown.

As shown in FIG. 32, the feedback circuit 3260 is for compensating the circuit distortions affecting only the first output signal, labeled as "Beam #1 signals", by adjusting the respective weighting coefficients $W_{nm}$, for m=1 indicating the output port or signal.

According to the invention, the multipliers 3115 are controlled by the DSP 3240, which in operation provides signals via a bus 3230 to adjust the weighting coefficients $W_{n1}$, n=1, ..., N so as to minimize a difference between output statistical distribution information, e.g. the output PDF or CDF, obtained from power samples of one of the output signals of the BFN sub-circuit 3230, and a respective reference distribution information for said output signal stored in a memory 3290. This can be done iteratively using, for example, the steepest descent algorithm as described hereinabove with reference to the SCMPA 2100.

One difference between the SCMPA and SCBFN embodiments, is that in the case of the SCBFN, the output signals can be distortion-compensated independently from each other on per-output-signal basis, by iteratively minimizing M differences between respective reference and output PDFs or CDFs, one for each output signal. This can be done using M separate feedback circuits 3260, one per output signal, optionally sharing the DSP 3240, or switching a single sampling circuit 3265 between the M output ports, and using the bus 3270 to control each of the M·N multipliers 3115.

Note also, that in the shown embodiment, the SCBFN 3200 does not have a distortion compensation network that is added to a functional device for compensating its internal imbalances, such as compensation networks 1910 and 210, which compensate for distortions in the MPA 1930 and QT 100 but are distinct therefrom.

Generally, for distortion compensation in a self-calibrating multi-port circuit according to the present invention, a variable coupling means is to be provided for adding a controlled amount of cross-correlation between at least some of the N input signals, or signals originated therefrom within the circuit; in operation, the controlled amount of cross-correlation is adjusted by tuning the variable coupling means using a feedback circuit so as to minimize a difference between an output statistical characteristic of the actual output signal and a reference statistical characteristic for the output signal. A distinct distortion compensation network is only one possible embodiment of such variable coupling means, and in other embodiments the variable coupling means can be provided within a portion of the self-calibrating circuit that performs another useful function of the circuit. The self-calibrating circuit shown in FIG. 32 represents such an embodiment of the invention, wherein the variable coupling means is formed using the plurality of adjustable multipliers 3115, which can be tuned so as to vary relative amplitudes and phases of the N modified antenna signals received by the N splitters 3111, thereby controlling a desired amount of cross-correlation among signals received by the antenna elements 3101, so as to improve the directivity.

It should be understood that each of the preceding embodiments of the present invention may utilize a portion of another embodiment. For example, it is known in the art to combine a BFN with an MPA. Examples of such combinations, with the BFN operating in receive or transmit modes, are described in U.S. Pat. No. 5,936,592. With this combination of MPA and BFN, the type-based calibration technique of the present invention can be applied to calibrate either the MPA and BFN coefficients jointly or separately one after the other. In one embodiment, a SCBFN circuit as described hereinabove can be used for compensating the circuit imperfections in the connected MPA Although the self-calibrating BFN was described herein in the receive mode, substantially the same circuit configuration and the same method of circuit calibration with only minor modifications can be used for the BFN in a transmit mode.

Advantageously, the aforedescribed method of the present invention for calibrating multi-port circuits based on the envelope distortion statistics of the output signal or signals can be used during normal operation of the circuit thus allowing it to adapt to changing conditions without service interruptions, sampling rate is independent of the signal bandwidth, does not require synchronization with the transmitted signals, can work over a wide range of component distortions, thus permitting the use of low cost and poor performing devices, and requires only a simple diode-based power sampling circuit without high-speed analog hardware.

Of course numerous other embodiments may be envisioned without departing from the scope of the invention. For example, an embodiment of the self-calibrating MPA is easily envisioned which does not include a distinct distortion compensation network, but instead employs tunable 3 dB couplers having externally adjustable amplitude and phase shift parameters associated therewith, and wherein a type-based feedback is used to directly adjust said coupling amplitude and phase shift parameters of at least some or all of the tunable 3-dB couplers within the MPA circuit.

We claim:

1. A method for compensating for distortion in a circuit comprising a plurality of input ports for receiving a plurality of input signals and an output port for outputting a first output signal, the method comprising the steps of:
    a) providing reference distribution information for the first output signal;
    b) sampling the first output signal to determine an output distribution information; and
    c) modifying a first input signal from the plurality of input signals for reducing a difference between the output distribution information and the reference distribution information, including adding a controlled amount of cross-coupling between the first and a second of the plurality of input signals or signals related thereto so as to at least partially compensate for undesired signal cross-talk in the circuit;
    wherein step c) comprises:
    d) determining an objective function value from the reference distribution information and the output distribution information, and storing the objective function value in a first memory;
    e) determining a plurality of signal scaling coefficients for at least the first and second input signals, the plurality signal scaling coefficients comprising at least one cross-coupling coefficient; and,
    f) based on the plurality of signal scaling coefficients, adjusting one or more elements of the circuit;
    wherein step e) comprises:
        A) incrementing or decrementing current values of one or more of the scaling coefficients in the plurality of scaling coefficients;
        B) modifying the input signals using the plurality of scaling coefficients obtained in step (A);
        C) updating the output distribution information;
        D) computing an updated objective function value and comparing thereof with the stored objective function value; and,
        E) repeating steps (A)-(D) for each of the scaling coefficients.

2. A method according to claim 1, wherein steps (b)-(c) are repeated until a pre-determined condition related to distortion compensation is satisfied.

3. A method according to claim 2, wherein the pre-determined condition relates to reaching a maximum number of iterations.

4. A method according to claim 2, wherein steps (b)-(c) are repeated until the updated objective function value reaches a pre-determined threshold.

5. A method according to claim 1, wherein steps (b)-(c) are performed during normal operation of the circuit without disrupting thereof.

6. A method according to claim 1 wherein step (e) includes determining two scaling coefficients for a first of the plurality of input ports, and step (f) includes:
    scaling the first and second of the plurality of input signals using the two signal scaling coefficients to form first and second scaled signals; and,
    forming a first compensation signal from a sum of the first and second scaled input signals for providing to the first of the plurality of input ports.

7. A method according to claim 1 wherein step (c) includes forming a plurality of compensation signals for providing to the plurality of input ports, wherein each of the compensation signals comprises a linear combination of the plurality of input signals scaled by the scaling coefficients.

8. A method according to claim 1, wherein the input signals vary in time according to selected modulating schemes and are shaped using selected pulse shaping filters, and wherein the reference distribution information depends on the selected modulating schemes and pulse shaping filters.

9. A method according to claim 8, comprising second providing a second memory for storing the reference distribution information.

10. A method according to claim 9, further comprising updating the second memory when at least one of the modulation scheme and the pulse shaping function is changed.

11. A method according to claim 1, wherein the circuit comprises a vector modulator having two input ports for receiving two modulating signals as the input signals, and one output port for outputting the first output signal which is modulated with the modulating signals.

12. A method according to claim 11, wherein the plurality of scaling coefficients for each of the input ports include at least one of a signal cross-talk coefficient, a gain coefficient, and a dc-offset coefficient.

13. A method according to claim 11, wherein the reference distribution information comprises one of a cumulative distribution function and a probability density function of a sampled envelope of the first output signal.

14. A method according to claim 1, wherein the circuit comprises a multi-port amplifier having N input ports and K output ports, wherein $N \geq 2$ and $K \geq 1$.

15. A method according to claim 1, wherein the circuit comprises a multi-port beam forming network having N input ports and M output ports, wherein $N \geq 2$ and $M \geq 1$.

16. A method according to claim 1 wherein the circuit comprises at least one additional output port for outputting at least one additional output signal, the method further comprising:
providing reference distribution information for the at least one additional output signal; and,
sampling the at least one additional output signal to determine output distribution information therefor;
wherein step (d) comprises determining the objective function value from the reference distribution information for the first output signal and for the at least one additional output signal, and the output distribution information for the first output signal, and for the at least one additional output signal.

17. A method according to claim 1 wherein step (a) includes sampling one or more of the plurality of input signals for obtaining the reference distribution information.

18. A method according to claim 1 wherein the reference distribution information comprises a cumulative distribution function or a probability density function for a reference output signal, and wherein step (b) includes determining one of a cumulative distribution function and a probability density function from the sampling of the first output signal.

* * * * *